US009733500B2

(12) United States Patent
Ebisui et al.

(10) Patent No.: US 9,733,500 B2
(45) Date of Patent: Aug. 15, 2017

(54) ILLUMINATION UNIT AND DISPLAY

(71) Applicant: Sony Corporation, Tokyo (JP)

(72) Inventors: Akira Ebisui, Kanagawa (JP); Harumi Sato, Miyagi (JP); Kentaro Okuyama, Kanagawa (JP); Shogo Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 781 days.

(21) Appl. No.: 13/892,703

(22) Filed: May 13, 2013

(65) Prior Publication Data

US 2013/0314620 A1    Nov. 28, 2013

(30) Foreign Application Priority Data

May 22, 2012 (JP) .................. 2012-116746

(51) Int. Cl.
  *G02F 1/13*     (2006.01)
  *G02F 1/01*     (2006.01)
  *G02F 1/1337*   (2006.01)
  *G02F 1/1335*   (2006.01)
  *G02F 1/1334*   (2006.01)

(52) U.S. Cl.
  CPC .............. *G02F 1/1313* (2013.01); *G02F 1/01* (2013.01); *G02F 1/133753* (2013.01); *G02F 1/1334* (2013.01); *G02F 1/133611* (2013.01); *G02F 2001/133601* (2013.01)

(58) Field of Classification Search
  CPC ......... G02F 2001/13775; G02F 1/1334; G02F 1/1313; G02F 1/01; G02F 1/133753; G02F 2001/133601; G02F 1/133611
  See application file for complete search history.

(56) References Cited

U.S. PATENT DOCUMENTS

| 6,187,440 B1* | 2/2001 | Wu ..................... C08F 212/34 349/155 |
| 2002/0015297 A1* | 2/2002 | Hayashi ................ G01D 11/28 362/23.16 |
| 2006/0215093 A1* | 9/2006 | Nakao .................. G02B 5/3083 349/117 |
| 2007/0247578 A1* | 10/2007 | Yang ..................... G02F 1/1395 349/134 |
| 2009/0257245 A1* | 10/2009 | Kim ........................ F21V 7/04 362/626 |
| 2011/0109663 A1* | 5/2011 | Uchida ................. G02F 1/1334 345/690 |
| 2012/0069063 A1* | 3/2012 | Sato ................... H04N 13/0452 345/690 |

FOREIGN PATENT DOCUMENTS

JP    2011-142065    7/2011

* cited by examiner

*Primary Examiner* — Dennis Y Kim
(74) *Attorney, Agent, or Firm* — K&L Gates LLP

(57) ABSTRACT

An illumination unit includes a light modulation layer including a first region and a second region that have optical anisotropy and different responsiveness to an electric field. The light modulation layer satisfies an expression A/B<A1/B1 when the light modulation layer exhibits the scattering characteristics.

13 Claims, 29 Drawing Sheets

ILLUMINATION UNIT AND DISPLAY

CROSS REFERENCES TO RELATED APPLICATIONS

The present application claims priority to Japanese Priority Patent Application JP 2012-116746 filed in the Japan Patent Office on May 22, 2012, the entire content of which is hereby incorporated by reference.

BACKGROUND

The present application relates to an illumination unit that includes a light modulation device that exhibits scattering characteristics or transparency with respect to light, and also relates to a display.

Recently, high image quality and energy saving in liquid crystal displays have been radically proceeded and there is proposed a scheme that achieves improvement in contrast in a dark place by partially modulating light intensity of a backlight. In this technique, mainly, a light emitting diode (LED) used as a light source of the backlight is partially driven to modulate light from the backlight in accordance to a display image. Also, a demand for reducing thickness has been increased in a large liquid crystal display as in a small liquid crystal display. Therefore, attention has been attracted not to a scheme that arranges, for example, a cold cathode fluorescent lamp (CCFL), an LED, or the like directly beneath the liquid crystal panel, but to an edge-light scheme that arranges a light source at an end of a light guide plate.

The present applicant has achieved partial drive that partially modulates light intensity of the light from the backlight in the edge-light scheme, and has disclosed the technique, for example, in Japanese Unexamined Patent Application Publication No. 2011-142065 (JP 2011-142065A). In JP 2011-142065A, a polymer dispersed liquid crystal (PDLC) is used in order to achieve the above-described partial drive. In JP 2011-142065A, the PDLC is formed by mixing a liquid crystal material and a low-molecular material with alignment properties and polimerizability and by causing phase-separation by ultraviolet irradiation, and the PDLC is a composite layer in which the liquid crystal material is dispersed in a polymer material having a streaky structure. The PDLC is classified into a horizontal alignment type, a vertical alignment type, and an isotropic type, depending on alignment upon no voltage application. Out of the foregoing types, the horizontal alignment type achieves high luminance and high contrast, and therefore, is most suitable for a backlight.

SUMMARY

In the above-described PDLC of a horizontal alignment type, interfaces of the polymer material and the liquid crystal material are formed densely in a minor-axis direction of the streaky structure and is formed sparsely in a major-axis direction of the streaky structure. Therefore, when the streaky structure extends in a direction that is parallel to a light incident surface, light that propagates in the above-described minor-axis direction of the streaky structure inside the PDLC enters the interface with a cycle of average streaky organization size in the minor-axis direction of the streaky structure, and as a result, is scattered largely. On the other hand, light that propagates in the above-described major-axis direction of the streaky structure inside the PDLC has less opportunity to enter the interface, and therefore is not scattered much.

Moreover, light that propagates in a direction (hereinafter, referred to as "X direction") that is the minor-axis direction of the streaky structure and is perpendicular to the light incident surface inside the PDLC propagates with a cycle of the average streaky organization size in the minor-axis direction of the streaky structure, with being influenced by a difference between an extraordinary refractive index of the liquid crystal material and an ordinary refractive index of the polymer material and by a difference between an ordinary refractive index of the liquid crystal material and an extraordinary refractive index of the polymer material. On the other hand, light that propagates in the above-described major-axis direction (hereinafter, referred to as "Y direction") of the streaky structure inside the PDLC or in a thickness direction (hereinafter, referred to as "Z direction") of the PDLC propagates being influenced only by the difference between the extraordinary refractive index of the liquid crystal material and the ordinary refractive index of the polymer material or by the difference between the ordinary refractive index of the liquid crystal material and the extraordinary refractive index of the polymer material. Therefore, light that propagates in the X direction inside the PDLC is scattered largely, and light that propagates in the Y direction and in the Z direction inside the PDLC is not scattered much.

As described above, in the PDLC of a horizontal alignment type, anisotropy of scattering is caused between light that propagates in the X direction and light that propagates in the Y or Z direction due to the above-described two factors. As a result, light that propagates in the Z direction is scattered preferentially in a direction in which a light guide condition is destroyed, and therefore, light extraction efficiency is increased. Accordingly, high luminance and high contrast are obtained.

However, when the PDLC of a horizontal alignment type is applied to a backlight of an edge-light scheme, luminance distribution is likely to be non-uniform between light that propagates in the X direction and light that propagates in the Y direction due to anisotropy in scattering. In particular, when arrangement pitches of respective point light sources in a linear light source is sparse, there has been an issue that bright-dark stripes may be caused in the vicinity of the linear light source.

It is desirable to provide an illumination unit capable of improving uniformity in luminance and a display that includes the illumination unit.

According to an embodiment of the present disclosure, there is provided an illumination unit including: a first transparent substrate and a second transparent substrate that are arranged to be separated from each other and to face each other; a light source applying light to an end face of the first transparent substrate; and a light modulation layer provided in a gap between the first transparent substrate and the second transparent substrate and exhibiting scattering characteristics or transparency with respect to the light from the light source depending on magnitude of an electric field, the light modulation layer including a first region that has optical anisotropy and relatively-high responsiveness to the electric field and a second region that has optical anisotropy and relatively-low responsiveness to the electric field, and the light modulation layer satisfying a following expression when the light modulation layer exhibits the scattering characteristics, $$A/B < A1/B1$$

where A is magnitude of first scattering with respect to the light propagating in a first direction that is perpendicular to the end face; B is magnitude of second scattering with respect to the light propagating in a second direction that is parallel to the end face and is parallel to a surface of the first transparent substrate; A1 is magnitude of scattering with respect to the light propagating in a direction perpendicular to the end face when an optical axis of the first region is in a direction of a normal to the first transparent substrate, and an optical axis of the second region is in a direction that is parallel to the end face and is orthogonal to the optical axis of the first region; and B1 is magnitude of scattering with respect to the light propagating in a direction that is parallel to the end face and is parallel to the surface of the first transparent substrate when the optical axis of the first region is in the direction of the normal to the first transparent substrate and the optical axis of the second region is in a direction that is parallel to the end face and is orthogonal to the optical axis of the first region.

According to an embodiment of the present disclosure, there is provided a display provided with a display panel displaying an image by modulating light and an illumination unit illuminating the display panel from back thereof, the illumination unit including: a first transparent substrate and a second transparent substrate arranged to be separated from each other and to face each other; a light source applying light to an end face of the first transparent substrate; and a light modulation layer provided in a gap between the first transparent substrate and the second transparent substrate and exhibiting scattering characteristics or transparency with respect to the light from the light source depending on magnitude of an electric field, the light modulation layer including a first region that has optical anisotropy and relatively-high responsiveness to the electric field and a second region that has optical anisotropy and relatively-low responsiveness to the electric field, and the light modulation layer satisfying a following expression when the light modulation layer exhibits the scattering characteristics, $$A/B < A1/B1$$

where A is magnitude of first scattering with respect to the light propagating in a first direction that is perpendicular to the end face; B is magnitude of second scattering with respect to the light propagating in a second direction that is parallel to the end face and is parallel to a surface of the first transparent substrate; A1 is magnitude of scattering with respect to the light propagating in a direction perpendicular to the end face when an optical axis of the first region is in a direction of a normal to the first transparent substrate, and an optical axis of the second region is in a direction that is parallel to the end face and is orthogonal to the optical axis of the first region; and B1 is magnitude of scattering with respect to the light propagating in a direction that is parallel to the end face and is parallel to the surface of the first transparent substrate when the optical axis of the first region is in the direction of the normal to the first transparent substrate and the optical axis of the second region is in a direction that is parallel to the end face and is orthogonal to the optical axis of the first region.

In the illumination unit and the display according to the embodiments of the present application, the light modulation layer has the configuration by which the foregoing expression is satisfied when the light modulation layer exhibits the scattering characteristics. Therefore, anisotropic scattering of the light that propagates in the first direction and the light that propagates in the second direction is moderated in whole of the light modulation layer.

According to the illumination unit and the display according to the embodiments of the present application, the light modulation layer has the configuration that satisfies the foregoing expression when the light modulation layer exhibits its scattering characteristics. Therefore, the above-described anisotropic scattering is moderated in the whole of the light modulation layer. Here, the bright-dark stripes due to the arrangement of the light source are caused by a large difference between the first scattering and the second scattering. Therefore, contrast of the bright-dark stripes due to the arrangement of the light source is reduced by moderating the above-described anisotropic scattering in the whole of the light modulation layer. As a result, uniformity in luminance is improved.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the present disclosure will be described below in detail with reference to the drawings. The description will be given in the following order.
1. First Embodiment (illumination unit)
   An example using a horizontal alignment film (aligned at 0°) and a vertical alignment film
2. Second Embodiment (illumination unit)
   An example using two horizontal alignment films (aligned at θ1°)
3. Third Embodiment (illumination unit)
   An example using a horizontal alignment film (aligned at θ1°) and a horizontal alignment film (aligned at 0°).
4. Modifications (illumination unit)
5. Fourth Embodiment (display)

[1. First Embodiment]
[Configuration]

Figure 1:
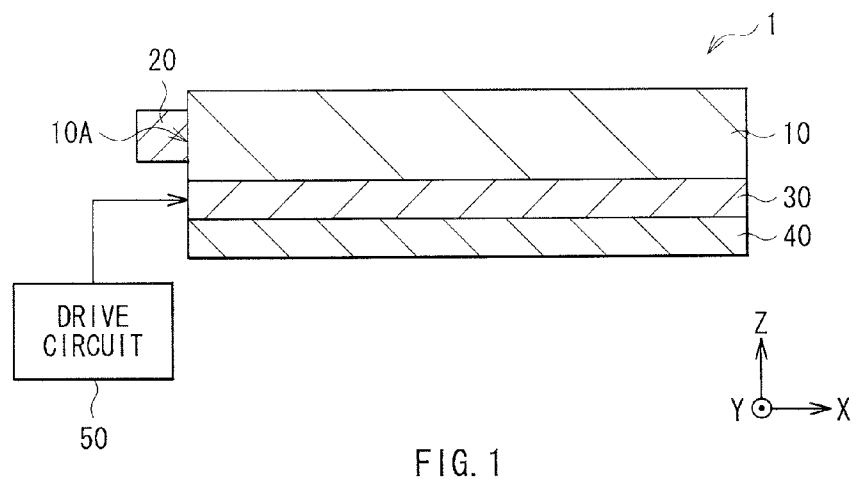
FIG. 1 is a diagram illustrating an example of a cross-sectional configuration of an illumination unit according to an embodiment of the present application.
Figure 2:
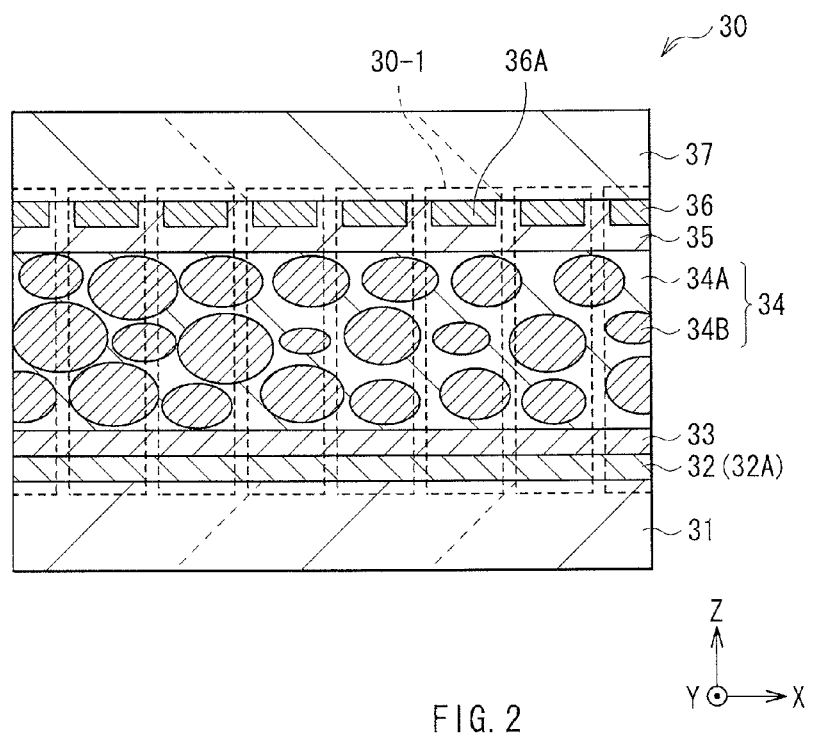
FIG. 2 is a diagram illustrating an example of a cross-sectional configuration in an XZ plane of a light modulation device in FIG. 1.

FIG. 1 illustrates an example of a cross-sectional configuration of an illumination unit 1 according to a first embodiment of the present application. FIG. 2 is a cross-sectional view illustrating an example of an outline configuration of a light modulation device 30 in the illumination unit 1 in FIG. 1. It is to be noted that FIGS. 1 and 2 are mere schematic diagrams and dimensions and shapes illustrated therein are not necessarily the same as the actual ones. The illumination unit 1 emits illumination light from a top face thereof. The illumination unit 1 may be used, for example, for application of illuminating a component such as a liquid crystal display panel from the back thereof. The illumination unit 1 may include, for example, a light guide plate 10, a light source 20 arranged on a side face of the light guide plate 10, the light modulation device 30 and a reflective plate 40 arranged on the back of the light guide plate 10, and a drive circuit 50 that drives the light modulation device 30.

The light guide plate 10 guides light from the light source 20 arranged on the side face of the light guide plate 10 to the top face of the illumination unit 1. The light guide plate 10 has a shape corresponding to a display panel (not illustrated) that is arranged on a top face of the light guide plate 10, for example, a rectangular parallelepiped shape that is surrounded by a top face, a bottom face, and side faces. It is to be noted that, hereinafter, a side face which light from the light source 20 enters, out of the side faces of the light guide plate 10, is referred to as a light incident surface 10A. The light guide plate 10 may have a predetermined patterned shape on one or both of the top face and the bottom face thereof, and may have a function that scatters light entering from the light incident surface 10A to be uniform, for example. The light guide plate 10 may function, for example, as a supporting member that supports an optical sheet (such as a diffusion plate, a diffusion sheet, a lens film, and a polarization separation sheet) arranged between the display panel and the illumination unit 1. The light guide plate 10 may mainly include, for example, a transparent thermoplastic resin such as a polycarbonate resin (PC) and an acrylic resin (polymethyl methacrylate (PMMA)).

The light source 20 applies light to the side face of the light guide plate 10. The light source 20 is a linear light source and, in particular, is configured of a plurality of LEDs arranged in a line. The LEDs are preferably white LEDs. It is to be noted that the plurality of LEDs may include, for example, a red LED, a green LED, and a blue LED. The light source 20 may be provided, for example, only on one side face of the light guide plate 10 as shown in FIG. 1. It is to be noted that the light source 20 may be provided, for example, on both side faces of the light guide plate 10, which is not illustrated.

The reflective plate 40 returns, toward the light guide plate 10, light leaked out from the back of the light guide plate 10 through the light modulation device 30. The reflective plate 40 may have, for example, functions such as reflection, diffusion, and scattering. This allows light emitted from the light source 20 to be utilized efficiently, and also contributes to improvement in front luminance. The reflective plate 40 may be formed, for example, of foamed PET (polyethylene terephthalate), a silver-deposited film, a multi-layered reflective film, white PET, and/or the like.

In the present embodiment, the light modulation device 30 is closely attached to the back (bottom face) of the light guide plate 10 without an air layer in between, and may be attached to the back of the light guide plate 10 with an adhesive agent (not illustrate) in between, for example. The light modulation device 30 may include, for example, a transparent substrate 31, a lower electrode 32, an alignment film 33, a light modulation layer 34, an alignment film 35, an upper electrode 36, and a transparent substrate 37 arranged in order from the reflective plate 40, as shown in FIG. 2.

The transparent substrates 31 and 37 are arranged to be separated from each other and to face each other. The transparent substrates 31 and 37 support the light modulation layer 34, and are each typically formed of a substrate that is transparent to visible light such as a glass plate and a plastic film. The lower electrode 32 is provided on a surface of the transparent substrate 31 that faces the transparent substrate 37. The lower electrode 32 and the upper electrode 36 may be formed, for example, of a transparent conductive material such as indium tin oxide (ITO). The transparent conductive material is preferably a material that absorbs visible light in an amount as small as possible.

The lower electrode 32 may include, for example, a plurality of strip-like sub-electrodes 32A that are arranged side by side, extending in one direction in the plane. The upper electrode 36 is provided on a surface of the transparent substrate 37 that faces the transparent substrate 31. The upper electrode 36 may include, for example, a plurality of strip-like sub-electrodes 36A that are arranged side by side, extending in a direction that is one direction in the plane and intersects with (is orthogonal to) the extending direction of the sub-electrodes 32A.

The patterns of the lower electrode 32 and the upper electrode 36 depend on a driving scheme. For example, when the lower electrode 32 and the upper electrode 36 include strip-like sub-electrodes that are arranged side by side as described above, each sub-electrode may be driven by simple matrix driving, for example. When one of the electrodes has a sheet-like shape (is a continuous film) and the other electrode has a small rectangular shape, each electrode may be driven by active matrix driving, for example. Alternatively, when one of the electrodes has a sheet-like shape (is a continuous film) and the other electrode has a block-like shape provided with a fine extraction wiring, each divided block may be driven by a segmented scheme, for example.

Seeing the lower electrode 32 and the upper electrode 36 from a direction of a normal to the light modulation device 30, a portion, of the light modulation device 30, in which the lower electrode 32 and the upper electrode 36 face each other configures a light modulation cell 30-1. Each light modulation cell 30-1 may be separately and independently driven by applying a predetermined voltage to the lower electrode 32 and the upper electrode 36. Also, each light modulation cell 30-1 exhibits transparency or scattering characteristics with respect to light from the light source 20 depending on magnitude of a value of the voltage applied to the lower electrode 32 and the upper electrode 36. It is to be noted that the transparency and the scattering characteristics will be described in detail when the light modulation layer 34 will be described.

Figure 3:
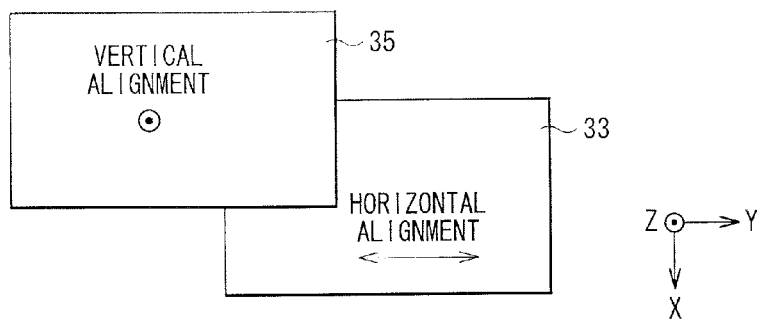
FIG. 3 is a plan view illustrating alignment directions of alignment films in FIG. 2.

The alignment films 33 and 35 are arranged to sandwich the light modulation layer 34. The alignment films 33 and 35 may align, for example, liquid crystals, monomers, etc. that are used for the light modulation layer 34. The alignment films 33 and 35 are so formed that the light modulation layer 34 satisfies at least one (A/B<A1/B1) of the two expressions (A>C>B and A/B<A1/B1) which will be described later, when the light modulation layer 34 exhibits scattering characteristics. Specifically, the alignment film 33 as a whole is formed of a horizontal alignment film, and the alignment film 35 as a whole is formed of a vertical alignment film. The horizontal alignment film used for the alignment film 33 has an alignment direction in a direction that is parallel or substantially-parallel to the light incident surface 10A (or the linear light source), as shown in FIG. 3. When the horizontal alignment film used for the alignment film 33 is formed by a rubbing process, the rubbing direction of the alignment film 33 is in the direction that is parallel or substantially-parallel to the light incident surface 10A (or to the linear light source). On the other hand, the vertical alignment film used for the alignment film 35 has an alignment direction in a direction that is parallel or substantially-parallel to a direction of a normal to the transparent substrate 31.

Examples of the horizontal alignment film and the vertical alignment film may include an alignment film formed by performing a rubbing process on a material such as polyimide, polyamide-imide, or polyvinyl alcohol, and an alignment film provided with a groove-like shape by a process such as transfer and etching. Further, examples of the horizontal alignment film and the vertical alignment film may include an alignment film formed by obliquely depositing an inorganic material such as silicon oxide, a diamond-like carbon alignment film formed by ion-beam irradiation, and an alignment film provided with an electrode-pattern slit. When a plastic film is used as the transparent substrates 31 and 37, it is preferable that a burning temperature after applying the alignment films 33 and 35 to the surfaces of the transparent substrates 31 and 37 be as low as possible. Therefore, it is preferable to use polyamide-imide that is formable at a temperature of 100° C. or lower as the alignment films 33 and 35.

It is preferable to use, as the horizontal alignment film, an alignment film that has a function that pre-tilts liquid crystal molecules in contact with the horizontal alignment film. Similarly, it is preferable to use, as the vertical alignment film, an alignment film that has a function that pre-tilts liquid crystal molecules in contact with the vertical alignment film. Examples of a method of providing the horizontal alignment film and the vertical alignment film with the pre-tilt function may include rubbing. "Pre-tilt" refers to cause the major axis of the liquid crystal molecule in proximity to the alignment film to intersect at a slight angle with "a plane that is parallel to the surface of the alignment film" or "a normal to the alignment film". For example, it is preferable that the above-described horizontal alignment film has a function that causes the major axis of the liquid crystal molecule in proximity to the horizontal alignment film to intersect at a slight angle with a surface of the horizontal alignment film in a plane that is parallel to the light incident surface 10A. Also, for example, it is preferable that the above-described vertical alignment film has a function that causes the major axis of the liquid crystal molecule in proximity to the vertical alignment film to intersect at a slight angle with a normal to the vertical alignment film in a plane that is parallel to the light incident surface 10A.

It is enough that the horizontal alignment film and the vertical alignment film used for the alignment films 33 and 35 have the function that aligns liquid crystals and monomers, and it is not necessary to have characteristics such as reliability based on repeated voltage application which may be necessary in ordinary liquid crystal displays. One reason for this is that reliability based on voltage application after forming the device depends on an interface of liquid crystals and a material in which monomers are polymerized. Alternatively, it is possible to align the liquid crystals, monomers, etc. used for the light modulation layer 34 also, for example, by applying an electric field, a magnetic field, etc. between the lower electrode 32 and the upper electrode 36, even without using an alignment film. In other words, it is possible to fix the alignment states of the liquid crystals, monomers, etc. in a voltage application state by irradiating ultraviolet rays while applying an electric field, a magnetic field, etc. between the lower electrode 32 and the upper electrode 36. When a voltage is used to form the alignment film, different electrodes may be formed for alignment and for driving, or a material such as a dual-frequency liquid crystal may be used as the liquid crystal material in which signs of dielectric anisotropy is reversed depending on frequencies. Further, when a magnetic field is used upon forming the alignment film, it is preferable to use a material having large magnetic susceptibility as the alignment film, for example, a material having multiple benzene rings.

Part or whole of the light modulation layer 34 exhibits scattering characteristics or transparency with respect to light from the light source 20 depending on magnitude of an electric field. For example, the light modulation layer 34 exhibits transparency with respect to light from the light source 20 when a voltage is not applied between the sub-electrode 32A and the sub-electrode 36A (hereinafter, simply referred to as "upon no voltage application"). Further, for example, the light modulation layer 34 exhibits scattering characteristics with respect to light from the light source 20 when a voltage is applied between the sub-electrode 32A and the sub-electrode 36A (hereinafter, simply referred to as "upon voltage application"). As used herein, the wording "upon no voltage application" encompasses a concept that includes a case in which a voltage is applied that is smaller than a voltage by which the light modulation layer 34 exhibits scattering characteristics and that causes the light modulation layer 34 to exhibit transparency. As used herein, the wording "upon voltage application" refers to a case in which a voltage is applied that causes the light modulation layer 34 to exhibit scattering characteristics.

The light modulation layer 34 may be, for example, a composite layer that includes a polymer region 34A and a plurality of liquid crystal regions 34B dispersed in the polymer region 34, as shown in FIG. 2. The polymer region 34A and the liquid crystal regions 34B have shape anisotropy and also have optical anisotropy. It is to be noted that the liquid crystal region 34B and the polymer region 34A correspond to specific but not limitative examples of the first region and the second region in one embodiment of the present application, respectively.

[Shape Anisotropy]

Figure 4:
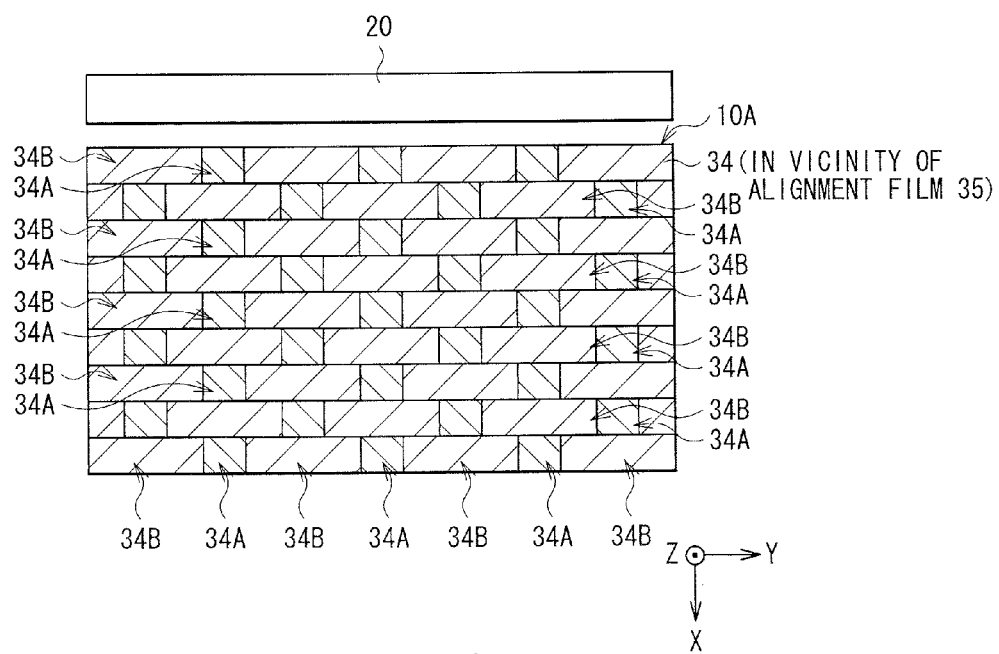
FIG. 4 is a diagram illustrating an example of a cross-sectional configuration in an XY plane of a light modulation layer in FIG. 2.
Figure 5:
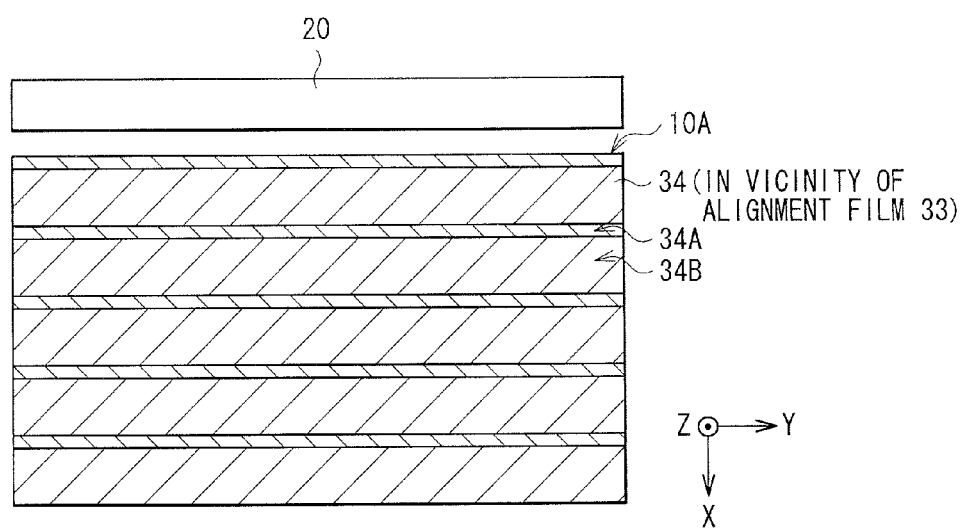
FIG. 5 is a diagram illustrating another example of the cross-sectional configuration in the XY plane of the light modulation layer in FIG. 2.

FIG. 4 illustrates an example of a cross-sectional configuration of the light modulation layer 34 in the XY plane in the vicinity of the alignment film 35. FIG. 5 illustrates an example of a cross-sectional configuration of the light modulation layer 34 in the XY plane in the vicinity of the alignment film 33.

The polymer region 34A and the liquid crystal regions 34B both extend in a direction that intersects with the surface of the transparent substrate 31 in the vicinity of the alignment film 35. Further, the liquid crystal regions 34B may be scattered in the polymer region 34A in the vicinity of the alignment film 35 when viewed from the direction of the normal to the transparent substrate 31, for example, as shown in FIG. 4. Further, the polymer region 34A and the liquid crystal regions 34B both extend in a direction that is parallel or substantially parallel to the light incident surface 10A and is parallel or substantially parallel to the surface of the transparent substrate 31, in the vicinity of the alignment film 33. In other words, the polymer region 34A and the liquid crystal regions 34B both extend in a direction that is parallel or substantially parallel to the light source 20 (linear light source) in the vicinity of the alignment film 33. The polymer region 34A and the liquid crystal regions 34B both may extend, for example, continuously or discontinuously across from one end to the other end of the light modulation layer 30, in the vicinity of the alignment film 33. Further, the polymer region 34A and the liquid crystal regions 34B may be arranged, for example, alternately in a direction that is orthogonal to the light incident surface 10A in the vicinity of the alignment film 33, as shown in FIG. 5.

Figure 6:
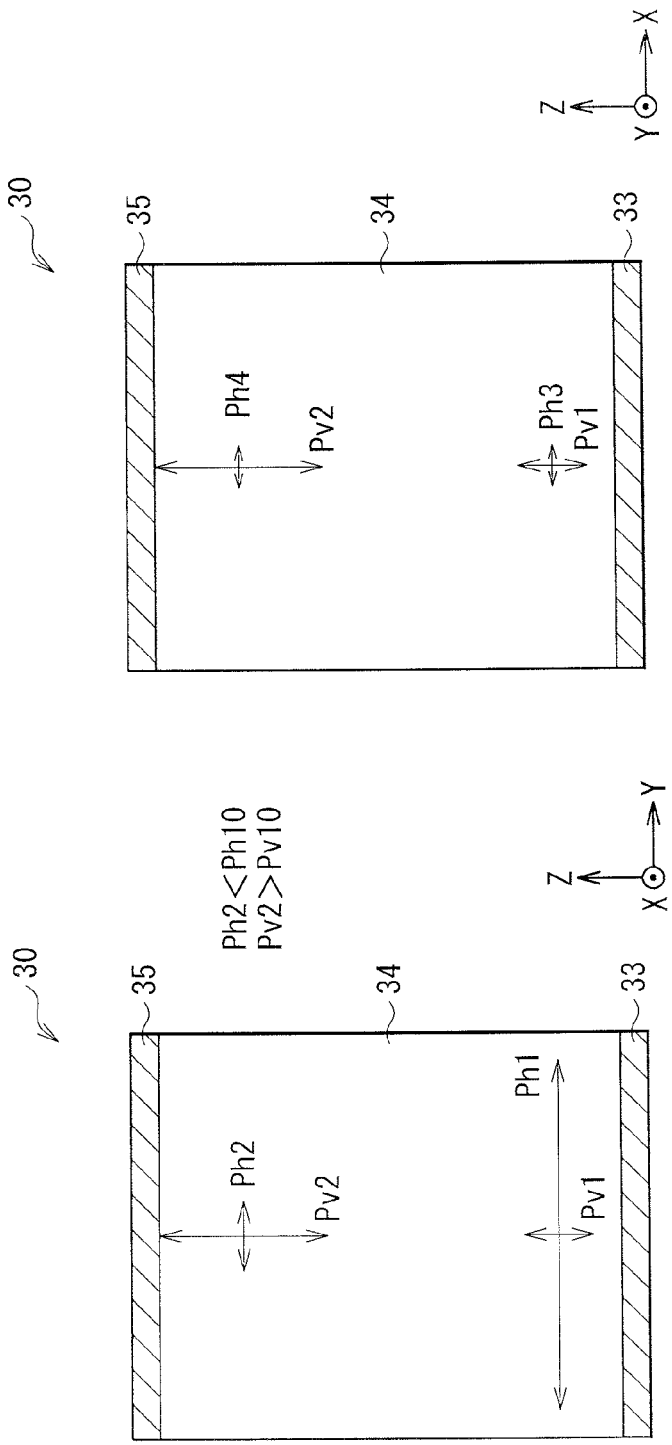
FIGS. 6A and 6B are diagrams illustrating an example of structural cycles in the light modulation layer in FIG. 2.

FIGS. 6A and 6B illustrate structural cycles in the X-axis direction, in the Y-axis direction, and in the Z-axis direction in the light modulation layer 34. The light modulation layer 34 may have, for example, a regular structure having a cycle Ph4 in the X-axis direction, a cycle Ph2 in the Y-axis direction, and a cycle Pv2 in the Z-axis direction in the vicinity of the alignment film 35, as shown in FIGS. 6A and 6B. The light modulation layer 34 may have, for example, a regular structure having a cycle Ph3 in the X-axis direction, a cycle Ph1 in the Y-axis direction, and a cycle Pv1 in the Z-axis direction in the vicinity of the alignment film 33, as shown in FIGS. 6A and 6B.

The polymer region 34A in the vicinity of the alignment film 33 includes a polymer material obtained by polymerizing a later-described low-molecular monomer in a state of being aligned by a function of the alignment film 33. Therefore, in the light modulation layer 34 in the vicinity of the alignment film 33, the interfaces of the polymer region 34A and the liquid crystal regions 34B are formed densely in a direction that is orthogonal to the alignment direction of the alignment film 33, and are formed sparsely in a direction that is parallel to the alignment direction of the alignment film 33. The direction that is orthogonal to the alignment direction of the alignment film 33 refers to a direction that is orthogonal to the light incident surface 10A or to a direction that is orthogonal to the surface of the transparent substrate 31. The direction that is parallel to the alignment direction of the alignment film 33 refers to a direction that is parallel to the light incident surface 10A and is parallel to the surface of the transparent substrate 31. Therefore, the cycles Ph3 and Pv1 are short and the cycle Ph1 is long.

Moreover, the polymer region 34A in the vicinity of the alignment film 35 includes a polymer material obtained by polymerizing later-described low-molecular monomers in a state of being aligned by a function of the alignment film 35. Therefore, in a portion of the light modulation layer 34 in the vicinity of the alignment film 35, the interfaces of the polymer region 34A and the liquid crystal regions 34B are formed densely in a direction that is orthogonal to the alignment direction of the alignment film 35, and is formed sparsely in the alignment direction of the alignment film 35. Therefore, the cycles Ph2 and Ph4 are short and the cycle Pv2 is long.

Figure 7:
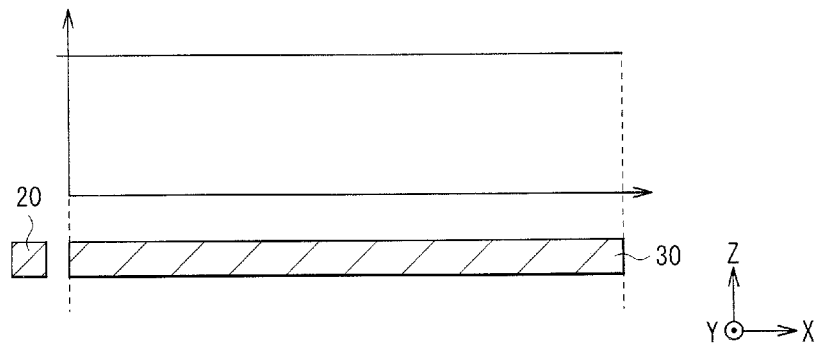
FIG. 7 is a diagram illustrating an example of a proportion of a polymer region in the light modulation layer in FIG. 2.

Proportion of the polymer region 34A in the light modulation layer 34 may be, for example, constant (uniform) or substantially constant (substantially uniform) irrespective of distance from the light source 20, as shown in FIG. 7. The proportion may be, for example, from 50 wt % to 98 wt % both inclusive, preferably from 75 wt % to 95 wt % both inclusive, and more preferably from 85 wt % to 92 wt % both inclusive. The proportion may be adjustable, for example, by a factor such as a weight ratio of the low-molecular monomer used as one of raw materials of the light modulation layer 34, and intensity and an integral amount of ultraviolet rays irradiated to the low-molecular monomer.

The polymer region 34A and the liquid crystal region 34B have different response speed with respect to an electric field. The polymer region 34A has relatively-low responsiveness to an electric field, and the liquid crystal region 34B has relatively-high responsiveness to an electric field. The polymer region 34A includes a polymer material. The polymer region 34A may have, for example, a streaky structure or a porous structure that does not respond to an electric field, or may have a rod-like structure that has response speed slower than that of the liquid crystal region 34B. The streaky structure, the porous structure, or the rod-like structure of the polymer region 34A extends in the direction that intersects with the surface of the transparent substrate 31, in the vicinity of the alignment film 35. The streaky structure, the porous structure, or the rod-like structure of the polymer region 34A extends in a direction that is parallel or substantially parallel to the light incident surface 10A and is parallel or substantially parallel to the surface of the transparent substrate 31, in the vicinity of the alignment film 33. In other words, the streaky structure, the porous structure, or the rod-like structure of the polymer region 34A extends in the direction that is parallel or substantially parallel to the linear light source in the vicinity of the alignment film 33.

The liquid crystal region 34B includes a liquid crystal material and has response speed sufficiently faster than that of the polymer region 34A. The liquid crystal material (liquid crystal molecule) included in the liquid crystal region 34B may be, for example, a rod-like molecule. It is preferable to use a liquid crystal molecule that has positive dielectric constant anisotropy (a so-called positive liquid crystal) as the liquid crystal molecule included in the liquid crystal region 34B.

The above-described low-molecular monomer is preferably a low-molecular monomer that has alignment properties and polymerizability. The low-molecular monomer that has alignment properties and polymerizability may be any low-molecular monomer as long as the material optically has anisotropy and is combinable to liquid crystals. However, a low-molecular monomer that is curable by ultraviolet rays is preferable in the present embodiment. It is preferable that a direction of optical anisotropy of the liquid crystals coincide with that of the material (polymer material) formed by polymerizing low-molecular monomers upon no voltage application. Therefore, it is preferable that the liquid crystals and the low-molecular monomers be aligned in the same direction before ultraviolet curing. In a case where liquid crystal is used as the liquid crystal region 34B and when the liquid crystal is a rod-like molecular, the low-molecular monomer to be used preferably has a rod-like shape. Accordingly, it is preferable to use a material that has both polymerizability and liquid crystallinity (a low-molecular monomer that has both polymerizability and liquid crystallinity) as the low-molecular monomer. Preferably, the low-molecular monomer that has both polymerizability and liquid crystallinity may include, as a polymerizable functional group, for example, one or more selected from a group including an acrylate group, a methacrylate group, an acryloyloxy group, a methacryloxy group, a vinyl ether group, and an epoxy group. The foregoing functional groups are polymerizable by irradiating ultraviolet rays, infrared rays, or electron rays thereto, by heating, etc. In order to suppress decrease in alignment degree upon ultraviolet irradiation, a polyfunctional liquid crystalline material may be added. When the polymer region 34A has the above-described streaky structure, a bifunctional monomer (low-molecular monomer having both polymerizability and liquid crystallinity) is preferably used as the raw material of the light modulation layer 34.

[Optical Anisotropy]

Figure 8:
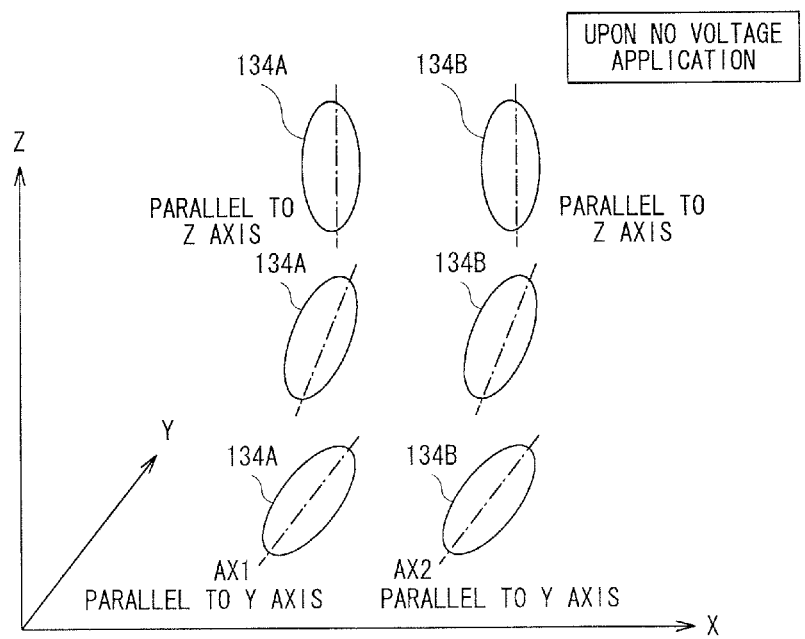
FIG. 8 is a diagram schematically illustrating an example of functions of the light modulation device in FIG. 1.

FIG. 8 schematically illustrates an example of the alignment states in the polymer region 34A and in the liquid crystal region 34B upon no voltage application. Ellipsoids 134A in FIG. 8 each illustrate an example of a refractive index ellipsoid that shows refractive index anisotropy of the polymer region 34A upon no voltage application. Ellipsoids 134B in FIG. 8 each illustrate an example of a refractive index ellipsoid that shows refractive index anisotropy of the liquid crystal region 34B upon no voltage application. The refractive index ellipsoids illustrate, by tensor ellipsoids, refractive indices of linearly-polarized light incident from various directions, and each geometrically teach a refractive index by viewing a cross-section of the ellipsoid from the light incident direction.

Figure 9:
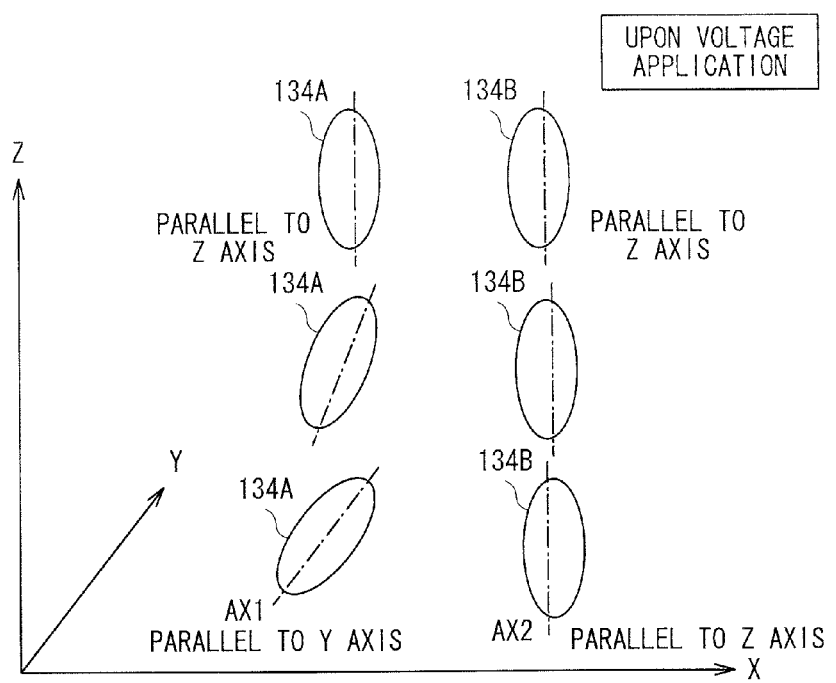
FIG. 9 is a diagram schematically illustrating another example of the function of the light modulation device in FIG. 1.

FIG. 9 schematically illustrates an example of the alignment states in the polymer region 34A and in the liquid crystal region 34B upon voltage application. The ellipsoids 134A in FIG. 9 each illustrate an example of the refractive index ellipsoid that shows refractive index anisotropy of the polymer region 34A upon voltage application. The ellipsoids 134B in FIG. 9 each illustrate an example of the refractive index ellipsoid that shows refractive index anisotropy of the liquid crystal region 34B upon voltage application.

The polymer region 34A and the liquid crystal region 34B may have, for example, configurations in which a direction of an optical axis AX1 (in particular, a major axis of the ellipsoid 134A) of the polymer region 34A coincides with (is parallel to) a direction of an optical axis AX2 (in particular, a major axis of the ellipsoid 134B) of the liquid crystal region 34B upon no voltage application, as shown in FIG. 8. It is to be noted that the optical axes AX1 and AX2 each indicate a line that is parallel to a traveling direction of a light ray that has one refractive index value irrespective of a polarization direction. Also, the directions of the optical axes AX1 and AX2 do not necessarily coincide with each other upon no voltage application, and the direction of the optical axis AX1 may be different in some degree from the direction of the optical axis AX2, for example, due to manufacturing error, etc.

In the liquid crystal region 34B, the direction of the optical axis AX2 varies in a rising direction from the alignment film 33 side toward the alignment film 35 side upon no voltage application. Specifically, the optical axis AX2 is parallel or substantially parallel to the light incident surface 10A and is parallel or substantially parallel to the surface of the transparent substrate 31, in a region closer to the alignment film 33. When the alignment film 33 has the pre-tilt function, the optical axis AX2 is parallel or substantially parallel to the light incident surface 10A and intersects with the surface of the transparent substrate 31 at a predetermined pre-tilt angle in the region closer to the alignment film 33, upon no voltage application. In other words, the optical axis AX2 is parallel or substantially parallel to the linear light source in the region closer to the alignment film 33 upon no voltage application. Also, the optical axis AX2 is parallel or substantially parallel to the normal to the transparent substrate 31 in the region closer to the alignment film 35 upon no voltage application. When the alignment film 35 has the pre-tilt function, the optical axis AX2 is parallel or substantially parallel to the light incident surface 10A and intersects with the normal to the transparent substrate 31 at a predetermined pre-tilt angle in the region closer to the alignment film 35. In other words, the optical axis AX2 is orthogonal or substantially orthogonal to the linear light source in the region closer to the alignment film 35 upon no voltage application.

In the polymer region 34A, the direction of the optical axis AX1 varies in the rising direction from the alignment film 33 side toward the alignment film 35 side irrespective of whether a voltage is applied or not. In particular, the optical axis AX1 is parallel or substantially parallel to the light incident surface 10A and is parallel or substantially parallel to the surface of the transparent substrate 31 in the region closer to the alignment film 33. In other words, the optical axis AX1 is parallel or substantially parallel to the linear light source and is parallel or substantially parallel to the optical axis AX2 in the region closer to the alignment film 33 upon no voltage application. When the alignment film 33 has the pre-tilt function, the optical axis AX1 is parallel or substantially parallel to the light incident surface 10A and intersects with the surface of the transparent substrate 31 at a predetermined pre-tilt angle. In other words, also in this case, the optical axis AX1 is parallel or substantially parallel to the optical axis AX2 in the region closer to the alignment film 33 upon no voltage application. Also, the optical axis AX1 is parallel or substantially parallel to the normal to the transparent substrate 31 in the region closer to the alignment film 35. In other words, the optical axis AX1 is parallel or substantially parallel to the normal to the transparent substrate 31 and is parallel or substantially parallel to the optical axis AX2 in the region closer to the alignment film 35 upon no voltage application. When the vertical alignment film has the pre-tilt function, the optical axis AX1 is parallel or substantially parallel to the light incident surface 10A and intersects with the normal to the transparent substrate 31 at a predetermined pre-tilt angle in the region closer to the alignment film 35. In other words, also in this case, the optical axis AX1 is parallel or substantially parallel to the optical axis AX2 in the region closer to the application film 35 upon no voltage application.

Figure 10:
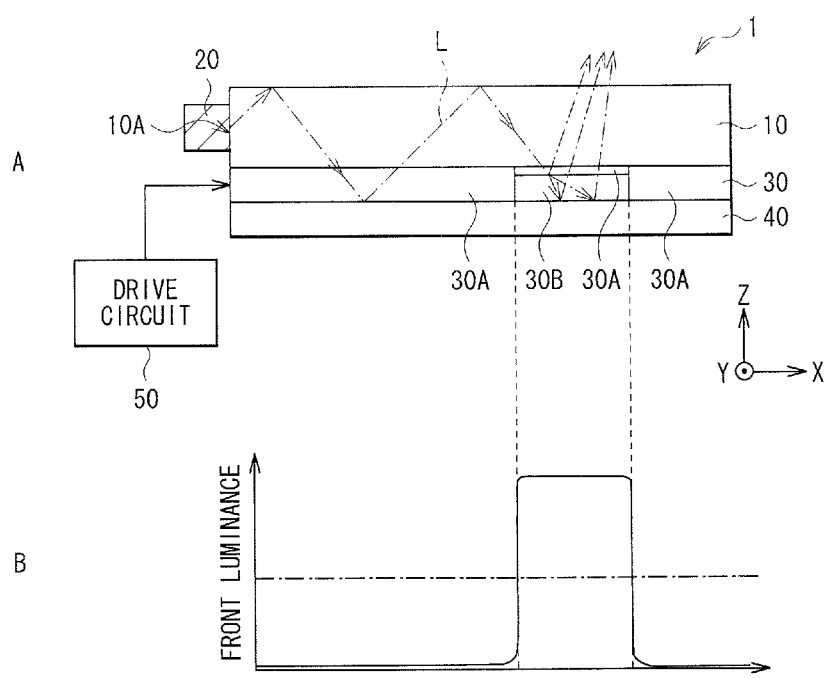
FIG. 10 is a diagram schematically illustrating an example of a function of the illumination unit in FIG. 1.

It is preferable that an ordinary refractive index of the polymer region 34A be the same as that of the liquid crystal region 34B and an extraordinary refractive index of the polymer region 34A be the same as that of the liquid crystal region 34B. In this case, for example, there is almost no refractive index difference in all directions and high transparency is obtained upon no voltage application. Therefore, for example, light from the light source 20 passes through the light modulation layer 34 without being scattered in the light modulation layer 34. As a result, for example, as shown in FIGS. 10A and 10B, light L (light from an oblique direction) from the light source 20 propagates in a region (transparent region 30A) that has been transparent in the light modulation device 30 and is totally reflected by an interface of the light modulation device 30 and the air. Therefore, luminance (luminance in black display) in the transparent region 30A is decreased compared to a case where luminance is uniform (shown by dashed-dotted line in FIG. 8B). It is to be noted that a graph shown in FIG. 10B is a result of measuring front luminance in a state where a diffusion sheet (not illustrated) is disposed on the light guide plate 10 as shown in FIG. 10A.

Moreover, the polymer region 34A and the liquid crystal regions 34B may have, for example, a configuration in which the directions of the optical axis AX1 and the optical axis AX2 are different from each other (intersect with each other, or are orthogonal to each other) in the region closer to the alignment film 33 upon voltage application, as shown in FIG. 9. Further, the polymer region 34A and the liquid crystal regions 34B may have, for example, a configuration in which the directions of the optical axis AX1 and the optical axis AX2 coincide or substantially coincide with each other in the region closer to the alignment film 35 upon voltage application, as shown in FIG. 9. In particular, in the liquid crystal region 34B, the optical axis AX2 is parallel or substantially parallel to the light incident surface 10A and is parallel or substantially parallel to the normal to the transparent substrate 31 in both regions closer to the alignment film 33 and closer to the alignment film 35 upon voltage application. On the other hand, in the polymer region 34A, the optical axis AX1 is parallel or substantially parallel to the light incident surface 10A and is parallel or substantially parallel to the surface of the transparent substrate 31, irrespective of whether a voltage is applied or not as described above. Further, in the polymer region 34A, the optical axis AX1 is parallel or substantially parallel to the normal to the transparent substrate 31 in the region closer to the alignment film 35 irrespective of whether a voltage is applied or not.

Accordingly, in a portion of the light modulation layer 34 closer to the alignment film 33, the refractive index difference becomes large in all directions and high scattering characteristics are obtained upon voltage application. Also, in a portion of the light modulation layer 34 closer to the alignment film 35, there is almost no refractive index difference in all directions upon voltage application. Therefore, light from the light source 20 is scattered by the portion of the light modulation layer 34 closer to the alignment film 33 and passes through the portion of the light modulation layer 34 closer to the alignment film 35.

As a result, for example, as shown in FIGS. 10A and 10B, the light L from the light source 20 is scattered in a region (scattering region 30B) in a scattering state of the light modulation layer 34, and the scattered light directly enters the light guide plate 10, or enters the light guide plate 10 after being reflected by the reflective plate 40, and is emitted from the top face (light emission face) of the light guide plate 10. Therefore, luminance in the scattering region 30B becomes extremely high compared to a case where luminance is uniform (dashed-dotted line in FIG. 10B), and further, partial luminance in white display (luminance enhancement) is increased in proportion to the decreased amount of luminance in the region with no voltage application. It is to be noted that, since the portion of the light modulation layer 34 closer to the alignment film 35 is the transparent region 30A, compared to a case in which the light modulation layer 34 in whole of the thickness direction is the scattering region 30B, a ratio at which the light L from the light source 20 is changed to a scattered light is smaller in proportion to the amount of the transparent region 30A.

In the scattering region 30B included in the light modulation cell 30-1 to which a voltage is applied, an intersection angle of the optical axis AX1 and the optical axis AX2 gradually varies from around 90° to around 0°, from the alignment film 33 side toward the alignment film 35 side, in the vicinity (hereinafter, referred to as "intersection angle displacement region") of the transparent region 30A. Therefore, in the intersection angle displacement region, scattering characteristics with respect to light traveling in the direction that is orthogonal to the light incident surface 10A vary from the alignment film 33 side toward the alignment film 35 side. Specifically, magnitude of scattering with respect to light that propagates in the direction that is orthogonal to the light incident surface 10A decreases from the alignment film 33 side toward the alignment film 35 side. Further, in the intersection angle displacement region, scattering characteristics of light that travels in a direction that is parallel or substantially parallel to the light incident surface 10A and is parallel or substantially parallel to the surface of the transparent substrate 31 also vary from the alignment film 33 side toward the alignment film 35 side. Specifically, magnitude of scattering with respect to light that travels in a direction that is parallel or substantially parallel to the light incident surface 10A and is parallel or substantially parallel to the surface of the transparent substrate 31 decreases from the alignment film 33 side toward the alignment film 35 side.

As described above, in the present embodiment, not only the scattering region 30B but also the transparent region 30A exists in the light modulation cell 30-1 to which a voltage is applied. Further, in the present embodiment, the scattering region 30B in the light modulation cell 30-1 to which a voltage is applied includes a region in which the intersection angle of the optical axes AX1 and AX2 is 90° or substantially 90°, and the intersection angle displacement region in which the intersection angle of the optical axes AX1 and AX2 varies from around 90° to around 0° from the alignment film 33 side toward the alignment film 35 side.

It is to be noted that ordinary refractive indices of the polymer region 34A and the liquid crystal region 34B may be different in some degree, for example, due to manufacturing error, and, for example, is preferably 0.1 or smaller, and more preferably 0.05 or smaller. Also, extraordinary refractive indices of the polymer region 34A and the liquid crystal region 34B may be different in some degree, for example, due to manufacturing error, and is, for example, preferably 0.1 or smaller, and more preferably 0.05 or smaller.

Moreover, it is preferable that a refractive index difference (=extraordinary refractive index−ordinary refractive index) of the polymer region 34A, a refractive index difference (=extraordinary refractive index−ordinary refractive index) of the liquid crystal region 34B, etc. be as large as possible. The foregoing refractive index differences are preferably 0.05 or larger, more preferably 0.1 or larger, and further more preferably 0.15 or larger. One reason for this is that, in the case where the refractive index differences of the polymer region 34A and the liquid crystal region 34B are large, scattering performance of the light modulation layer 34 is high, which leads to easy destruction of light guiding conditions, and thereby, light from the light guide plate 10 is easily extracted.

The drive circuit 50 controls a voltage to be applied to the pair of electrodes (sub-electrodes 32A and 36A) in each light modulation cell 30-1, and thereby controls light emission and non-light-emission of each light modulation cell 30-1.

[Anisotropic Scattering]

Next, anisotropic scattering in the present embodiment is described. In the present embodiment, anisotropic scattering is caused by (a) non-uniformity in existence probability of the interfaces (scattering interfaces) of the polymer region 34A and the liquid crystal regions 34B in the scattering region 30B and (b) birefringence in the scattering region 30B. Therefore, description will be given in detail below of the non-uniformity in the existence probability of the scattering interfaces in the scattering region 30B and of the birefringence in the scattering region 30B.

[Non-uniformity of Existence Probability of Scattering Interface]

In the scattering region 30B, the interfaces of the polymer region 34A and the liquid crystal regions 34B are arranged densely in the direction that is orthogonal to the alignment direction of the alignment film 33, and are arranged sparsely in the direction that is parallel to the alignment direction of the alignment film 33. The direction that is orthogonal to the alignment direction of the alignment film 33 refers to a direction (hereinafter, referred to as "first direction") that is perpendicular to the light incident surface 10A or a direction (hereinafter, referred to as "third direction") that is perpendicular to the transparent substrate 31. The direction that is parallel to the alignment direction of the alignment film 33 refers to a direction (hereinafter, referred to as "second direction") that is parallel to the light incident surface 10A and is parallel to the surface of the transparent substrate 31. Therefore, light that propagates in the first direction or in the third direction enters the interface with a cycle of average streaky organization size in the minor-axis direction of the streaky structure in the polymer region 34A, and therefore, is largely scattered. On the other hand, light that propagates in the second direction in the scattering region 30B enters the interface with a cycle of average streaky organization size in the major-axis direction of the streaky structure in the polymer region 34A, and therefore, is not scattered much.

[Birefringence]

Further, in the scattering region 30B, light that propagates in the first direction propagates while being influenced by a difference between the extraordinary refractive index of the liquid crystal region 34B and the ordinary refractive index of the polymer region 34A and by a difference between the ordinary refractive index of the liquid crystal region 34B and the extraordinary refractive index of the polymer region 34A, with the cycle of the average streaky organization size in the minor-axis direction of the streaky structure in the polymer region 34A. Therefore, the light that propagates in the first direction in the scattering region 30B is largely scattered.

On the other hand, in the scattering region 30B, light that propagates in the second direction or in the third direction propagates while being influenced only by the difference between the ordinary refractive index of the liquid crystal region 34B and the extraordinary refractive index of the polymer region 34A or by the difference between the extraordinary refractive index of the liquid crystal region 34B and the ordinary refractive index of the polymer region 34A, with the cycle of the average streaky organization size in the minor-axis direction or in the major-axis direction of the streaky structure in the polymer region 34A. As a result, in the scattering region 30B, scattering of the light that propagates in the second direction or in the third direction is smaller than that of the light that propagates in the first direction.

In other words, in the scattering region 30B (when the light modulation layer 34 exhibits scattering characteristics), the light modulation layer 34 has a configuration that exhibits anisotropic scattering in which scattering (hereinafter, referred to as "first scattering") with respect to light that propagates in the first direction is larger than scattering (hereinafter, referred to as "second scattering") with respect to light that propagates in the second direction. Also, in the scattering region 30B (when the light modulation layer 34 exhibits scattering characteristics), the light modulation layer 34 has a configuration that exhibits anisotropic scattering in which scattering (hereinafter, referred to as "third scattering") with respect to light that propagates in the third direction is larger than the second scattering.

Here, magnitude of the first scattering, magnitude of the second scattering, and magnitude of the third scattering are represented by A, B, and C, respectively. Further, when the optical axis AX1 is in the direction of the normal to the transparent substrate 31 and the optical axis AX2 is in a direction that is parallel to the light incident surface 10A and is orthogonal to the optical axis AX1, magnitude of scattering with respect to light that propagates in the direction that is perpendicular to the light incident surface 10A is represented by A1. Further, when the optical axis AX1 is in the direction of the normal to the transparent substrate 31 and the optical axis AX2 is in a direction that is parallel to the light incident surface 10A and is orthogonal to the optical axis AX1, magnitude of scattering with respect to light that propagates in a direction that is parallel to the light incident surface 10A and is parallel to the surface of the transparent substrate 31 is represented by B1. At this time, the light modulation layer 34 has a configuration that satisfies at least the latter expression of the following two expressions when the light modulation layer 34 exhibits scattering characteristics.

$A > C > B$ $A/B < A1/B1$

Next, description will be given of advantages in a case where the light modulation layer 34 exhibits such anisotropic scattering. A light modulation layer that has optical isotropy exhibits isotropic scattering characteristics. If such a light modulation layer is used instead of the light modulation layer 34 in the present embodiment, light that is scattered in a direction that is parallel to an in-plane direction of the light guide plate 10 is increased and probability of changing a propagating direction of light before destroying a light guide condition is decreased. On the other hand, in the present embodiment, as can be seen from the above-described expressions, light that has entered the light modulation layer 34 is well scattered in the direction that is perpendicular to the top face of the light guide plate 10, and therefore, is scattered preferentially in a direction in which the light guiding condition is destroyed. Accordingly, it is considered that the light modulation layer 34 exhibits anisotropic scattering, and therefore, efficiency of extracting light from the light guide plate 10 is increased.

In terms of increasing scattering characteristics of guided light, the average streaky organization size in the minor-axis direction in the polymer region 34A is preferably from 0.1 μm to 10 μm both inclusive, and is more preferably in a range from 0.2 μm to 2.0 μm both inclusive.

Next, description will be given of a difference between anisotropic scattering in the light modulation device 30 according to the present embodiment and anisotropic scattering in a light modulation device according to a comparative example.

Figure 11:
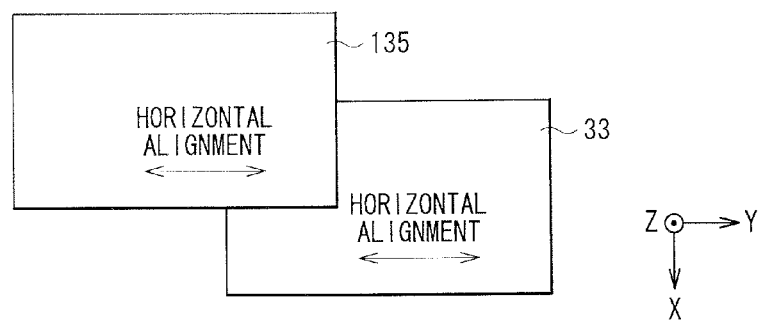
FIG. 11 is a plan view illustrating alignment directions of alignment films according to a comparative example.
Figure 12:
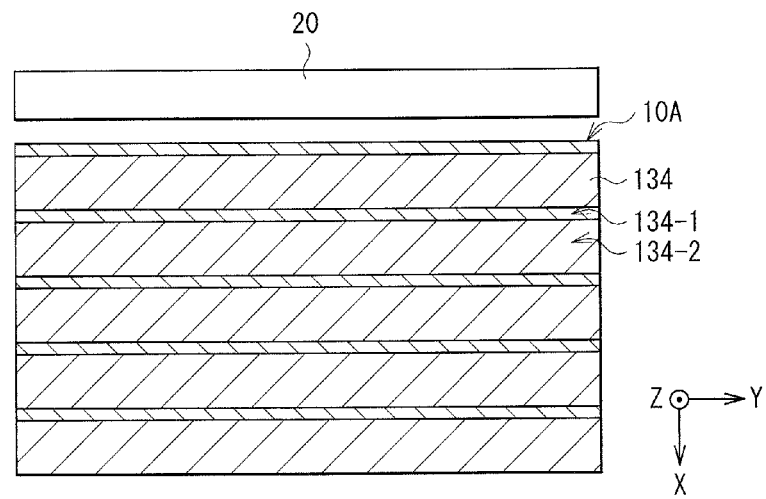
FIG. 12 is a diagram illustrating an example of a cross-sectional configuration in an XY plane of a light modulation layer according to the comparative example.

First, the light modulation device according to the comparative example will be described. FIG. 11 illustrates a pair of alignment films 33 and 135 in the light modulation device according to the comparative example. FIG. 12 illustrates an example of a cross-sectional configuration in the XY plane of the light modulation layer 134 in the light modulation device according to the comparative example. The light modulation device according to the comparative example corresponds to a light modulation device that includes the alignment film 135 and the light modulation layer 134 instead of the alignment film 35 and the light modulation layer 34, respectively, in the light modulation device 30 according to the present embodiment.

The alignment film 135 has a configuration same as that of the alignment film 33 and is specifically a horizontal alignment film that has an alignment direction in the direction that is parallel to the light incident surface 10A (Y axis). The light modulation layer 134 includes a polymer region 134-1 and a liquid crystal region 134-2. The polymer region 134-1 and the liquid crystal region 134-2 both extend, for example, in the direction that is parallel to the light incident surface 10A and is parallel to the surface of the transparent substrate 31, as schematically illustrated in FIG. 12. The polymer region 134-1 and the liquid crystal region 134-2 both may extend, for example, continuously or discontinuously from one end to the other end of the light modulation layer 134. Proportion of the polymer region 134A in the light modulation layer 134 is constant irrespective of distance from the light source 20.

Figure 13:
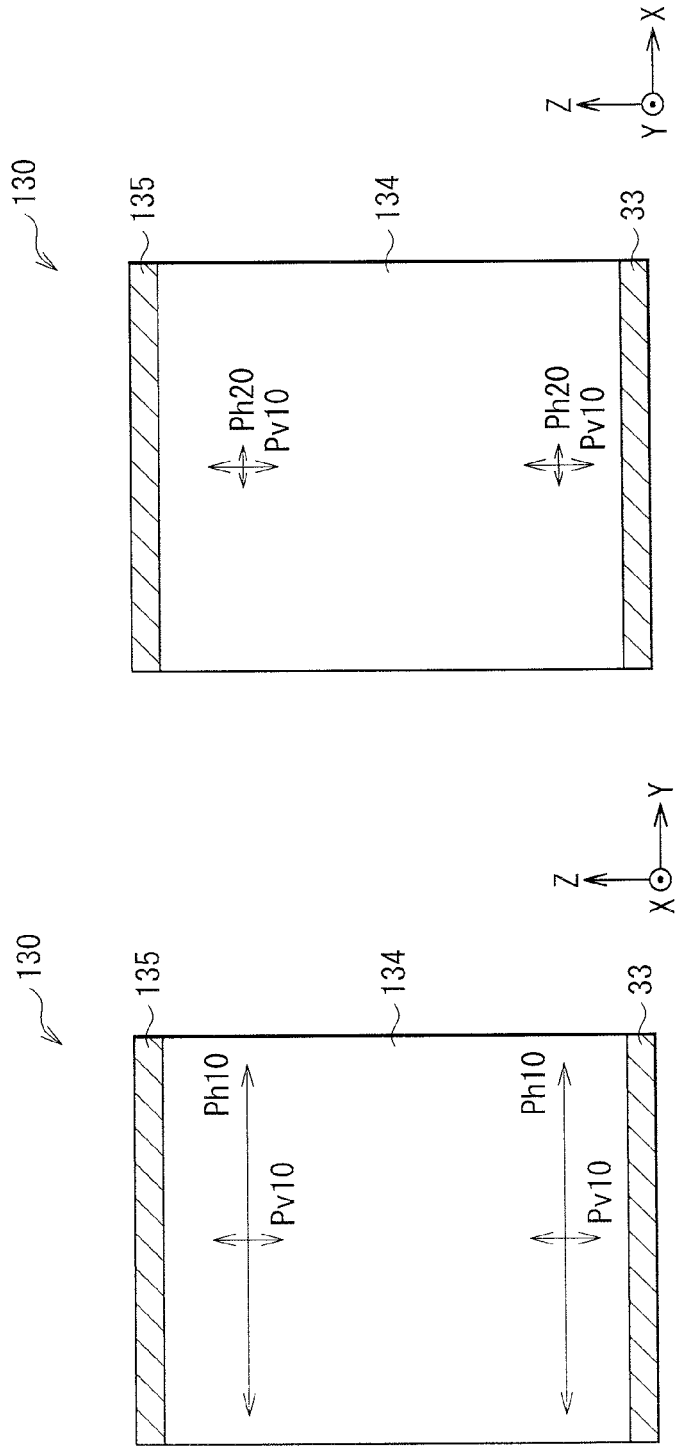
FIGS. 13A and 13B are diagrams illustrating an example of structural cycles in the light modulation layer in FIG. 12.

FIGS. 13A and 13B illustrate structural cycles in the X-axis direction, in the Y-axis direction, and in the Z-axis direction in the light modulation layer 134. The light modulation layer 134 may have, for example, a regular structure having a cycle Ph20 (=Ph3) in the X-axis direction, a cycle Ph10 (=Ph1) in the Y-axis direction, and a cycle Pv10 (=Pv1) in the Z-axis direction irrespective of a position in the light modulation layer 134, as shown in FIGS. 13A and 13B. The alignment films 33 and 135 both have an alignment direction in the direction that is parallel to the light incident surface 10A (Y axis). The polymer region 134-1 and the liquid crystal region 134-2 both extend in the direction that is parallel to the light incident surface 10A (Y axis). Therefore, the interfaces of the polymer region 134-1 and the liquid crystal regions 134-2 are formed densely in the minor-axis direction of the polymer region 134-1 and are formed sparsely in the major-axis direction of the polymer region 134-1. Accordingly, the cycles Ph20 and Pv10 are short and the cycle Ph10 is long.

Figure 14:
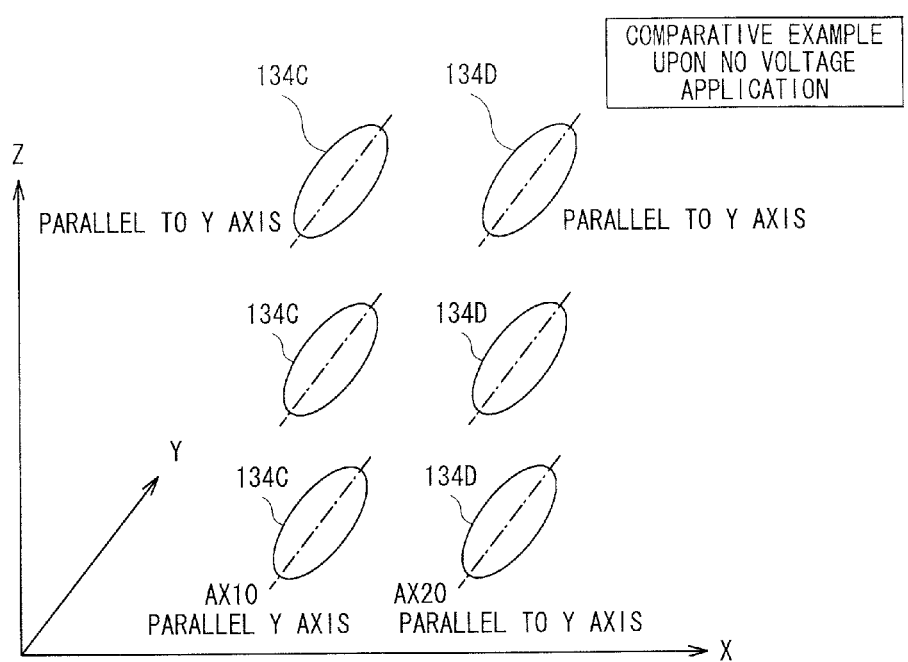
FIG. 14 is a diagram schematically illustrating an example of functions of a light modulation device according to the comparative example.
Figure 15:
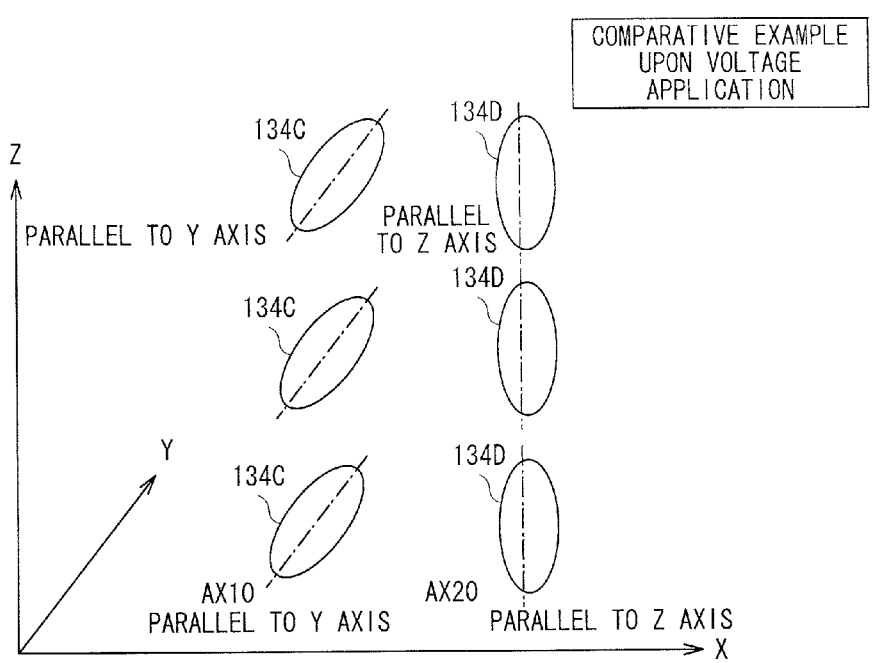
FIG. 15 is a diagram schematically illustrating another example of the function of the light modulation device according to the comparative example.

FIG. 14 schematically illustrates an example of alignment states in the polymer region 134-1 and the liquid crystal region 134-2 upon no voltage application. Ellipsoids 134C in FIG. 14 each illustrate an example of a refractive index ellipsoid that shows refractive index anisotropy of the polymer region 134-1 upon no voltage application. A shape and size of the ellipsoid 134C in FIG. 14 are the same as those of the ellipsoid 134A in FIG. 8. Ellipsoids 134D in FIG. 14 each illustrate an example of a refractive index ellipsoid that shows refractive index anisotropy of the liquid crystal region 134-2 upon no voltage application. A shape and size of the ellipsoid 134D in FIG. 14 are the same as those of the ellipsoid 134B in FIG. 8. FIG. 15 schematically illustrates an example of alignment states in the polymer region 134-1 and the liquid crystal region 134-2 upon voltage application. The ellipsoids 134C in FIG. 15 each illustrate an example of a refractive index ellipsoid that shows refractive index anisotropy of the polymer region 134-1 upon voltage application. The ellipsoids 134D in FIG. 15 each illustrate an example of a refractive index ellipsoid that shows refractive index anisotropy of the liquid crystal region 134-2 upon voltage application.

The polymer region 134-1 and the liquid crystal region 134-2 may have, for example, a configuration in which an optical axis AX10 (in particular, a major axis of the ellipsoid 134C) of the polymer region 134-1 and an optical axis AX20 (in particular, a major axis of the ellipsoid 134D) have directions that are parallel to each other upon no voltage application, as shown in FIG. 14. At this time, the optical axes 10 and 20 are both parallel to the light incident surface 10A and are parallel to the surface of the transparent substrate 31.

Accordingly, upon no voltage application, there is almost no refractive index difference in all direction and high transparency is obtainable in the light modulation layer 134. Therefore, for example, light that travels in a front direction and in an oblique direction is not scattered in the light modulation layer 134 and passes through the light modulation layer 134. As a result, for example, light from the light source 20 (light from an oblique direction) propagates in a region (transparent region) that has been transparent in the light modulation layer 134, and is totally reflected by the interface of the light modulation device and the air. Therefore, luminance (luminance in black display) in the transparent region is decreased compared to a case in which luminance is uniform.

The polymer region 134-1 and the liquid crystal region 134-2 may have, for example, a configuration in which the direction of the optical axes AX10 and AX20 are orthogonal to each other upon voltage application as shown in FIG. 15. At this time, the optical axis AX10 is parallel to the light incident surface 10A and is parallel to the surface of the transparent substrate 31. Further, the optical axis AX20 is parallel to the light incident surface 10A and is parallel to the normal to the transparent substrate 31.

Accordingly, upon voltage application, the refractive index difference is increased in all directions in the light modulation layer 134, and high scattering characteristics are thereby obtained. Therefore, light from the light source 20 is scattered in the light modulation layer 134. As a result, for example, light from the light source 20 is scattered in a region (scattering region) in a scattering state in the light modulation layer 134, and the scattered light directly enters the light guide plate 10 or enters the light guide plate 10 after being reflected by the reflective plate 40, and is emitted from a top face (light emission face) of the illumination unit. Accordingly, luminance in the scattering region is extremely high compared to that in the case of uniform luminance and partial luminance in white display (luminance enhancement) is increased in proportion to the decreased amount of luminance in the transparent region.

Next, magnitude of anisotropic scattering will be described.

Magnitude of anisotropy of scattering refers to a quotient of three axes of magnitude of scattering with respect to light that propagates in the first direction (X-axis direction), magnitude of scattering with respect to light that propagates in the second direction (Y-axis direction), and magnitude of scattering with respect to light that propagates in the third direction (Z-axis direction). A difference between the three axes specifically refers to sum of the following three ((A) to (C)). Anisotropy of scattering is large when the quotient of the three axes is large and anisotropy of scattering is small when the quotient of the three axes is small. In other words, anisotropy of scattering is larger as the quotient of the three axes is away from 1 and anisotropy of scattering is smaller as the quotient of the three axes is close to 1. It is assumed that a value of numerator is larger than a value of denominator in the following (A) to (C). Therefore, in an example where the value of the numerator is smaller than the value of the denominator, it is preferable to exchange the values of the numerator and the denominator in the following (A) to (C).

(A) (magnitude of scattering with respect to light that propagates in the first direction)/(magnitude of scattering with respect to light that propagates in the second direction)

(B) (magnitude of scattering with respect to light that propagates in the third direction)/(magnitude of scattering with respect to light that propagates in the second direction)

(C) (magnitude of scattering with respect to light that propagates in the first direction)/(magnitude of scattering with respect to light that propagates in the third direction)

Magnitude of anisotropy of scattering is determined by (a) non-uniformity in existence probability of the interfaces (scattering interfaces) of the polymer region 34A and the liquid crystal regions 34B in the scattering region 30B and (b) birefringence in the scattering region 30B. In magnitude of anisotropy of scattering, the above-described component (a) is dominant. One reason for this is that, when considering existence probability of scattering interfaces, the same media is ideally continued in the second direction, and therefore scattering is not caused in the second direction and is caused only in the first direction and in the third direction. At this time, scattering in the second direction is theoretically zero. Therefore, scattering ratio between the second direction and the first and third directions becomes infinite. On the other hand, when considering birefringence, two polarization components are scattered in the first direction but only one polarization component is scattered in the second direction and in the third direction. At this time, the scattering ratio between the first direction and the second and third directions is merely 2:1. Therefore, the above-described component (a) is dominant in magnitude of anisotropy of scattering. Therefore, description will be given below of a relationship between existence probability of scattering interfaces and magnitude of anisotropy of scattering, and description of a relationship between birefringence and magnitude of anisotropy of scattering will be omitted.

Magnitude of anisotropy of scattering corresponds to a quotient of three axes of a cycle in the first direction in the light modulation layer 34, a cycle in the second direction in the light modulation layer 34, and a cycle in the third direction in the light modulation layer 34. The quotient of the three axes specifically refers to sum of the following three ((D) to (F)). It is assumed that a value of numerator is larger than a value of denominator in the following (D) to (F). Therefore, in an example where the value of the numerator is smaller than the value of the denominator, it is preferable to exchange the values of the numerator and the denominator in the following (D) to (F).

(D) (cycle in the second direction in the light modulation layer 34)/(cycle in the first direction in the light modulation layer 34)

(E) (cycle in the second direction in the light modulation layer 34)/(cycle in the third direction in the light modulation layer 34)

(F) (cycle in the third direction in the light modulation layer 34)/(cycle in the first direction in the light modulation layer 34)

Magnitude of anisotropy of scattering in the scattering region 30B in the vicinity of the alignment film 33 is a value corresponding to Ph1/Ph3+Ph1/Pv1+Pv1/Ph3. On the other hand, magnitude of anisotropy of scattering in the scattering region 30B in the vicinity of the alignment film 35 is a value corresponding to Ph2/Ph4+Ph2/Pv2+Pv2/Ph4. Here, the cycles may be, for example, in the following relationship.

$$Ph2/Ph4 < Ph1/Ph3 = Ph10/Ph20$$

$$Ph2/Pv2 < Ph1/Pv1 = Ph10/Pv10$$

$$Pv2/Ph4 > Pv1/Ph3 = Pv10/Ph20$$

$$Ph2/Ph4 - Pv1/Ph3 = Ph2/Ph4 - Pv10/Ph20 < Ph1/Ph3 - Ph2/Ph4$$

At this time, the light modulation layer 34 is so formed that, when the light modulation layer 34 exhibits scattering characteristics, magnitude (A/B) of anisotropy of scattering of the light modulation layer 34 is smaller than magnitude (A1/B1) of anisotropy of scattering of the light modulation layer 134.

Anisotropy of scattering is different between in the light modulation layer 34 and in the light modulation layer 134. One reason for this is that the direction of the optical axis AX1 varies in the thickness direction of the light modulation layer 34 in the light modulation layer 34. Specifically, anisotropy of scattering in a portion of the light modulation layer 34 closer to the alignment film 35 is smaller than that of a portion of the light modulation layer 34 closer to the light alignment film 33. In the present embodiment, as a method of varying the direction of the optical axis AX1 in the thickness direction of the light modulation layer 34, a horizontal alignment film is used as the alignment film 33 on the transparent substrate 31 side and a vertical alignment film is used as the alignment film 35 on the transparent substrate 37 side.

[Manufacturing Method]

Description will be given of a method of manufacturing the illumination unit 1 of the present embodiment with reference to FIGS. 16A to 18C.

Figure 16A:
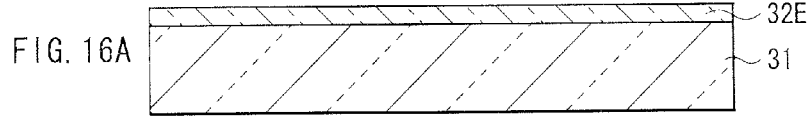
FIGS. 16A to 16C are diagrams illustrating an example of a method of manufacturing the light modulation device in FIG. 1.
Figure 16B:
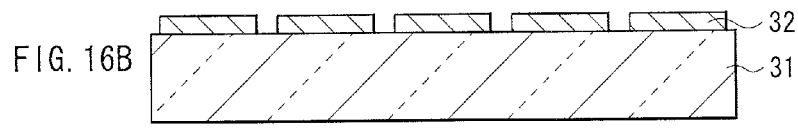

First, a transparent conductive film 32E made of a material such as ITO is formed on the transparent substrate 31 made of a glass substrate or a plastic film substrate (FIG. 16A). Subsequently, a patterned resist layer (not illustrated) is formed on the transparent conductive film 32E, and then, the transparent conductive film 32E is selectively etched using the resist layer as a mask. As a result, the lower electrode 32 is formed (FIG. 16B).

Figure 16C:
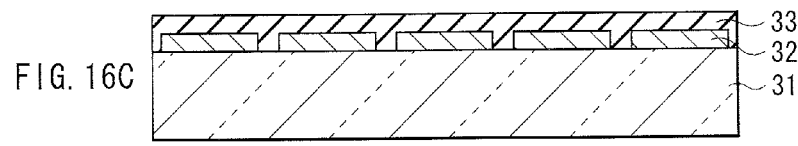

Subsequently, the alignment film 33 is applied on the entire surface, which is dried and burned (FIG. 16C). When a polyimide-based material is used as the alignment film 33, NMP (N-methyl-2-pyrrolidone) is often used as a solvent. In this case, a temperature of about 200° C. is necessary under atmosphere. It is to be noted that, in this case, when a plastic substrate is used as the transparent substrate 31, the alignment film 33 may be dried in a vacuum at 100° C. and burned. Thereafter, the alignment film 33 is subjected to a rubbing process. Thus, the alignment film 33 functions as an alignment film for horizontal alignment.

Figure 17A:
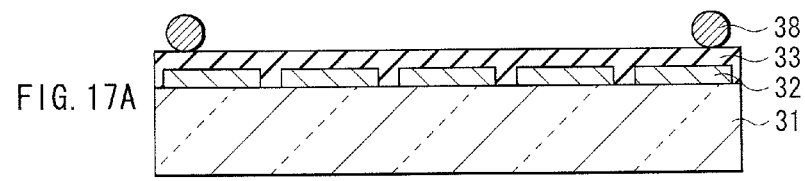
FIGS. 17A to 17C are diagrams illustrating manufacturing processes following that in FIG. 16C.

Subsequently, the spacer 38 for forming a cell gap is dispersed by a dry or wet method on the alignment film 33 (FIG. 17A). It is to be noted that, when the light modulation cell 30-1 is formed by a vacuum bonding method, the spacer 38 may be mixed in a mixture to be dripped. Also, a column spacer may be formed by photolithography instead of the spacer 38.

Figure 17B:
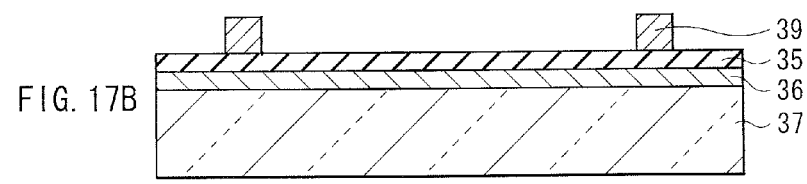

Subsequently, a sealant pattern 39 for bonding and preventing leakage of liquid crystals is formed on the alignment film 35 that has been fabricated by a method similar to that described above, which may be applied in a frame-like shape, for example (FIG. 17B). The sealant pattern 39 may be formed by a method such as a dispenser method and a screen printing method.

The vacuum bonding method (One Drop Fill method; ODF method) will be described below. However, the light modulation cell 30-1 may be formed by a method such as a vacuum injection method and a roll bonding method.

Figure 17C:
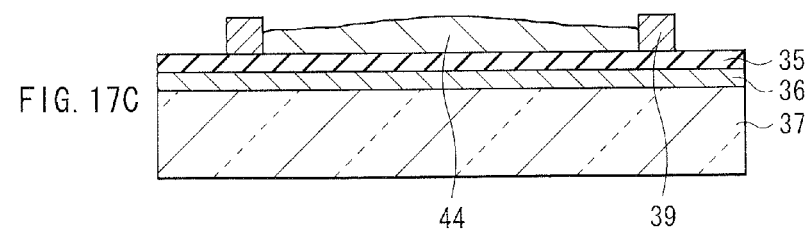

First, a mixture 44 that includes the above-described low-molecular monomers and liquid crystals corresponding to a volume defined by factors such as the cell gap and the cell area is dripped uniformly in a plane (FIG. 17C). It is preferable to use precision dispenser of a linear guide scheme upon dripping the mixture 44. However, a tool such as a die coater may be used utilizing the sealant pattern 39 as a bank.

The foregoing materials may be used as the liquid crystals and the low-molecular monomers. A weight ratio of the liquid crystal and the low-molecular monomer is from 98:2 to 50:50 both inclusive, preferably from 95:5 to 75:25 both inclusive, and more preferably from 92:8 to 85:15 both inclusive. The drive voltage may be decreased by increasing the proportion of liquid crystal. However, when the amount of the liquid crystal is excessively increased, it is likely to be difficult to return to the transparent state. To give an example, whiteness degree upon voltage application may be decreased, or response speed after turning off the voltage may be decreased.

Other than the liquid crystal and the low-molecular monomer, a polymerization initiator is added to the mixture 44. A monomer ratio in the polymerization initiator to be added may be adjusted within a range from 0.1 wt % to 10 wt % both inclusive according to a wavelength of an ultraviolet ray to be used. Other than this, a polymerization inhibitor, a plasticizer, a viscosity adjustor, etc. may be added to the mixture 44 as necessary. When the low-molecular monomer is, for example, in a solid state or in a gel state at room temperature, it is preferable to heat the members such as a cap, a syringe, and the substrates.

Figure 18A:
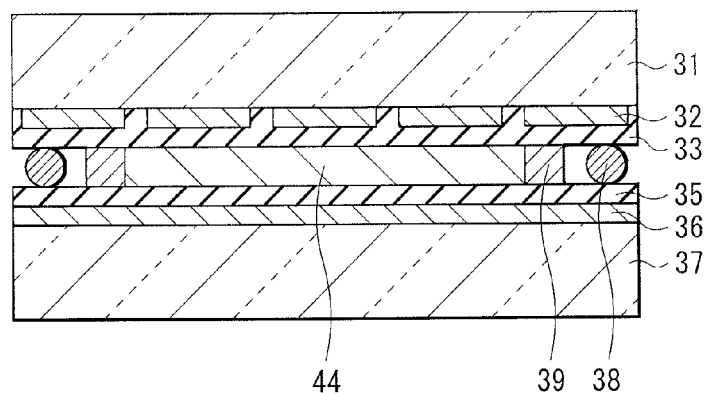
FIGS. 18A to 18C are diagrams illustrating manufacturing processes following that in FIG. 17C.

After the transparent substrate 31 and the transparent substrate 36 are arranged on a vacuum bonding machine (not illustrated), evacuation and bonding are performed (FIG. 18A). Thereafter, the bonded members are released in the atmosphere and the cell gap is uniformized by application of uniform pressure under atmospheric pressure. The cell gap is appropriately selected depending on a relationship between white luminance (whiteness degree) and the drive voltage, and may be from 1 μm to 40 μm both inclusive, preferably from 1 μm to 20 μm both inclusive, and more preferably 1 μm to 10 μm both inclusive.

Figure 18B:
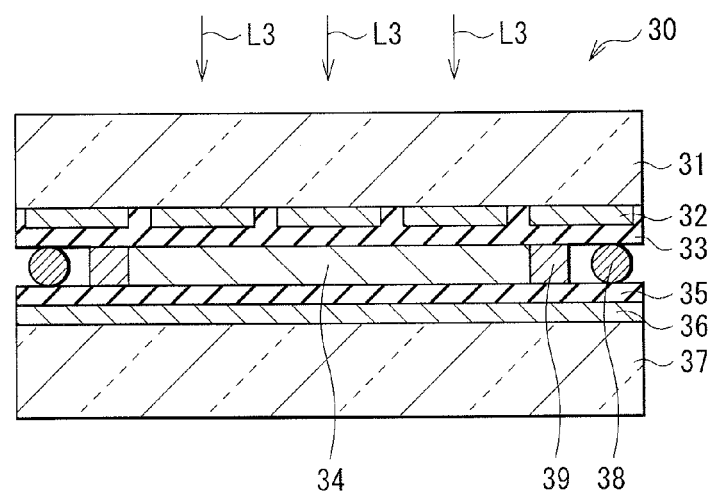

It is preferable to perform an alignment process as necessary after the bonding. When light leakage occurs at the time when the bonded cell is inserted between the crossed-Nicols polarizers, the cell may be subjected to a heating process for a certain time or may be left at room temperature, for example. Thus, the liquid crystals and the low-molecular monomers in the mixture 44 are aligned by the alignment function of the alignment films 33 and 35. Thereafter, an ultraviolet ray L3 is applied thereto to polymerize the low-molecular monomers to be polymers (FIG. 18B). In this manner, the light modulation device 30 including the light modulation layer 34 that satisfies at least one (A/B<A1/B1) of the two expressions (A>C>B and A/B<A1/B1) is manufactured.

It is preferable that the temperature of the cell not be varied during ultraviolet ray irradiation. It may be preferable to use an infrared cut filter or to use a UV-LED as the light source, for example. Ultraviolet irradiation degree influences an organization structure of a composite material. Therefore, it is preferable to appropriately adjust ultraviolet irradiation degree depending on a liquid crystal material to be used, a monomer material to be used, the composition thereof, etc. The ultraviolet irradiation degree may be preferably in a range from 0.1 mW/cm$^2$ to 500 mW/cm$^2$ both inclusive, and more preferably from 0.5 mW/cm$^2$ to 30 mW/cm$^2$ both inclusive. The drive voltage tends to be lower as the ultraviolet irradiation degree is lower and ultraviolet irradiation degree preferable in terms of both productivity and characteristics is selected.

Figure 18C:

Subsequently, the light modulation device 30 is bonded to the light guide plate 10 (FIG. 18C). Bonding may be performed by sticking or adhesion. However, it is preferable to perform sticking or adhesion with use of a material having a refractive index as close as possible to the refractive index of the light guide plate 10 and the refractive index of the substrate material of the light modulation device 30. Lastly, an extraction wiring (not illustrated) is attached to the lower electrode 32 and to the upper electrode 36. Thus, the illumination unit 1 of the present embodiment is manufactured.

In the above description, processes to form the light modulation device 30 and to bond the light modulation device 30 to the light guide plate 10 lastly have been described. However, the transparent substrate 36 provided with the alignment film 35 formed thereon may be bonded in advance to the surface of the light guide plate 10 to form the illumination unit 1. Also, the illumination unit 1 may be formed by either way of a single-wafer processing or a roll-to-roll processing.

[Functions and Effects]

Next, description will be given of functions and effects of the illumination unit 1 of the present embodiment.

In the illumination unit 1 of the present embodiment, for example, a voltage is applied to the pair of electrodes (sub-electrodes 32A and 36A) in each light modulation cell 30-1 so that the optical axis AX2 of the liquid crystal region 34B is parallel or substantially parallel to the optical axis AX1 of the polymer region 34A in one light modulation cell 30-1, and the optical axis AX2 of the liquid crystal region 34B intersects with or is orthogonal to the optical axis AX1 of the polymer region 34A in a part of another light modulation cell 30-1. Accordingly, light that is emitted from the light source 20 and enters inside of the light guide plate 10 passes through the transparent region 30A in the light modulation device 30 in which the optical axis AX1 is parallel or substantially parallel to the optical axis AX2. On the other hand, light that is emitted from the light source 20 and enters the inside of the light guide plate 10 is scattered in the scattering region 30B in the light modulation device 30 in which the optical axis AX1 intersects with or is orthogonal to the optical axis AX2. Out of the scattered light, light that has passed through a bottom face of the scattering region 30B is reflected by the reflective plate 40 and is returned to the light guide plate 10 again, and then, is emitted from the top face of the illumination unit 1. Further, out of the scattered light, light that has traveled toward the top face of the scattering region 30B passes through the light guide plate 10 and then is emitted from the top face of the illumination unit 1. In this manner, in the present embodiment, light is hardly emitted from the top face in a portion in which the light modulation cell 30-1 is formed only of the transparent region 30A, and light is selectively emitted only from the top face of the scattering region 30B. This increases modulation ratio in the front direction.

In general, a PDLC is formed by mixing a liquid crystal material with an isotropic low-molecular material and causing phase separation by ultraviolet irradiation or drying the solvent, for example, and is formed as a composite layer in which microparticles of the liquid crystal material are dispersed in the polymer material. The liquid crystal material in the composite layer exhibits scattering characteristics upon no voltage application since the liquid crystals are aligned in random directions, but exhibits high transparency in the front direction (the direction of a normal to the PDLC) when an ordinary refractive index of the liquid crystal material is the same as a refractive index of the polymer material since the liquid crystals are aligned in an electric-field direction upon voltage application. However, in the liquid crystal material, a difference between an extraordinary refractive index of the liquid crystal material and the refractive index of the polymer material is remarkable in the oblique direction. Therefore, scattering characteristics are exhibited in the oblique direction even when transparency is exhibited in the front direction.

Usually, a light modulation device using the PDLC often has a configuration in which the PDLC is sandwiched between two glass plates provided with transparent conductive films formed on surfaces thereof. When light obliquely enters from the air to the light modulation device having the above-described configuration, the light that has entered from the oblique direction is refracted due to a refractive index difference between air and the glass substrate and enters the PDLC at a smaller angle. Therefore, large scattering is not caused in such a light modulation device. For example, when light enters from the air at an angle of 80°, the angle of incidence of the light entering the PDLC is reduced to about 40° due to refraction at the glass interface.

However, in an edge-light scheme using a light guide plate, light enters through the light guide plate, and therefore light crosses through the inside of the PDLC at a large angle of about 80°. Therefore, a difference between an extraordinary refractive index of a liquid crystal material and a refractive index of a polymer material is large, and further, light crosses through the inside of the PDLC at a larger angle. Therefore, a light path to be scattered is long. For example, when microparticles of a liquid crystal material having an ordinary refractive index of 1.5 and having an extraordinary refractive index of 1.65 are dispersed in a polymer material having a refractive index of 1.5, there is no refractive index difference in the front direction (the direction of the normal to the PDLC) but a refractive index difference is large in the oblique direction. Therefore, scattering characteristics in the oblique direction are not reduced. Accordingly, viewing angle characteristics are not favorable. Further, when an optical film such as a diffusion film is provided on the light guide plate, light leaked in the oblique direction is diffused also in the front direction by a member such as a diffusion film. Therefore, leakage of light in the front direction is increased and the modulation ratio in the front direction is decreased.

In contrast, in the present embodiment, the polymer region 34A and the liquid crystal region 34B mainly include optically-anisotropic materials. Therefore, scattering characteristics are small in the oblique direction and transparency is improved. For example, in a region where the polymer region 34A and the liquid crystal region 34B mainly include optically-anisotropic materials that have the same ordinary refractive index and the same extraordinary refractive index, and where a voltage is not applied between the lower electrode 32 and the upper electrode 36, the directions of the optical axes of the polymer region 34A and the liquid crystal region 34B coincide or substantially coincide with each other. Therefore, a refractive index difference is reduced or eliminated in all directions including the front direction (the direction of the normal to the light modulation device 30) and the oblique direction. Therefore, high transparency is obtained. As a result, leakage of light in a range where a viewing angle is large is reduced or substantially eliminated, and viewing angle characteristics are thereby improved.

For example, when liquid crystals having an ordinary refractive index of 1.5 and an extraordinary refractive index of 1.65 and liquid crystalline monomers having an ordinary refractive index of 1.5 and an extraordinary refractive index of 1.65 are mixed and the liquid crystalline monomers are polymerized in a state in which the liquid crystals and the liquid crystalline monomers are aligned by an alignment film or by an electric field, an optical axis of the liquid crystals coincide with an optical axis of a polymer formed by polymerizing the liquid crystalline monomers. The refractive index is thereby allowed to be the same in all directions. Therefore, in such a case, a state with high transparency is achieved and viewing angle characteristics are further improved.

Moreover, in the present embodiment, for example, as shown in FIGS. 10A and 10B, luminance (luminance in black display) in the transparent region 30A is decreased compared to the case of uniform luminance (dashed-dotted line in FIG. 10B). On the other hand, luminance in the scattering region 30B is extremely increased compared to the case of uniform luminance (dashed-dotted line in FIG. 10B), and further, partial luminance in white display (luminance enhancement) is increased in proportion to the decreased amount of luminance in the transparent region 30A.

Incidentally, luminance enhancement is a technique to increase luminance upon partially performing white display compared to the case of performing white display on the entire surface. This is a technique often used in general, for example, in CRT and PDP. However, in a liquid crystal display, a backlight uniformly emits light irrespective of an image, and therefore, luminance is not allowed to be partially increased although, when the backlight is an LED backlight with a plurality of LEDs arranged two-dimensionally, it is possible to turn off the LEDs in part. However, in such a case, there is no diffusion light from a dark region in which the LEDs are turned off. Therefore, luminance is decreased compared to the case of turning on all of the LEDs. Further, it is possible to increase luminance by increasing a current applied to part of the LEDs that are turned on. However, in such a case, a large current flows in extremely short time period. Therefore, some issues remain concerning load on circuits, reliability, etc.

In contrast, in the present embodiment, the polymer region 34A and the liquid crystal region 34B mainly include optically-anisotropic materials. Therefore, scattering characteristics in the oblique direction are suppressed, and therefore leakage of light from the light guide plate in a dark state is small. Accordingly, light is guided from a portion partially in a dark state to a portion partially in a bright state. Therefore, luminance enhancement is achieved without increasing electric power supplied to the illumination unit 1.

Moreover, in the present embodiment, when the liquid crystal molecule included in the liquid crystal region 34B is aligned in a state provided with a pre-tilt angle in a region with no voltage application, the liquid crystal material included in the liquid crystal region 34B is not raised in a random azimuth and is raised in a plane that is parallel to the light incident surface 10A upon voltage application. At this time, the optical axis AX1 of the polymer region 34A intersects with or is orthogonal to the optical axis AX2 of the liquid crystal region 34B, in a plane parallel to the light incident surface 10A. Accordingly, in a region to which a voltage is applied, a refractive index difference is large in all directions including the front direction (the direction of the normal to the light modulation device 30) and the oblique direction, and therefore, high scattering characteristics are obtained. As a result, display luminance is improved. Further, display luminance is further improved due to the above-described effects of luminance enhancement.

Accordingly, in the present embodiment, display luminance is improved while reducing or substantially eliminating leakage of light in a range having a large viewing angle. As a result, modulation ratio in the front direction is increased.

In the above-described PDLC of a horizontal alignment type, the interfaces of the polymer material and the liquid crystal material are formed densely in the minor-axis direction of the streaky structure and are formed sparsely in the major-axis direction of the streaky structure. Therefore, when the streaky structure extends in the direction that is parallel to the linear light source, light that propagates in the above-described minor-axis direction of the streaky structure inside the PDLC enters the interface with the cycle of the average streaky organization size in the minor-axis direction of the streaky structure, and is largely scattered as a result. On the other hand, light that propagates in the above-described major-axis direction of the streaky structure inside the PDLC has little opportunity to enter the interface, and therefore, is not scattered much.

Moreover, light that propagates in a direction that is the minor-axis direction of the streaky structure and is perpendicular to the light incident surface inside the PDLC propagates while being influenced by a difference between an extraordinary refractive index of the liquid crystal material and an ordinary refractive index of the polymer material and by a difference between an ordinary refractive index of the liquid crystal material and an extraordinary refractive index of the polymer material, with the cycle of the average streaky organization size in the minor-axis direction of the streaky structure. On the other hand, light that propagates in the above-described major-axis direction of the streaky structure or in the thickness direction of the PDLC inside the PDLC propagates while being influenced only by a difference between the extraordinary refractive index of the liquid crystal material and the ordinary refractive index of the polymer material or by a difference between the ordinary refractive index of the liquid crystal material and the extraordinary refractive index of the polymer material. Therefore, the light that propagates in a direction that is the minor-axis direction of the streaky structure and is perpendicular to the light incident surface inside the PDLC is largely scattered, and the light that propagates in the above-described major-axis direction of the streaky structure or in the thickness direction of the PDLC inside the PDLC is not scattered much.

As described above, in the PDLC of a horizontal alignment type, there is anisotropy in scattering due to the above-described two factors between light that propagates in a direction that is the minor-axis direction of the streaky structure and is perpendicular to the light incident surface, and light that propagates in a direction that is the minor-axis direction of the streaky structure and is the thickness direction of the PDLC as well as light that propagates in the direction that is parallel to the major-axis direction of the streaky structure. As a result, light that propagates in the thickness direction of the PDLC is preferentially scattered in a direction in which the light guiding condition is destroyed, and light extraction efficiency is increased. Therefore, high luminance and high contrast are obtained.

However, when the PDLC of a horizontal alignment type is applied to a backlight of an edge-light scheme, luminance distribution is likely to be non-uniform due to anisotropy of scattering between light that propagates in the X direction and light that propagates in the Y direction. In particular, when arrangement pitches of respective point light sources in a linear light source are sparse, bright-dark stripes are caused in the vicinity of the linear light source.

In contrast, in the present embodiment, when the light modulation layer 34 exhibits scattering characteristics, magnitude (A/B) of anisotropy of scattering in the light modulation layer 34 is smaller than magnitude (A1/B1) of anisotropy of scattering in the light modulation layer 134. Therefore, anisotropic scattering with respect to light that propagates in the light modulation layer 34 is suppressed more than anisotropic scattering with respect to light that propagates in the light modulation layer 134. Here, the bright-dark stripes due to the arrangement of the light source 20 results from a large difference between the first scattering and the third scattering. Accordingly, contrast in the bright-dark stripes due to the arrangement of the light source 20 is lowered by suppressing the above-described anisotropic scattering in whole of the light modulation layer 34. As a result, uniformity in luminance is improved.

[2. Second Embodiment]

Figure 19:
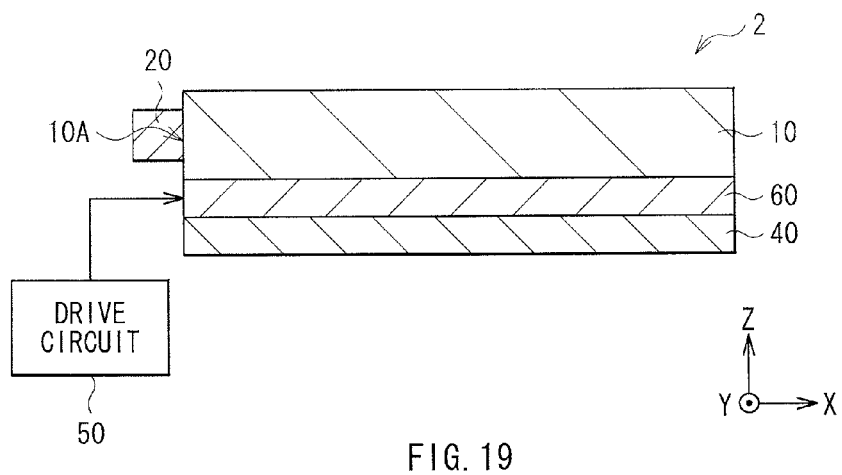
FIG. 19 is a diagram illustrating an example of an outline configuration of an illumination unit according to a second embodiment of the present application.

Next, description will be given of an illumination unit 2 according to a second embodiment of the present application. The illumination unit 2 of the present embodiment is different in configuration from the illumination unit 1 of the above-described embodiment in that a light modulation device 60 is provided instead of the light modulation device 30 as shown in FIG. 19. Therefore, description of matters common to the configuration of the above-described first embodiment will be appropriately omitted and matters different from the configuration of the above-described first embodiment will be mainly described.

[Configuration]

Figure 20:
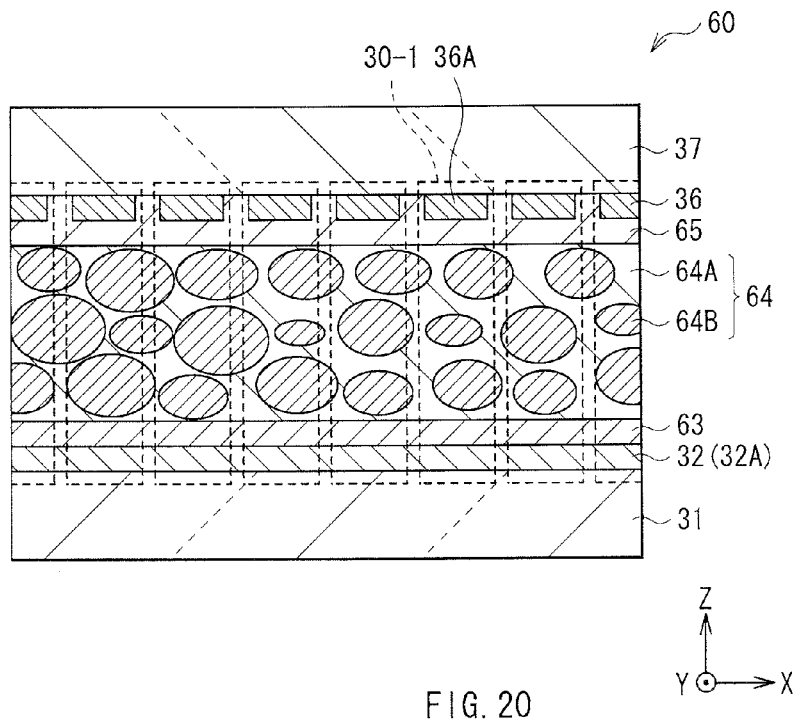
FIG. 20 is a diagram illustrating an example of a cross-sectional configuration in an XZ plane of a light modulation device in FIG. 19.

FIG. 20 illustrates an example of a cross-sectional configuration of the light modulation device 60. The light modulation device 60 may include, for example, the transparent substrate 31, the lower electrode 32, an alignment film 63, a light modulation layer 64, an alignment film 65, the upper electrode 36, and the transparent substrate 37 arranged in order from the reflective plate 40.

Figure 21:
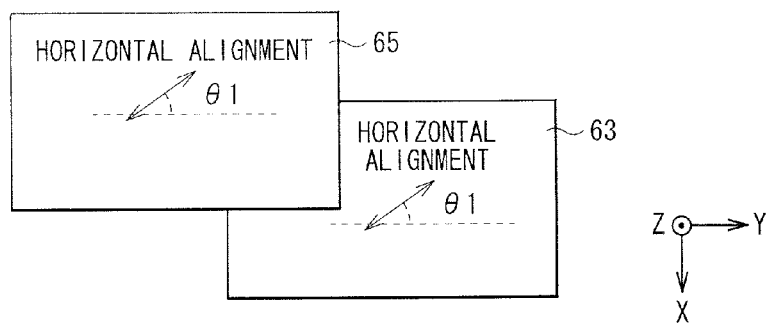
FIG. 21 is a plan view illustrating alignment directions of alignment films in FIG. 20.

The alignment films 63 and 65 are arranged to sandwich the light modulation layer 64. The alignment films 63 and 65 may align, for example, liquid crystals, monomers, etc. that are used for the light modulation layer 64. The alignment films 63 and 65 are so formed that the light modulation layer 64 satisfies at least one (A/B<A1/B1) of the two expressions (A>C>B and A/B<A1/B1) which will be described later, when the light modulation layer 64 exhibits scattering characteristics. The alignment films 63 and 65 each may be, for example, a horizontal alignment film that has an alignment direction in a direction that intersects with a plane parallel to the light incident surface 10A at an angle θ1 as shown in FIG. 21. The alignment direction of each of the alignment films 63 and 65 may be, for example, in a direction that intersects with the light incident surface 10A at the angle θ1. When the horizontal alignment films used for the alignment films 63 and 65 are formed by a rubbing process, rubbing directions of the alignment films 63 and 65 are in the direction that intersects with the plane parallel to the light incident surface 10A at the angle θ1.

The angle θ1 in the alignment film 63 is preferably the same as the angle θ1 of the alignment film 65 in terms of convenience in design, however, the angle θ1 in the alignment film 63 may be different from the angle θ1 of the alignment film 65. Further, in the alignment films 63 and 65, the angle θ1 may be constant irrespective of a place, or, for example, may vary depending on distance from the light source 20. For example, the angle θ1 may be smaller as the distance from the light source 20 is increased, in the alignment films 63 and 65.

Part or whole of the light modulation layer 64 exhibits scattering characteristics or transparency with respect to light from the light source 20 depending on magnitude of an electric field. For example, the light modulation layer 64 exhibits transparency with respect to light from the light source 20 upon no voltage application. Further, for example, the modulation layer 64 exhibits scattering characteristics with respect to light from the light source 20 upon voltage application. The light modulation layer 64 may be, for example, a composite layer that includes a polymer region 64A and a plurality of liquid crystal regions 64B dispersed in the polymer region 64A, as shown in FIG. 20. The polymer region 64A and the liquid crystal regions 64B have shape anisotropy and also have optical anisotropy. It is to be noted that the liquid crystal region 64B and the polymer region 64A correspond to specific but not limitative examples of the first region and the second region in one embodiment of the present application, respectively.

[Shape Anisotropy]

Figure 22:
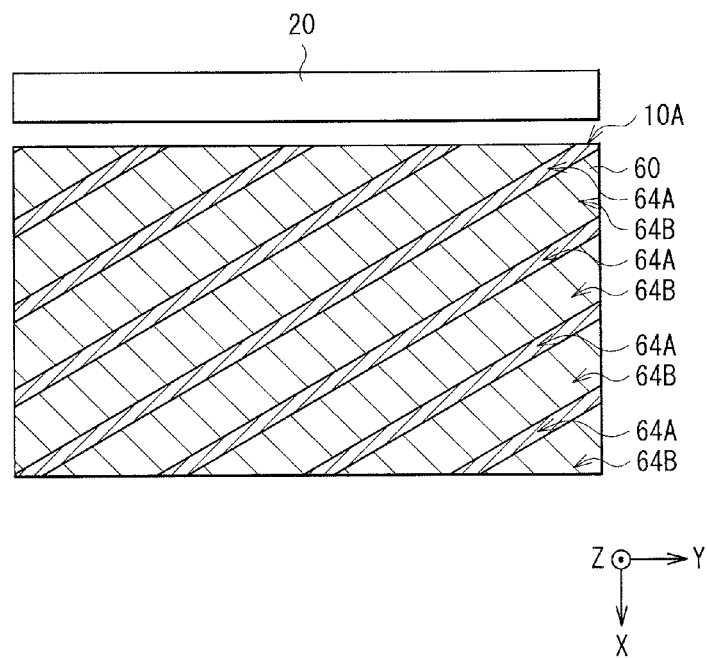
FIG. 22 is a diagram illustrating an example of a cross-sectional configuration in the XY plane of a light modulation layer in FIG. 20.

The polymer region 64A and the liquid crystal region 64B both may extend, for example, in a direction that is parallel or substantially parallel to the direction (alignment direction) that intersects with the light incident surface 10A at the angle θ1 (not illustrated) as schematically shown in FIG. 22. The polymer region 64A and the liquid crystal region 64B may both extend, for example, continuously or discontinuously from one end to the other end of the light modulation layer 64.

Figure 23A:
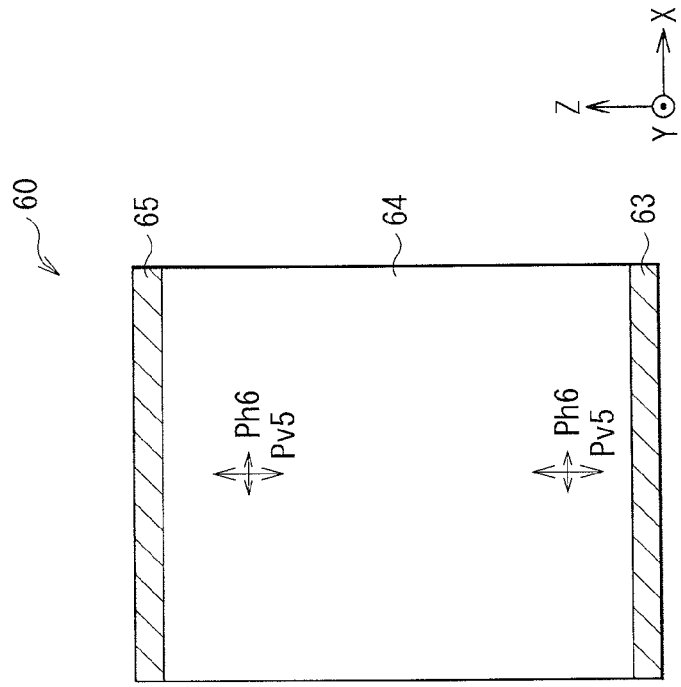
FIGS. 23A and 23B are diagrams illustrating an example of structural cycles in the light modulation layer in FIG. 20.
Figure 23B:
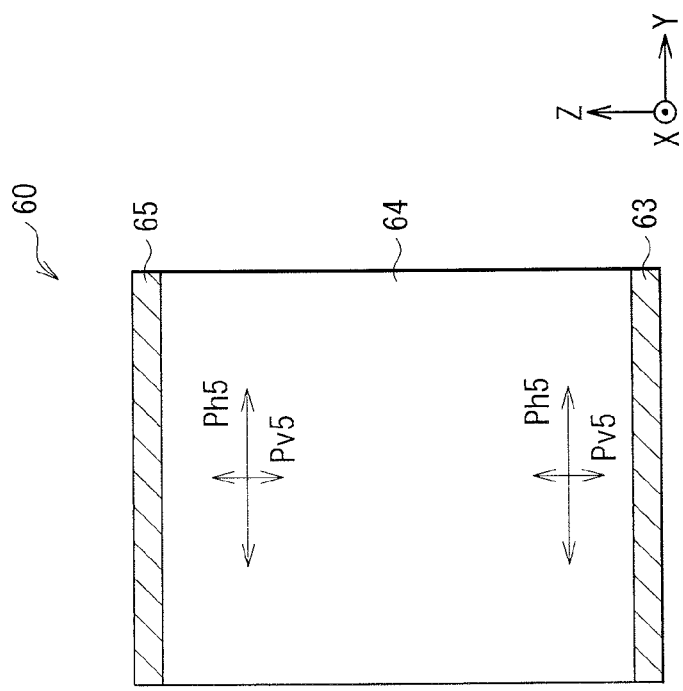

FIGS. 23A and 23B illustrate structural cycles in the X-axis direction, in the Y-axis direction, and in the Z-axis direction in the light modulation layer 64. The light modulation layer 64 as a whole may have, for example, a regular structure having a cycle Ph6 in the X-axis direction, a cycle Ph5 in the Y-axis direction, and a cycle Pv5 in the Z-axis direction, as shown in FIGS. 23A and 23B.

The polymer region 64A includes a polymer material obtained by polymerizing the above-described low-molecular monomers in a state of being aligned by functions of the alignment films 63 and 65. Therefore, in the light modulation layer 64, the interfaces of the polymer region 64A and the liquid crystal regions 64B are formed densely in a direction that is orthogonal to the alignment direction of the alignment films 63 and 65, and are formed sparsely in the alignment direction of the alignment films 63 and 65. The direction that is orthogonal to the alignment direction of the alignment films 63 and 65 refers to a direction that is orthogonal to the direction (alignment direction) intersecting with the light incident surface 10A at the angle θ1 and is parallel to the surface of the transparent substrate 31, or refers to a direction that is orthogonal to the surface of the transparent substrate 31. The direction that is parallel to the alignment direction of the alignment films 63 and 65 refers to a direction that is parallel to the direction intersecting with the light incident surface 10A at the angle θ1 and is parallel to the surface of the transparent substrate 31. Therefore, the cycles Ph6 and Pv5 are short and the cycle Ph5 is long. It is to be noted that the cycle Ph5 in the Y-axis direction is shorter than the cycles Ph1 and Ph10 in the above-described first embodiment in proportion to an amount by which the polymer region 64A and the liquid crystal region 64B both extend in an oblique direction with respect to the light incident surface 10A.

Figure 24:
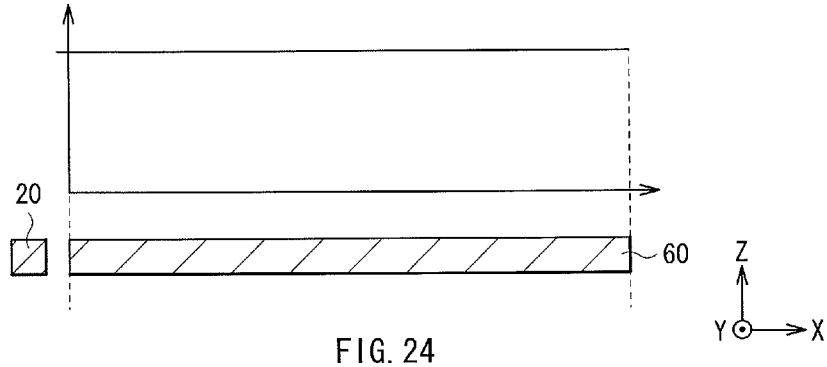
FIG. 24 is a diagram illustrating an example of a proportion of a polymer region in the light modulation layer in FIG. 20.

Proportion of the polymer region 64A in the light modulation layer 64 may be, for example, constant (uniform) or substantially constant (substantially uniform) irrespective of the distance from the light source 20, as shown in FIG. 24. The proportion may be, for example, from 50 wt % to 98 wt % both inclusive, preferably from 75 wt % to 95 wt % both inclusive, and more preferably from 85 wt % to 92 wt % both inclusive. The proportion may be adjustable, for example, by a factor such as a weight ratio of the low-molecular monomer used as one of raw materials of the light modulation layer 64, and intensity and an integral amount of ultraviolet rays irradiated to the low-molecular monomer.

The polymer region 64A and the liquid crystal region 64B have different response speed with respect to an electric field. The polymer region 64A has relatively-low responsiveness to an electric field, and the liquid crystal region 64B has relatively-high responsiveness to an electric field. The polymer region 64A includes a polymer material. The polymer region 64A may have, for example, a streaky structure or a porous structure that does not respond to an electric field, or may have a rod-like structure that has response speed slower than that of the liquid crystal region 64B. The polymer region 64A is formed of a polymer material obtained by polymerizing low-molecular monomers. The polymer region 64A is formed by polymerizing, with use of heat, light, or both, monomers that have alignment properties and polymerizability and are aligned along the alignment direction of the liquid crystal region 64B or of the alignment films 63 and 65. Examples of monomers that have alignment properties and polymerizability are the same materials as those referred to in the above-described first embodiment.

The liquid crystal region 64B mainly includes a liquid crystal material and has response speed sufficiently faster than that of the polymer region 64A. The liquid crystal material (liquid crystal molecule) included in the liquid crystal region 64B may be, for example, a rod-like molecule. It is preferable to use a liquid crystal molecule that has positive dielectric constant anisotropy (a so-called positive liquid crystal) as the liquid crystal molecule included in the liquid crystal region 64B.

Upon no voltage application, the major axis of the liquid crystal molecule is in a direction that is parallel or substantially parallel to a direction (alignment direction) at the angle θ1 in the liquid crystal region 64B. Upon voltage application, the major axis of the liquid crystal molecule is parallel or substantially parallel to the light incident surface 10A and is parallel or substantially parallel to the normal to the transparent substrate 31 in the liquid crystal region 64B. Irrespective of whether a voltage is applied or not, the major axis of the polymer is in the direction that is parallel or substantially parallel to the direction (alignment direction) at the angle θ1 in the polymer region 64A.

[Optical Anisotropy]

Figure 25:
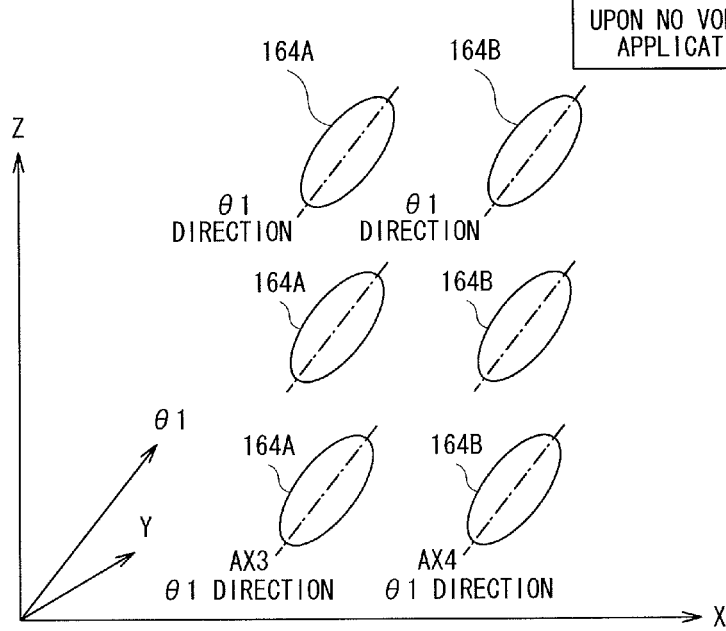
FIG. 25 is a diagram schematically illustrating an example of functions of the light modulation device in FIG. 19.

FIG. 25 schematically illustrates an example of the alignment states in the polymer region 64A and in the liquid crystal region 64B upon no voltage application. Ellipsoids 164A in FIG. 25 each illustrate an example of a refractive index ellipsoid that shows refractive index anisotropy of the polymer region 64A upon no voltage application. Ellipsoids 164B in FIG. 25 each illustrate an example of a refractive index ellipsoid that shows refractive index anisotropy of the liquid crystal region 64B upon no voltage application.

Figure 26:
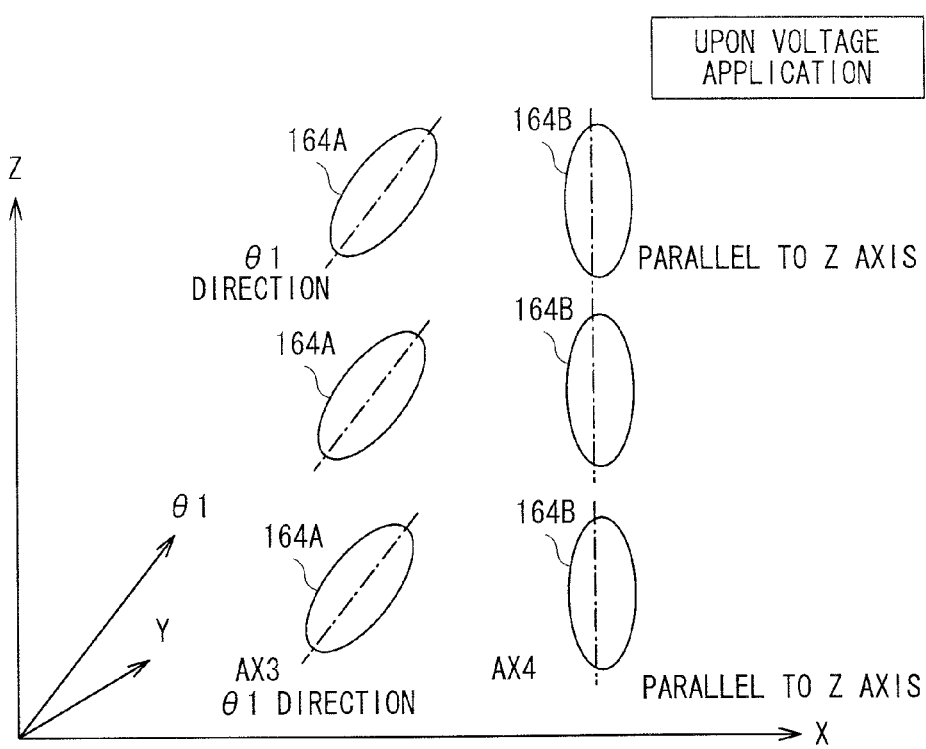
FIG. 26 is a diagram schematically illustrating another example of the functions of the light modulation device in FIG. 19.

FIG. 26 schematically illustrates an example of the alignment states in the polymer region 64A and in the liquid crystal region 64B upon voltage application. The ellipsoids 164A in FIG. 26 each illustrate an example of the refractive index ellipsoid that shows refractive index anisotropy of the polymer region 64A upon voltage application. The ellipsoids 164B in FIG. 26 each illustrate an example of the refractive index ellipsoid that shows refractive index anisotropy of the liquid crystal region 64B upon voltage application.

The polymer region 64A and the liquid crystal region 64B may have, for example, configurations in which a direction of an optical axis AX3 (in particular, a major axis of the ellipsoid 164A) of the polymer region 64A coincides with (is parallel to) a direction of an optical axis AX4 (in particular, a major axis of the ellipsoid 164B) of the liquid crystal region 64B upon no voltage application, as shown in FIG. 25. It is to be noted that the optical axes AX3 and AX4 each indicate a line that is parallel to a traveling direction of a light ray that has one refractive index value irrespective of a polarization direction. Also, the directions of the optical axes AX3 and AX4 do not necessarily coincide with each other upon no voltage application, and the direction of the optical axis AX3 may be different in some degree from the direction of the optical axis AX4, for example, due to manufacturing error, etc.

Moreover, upon no voltage application, the optical axis AX4 is in the direction that is parallel or substantially parallel to the direction (alignment direction) at the angle θ1. When the alignment films 63 and 65 have the pre-tilt function, upon no voltage application, the optical axis AX4 is in a direction that is parallel or substantially parallel to the direction (alignment direction) at the angle θ1 and is in a direction that intersects with the surface of the transparent substrate 31 at a predetermined pre-tilt angle.

On the other hand, in the polymer region 64A, the optical axis AX3 is in the direction that is parallel or substantially parallel to the direction (alignment direction) at the angle θ1 irrespective of whether a voltage is applied or not. When the alignment films 63 and 65 have the pre-tilt function, the optical axis AX4 is in a direction that is parallel or substantially parallel to the direction (alignment direction) at the angle θ1 and is in a direction that intersects with the surface of the transparent substrate 31 at a predetermined pre-tilt angle.

It is preferable that an ordinary refractive index of the polymer region 64A be the same as that of the liquid crystal region 64B and an extraordinary refractive index of the polymer region 64A be the same as that of the liquid crystal region 64B. In this case, for example, there is almost no refractive index difference in all directions and high transparency is obtained upon no voltage application. Therefore, for example, light from the light source 20 passes through the light modulation layer 64 without being scattered in the light modulation layer 64. As a result, for example, light (light from an oblique direction) from the light source 20 propagates in a region (transparent region 30A) that has been transparent in the light modulation device 60 and is totally reflected by an interface of the light modulation device 60 and the air. Therefore, luminance (luminance in black display) in the transparent region 30A is decreased compared to a case where luminance is uniform.

Moreover, the polymer region 64A and the liquid crystal regions 64B may have, for example, a configuration in which the directions of the optical axis AX3 and the optical axis AX4 are different from each other (intersect with each other, or are orthogonal to each other) upon voltage application, as shown in FIG. 26. In particular, the liquid crystal region 64B has a configuration in which the optical axis AX4 is parallel or substantially parallel to the light incident surface 10A and is parallel or substantially parallel to the normal to the transparent substrate 31 upon voltage application.

Accordingly, in the light modulation layer 64, the refractive index difference becomes large in all directions and high scattering characteristics are obtained upon voltage application. Therefore, light from the light source 20 is scattered in the light modulation layer 64. As a result, light from the light source 20 is scattered in a region (scattering region 30B) that is in a scattering state in the light modulation device 60, and the scattered light directly enters the light guide plate 10, or enters the light guide plate 10 after being reflected by the reflective plate 40, and is emitted from the top face (light emission face) of the light guide plate 10, for example. Therefore, luminance in the scattering region 30B becomes extremely high compared to the case where luminance is uniform, and further, partial luminance in white display (luminance enhancement) is increased in proportion to the decreased amount of luminance in the transparent region 30A.

When the angle $\theta 1$ (for example, a rubbing angle) is equal to or larger than 60° and smaller than 90°, contrast of bright-dark stripes due to the arrangement of the light source 20 is largely reduced and non-uniformity in luminance in the vicinity of the light source 20 is almost eliminated. It is to be noted that, when the light modulation layer 64 is caused to easily satisfy A>C>B and A/B<A1/B1 by adding a monofunctional monomer or a polyfunctional monomer as the low-molecular monomer having both polymerizability and liquid crystallinity to the raw material of the light modulation layer 64 or by reducing intensity and an integral amount of ultraviolet rays irradiated to the raw material of the light modulation layer 64, a favorable range of the angle $\theta 1$ (for example, a rubbing angle) may be equal to or larger than 30° and smaller than 90°. Further, when the light modulation layer 64 is caused to more easily satisfy A>C>B and A/B<A1/B1 by adding a monofunctional monomer or a polyfunctional monomer as the low-molecular monomer having both polymerizability and liquid crystallinity to the raw material of the light modulation layer 64 or by reducing intensity and an integral amount of ultraviolet rays irradiated to the raw material of the light modulation layer 64, the favorable range of the angle $\theta 1$ (for example, a rubbing angle) may be equal to or larger than 10° and smaller than 90°.

It is to be noted that ordinary refractive indices of the polymer region 64A and the liquid crystal region 64B may be different in some degree, for example, due to manufacturing error, and, for example, is preferably 0.1 or smaller, and more preferably 0.05 or smaller. Also, extraordinary refractive indices of the polymer region 64A and the liquid crystal region 64B may be different in some degree, for example, due to manufacturing error, and is, for example, preferably 0.1 or smaller, and more preferably 0.05 or smaller.

Moreover, it is preferable that a refractive index difference (=extraordinary refractive index−ordinary refractive index) of the polymer region 64A, a refractive index difference (=extraordinary refractive index−ordinary refractive index) of the liquid crystal region 64B, etc. be as large as possible. The foregoing refractive index differences are preferably 0.05 or larger, more preferably 0.1 or larger, and further more preferably 0.15 or larger. One reason for this is that, in the case where the refractive index differences of the polymer region 64A and the liquid crystal region 64B are large, scattering performance of the light modulation layer 64 is high, which leads to easy destruction of a light guiding condition, and thereby, light from the light guide plate 10 is easily extracted.

[Anisotropic Scattering]

Next, anisotropic scattering in the present embodiment will be described. In the present embodiment, anisotropic scattering is caused by (a) non-uniformity in existence probability of the interfaces (scattering interfaces) of the polymer region 64A and the liquid crystal regions 64B in the scattering region 30B and (b) birefringence in the scattering region 30B. Therefore, description will be given in detail below of non-uniformity in the existence probability of the scattering interfaces in the scattering region 30B and of birefringence in the scattering region 30B.

[Non-uniformity in Existence Probability of Scattering Interface]

In the scattering region 30B, the interfaces of the polymer region 64A and the liquid crystal regions 64B are formed densely in a direction that is orthogonal to the alignment direction of the alignment films 63 and 65, and are formed sparsely in a direction that is parallel to the alignment direction of the alignment films 63 and 65. The direction that is orthogonal to the alignment direction of the alignment films 63 and 65 refers to a direction that is orthogonal to the direction (alignment direction) intersecting with the light incident surface 10A at the angle $\theta 1$ and is parallel to the surface of the transparent substrate 31, or refers to a direction that is orthogonal to the surface of the transparent substrate 31. The direction that is parallel to the alignment direction of the alignment films 63 and 65 refers to a direction that is parallel to the direction (alignment direction) intersecting with the light incident surface 10A at the angle $\theta 1$ and is parallel to the surface of the transparent substrate 31.

Light that propagates in the first direction in the scattering region 30B enters the interface with a cycle between a cycle of an average streaky organization size in the minor-axis direction of the streaky structure in the polymer region 64A and a cycle of an average streaky organization size in the major-axis direction of the streaky structure in the polymer region 64A. Therefore, scattering of this light is smaller than scattering of light that enters the interface with the cycle of the average streaky organization size in the minor-axis direction of the streaky structure in the polymer region 64A.

Light that propagates in the second direction in the scattering region 30B enters the interface with a cycle between the cycle of the average streaky organization size in the minor-axis direction of the streaky structure in the polymer region 64A and the cycle of the average streaky organization size in the major-axis direction of the streaky structure in the polymer region 64A. Therefore, scattering of this light is smaller than scattering of light that enters the interface with the cycle of the average streaky organization size in the minor-axis direction of the streaky structure in the polymer region 64A.

A magnitude relationship between the scattering of light that propagates in the first direction in the scattering region 30B and the scattering of light that propagates in the second direction in the scattering region 30B depends on a magnitude relationship in cycle at the interface of the polymer region 64A and the liquid crystal region 64B in traveling directions of the light.

[Birefringence]

Light that propagates in the first direction in the scattering region 30B propagates while being influenced by a difference between an extraordinary refractive index of the liquid crystal region 64B and an ordinary refractive index of the polymer region 64A and by a difference between an ordinary refractive index of the liquid crystal region 64B and an extraordinary refractive index of the polymer region 64A, with a cycle between the cycle of the average streaky organization size in the minor-axis direction of the streaky structure in the polymer region 64A and the cycle of the average streaky organization size in the major-axis direction of the streaky structure in the polymer region 64A. Therefore, scattering of light that propagates in the first direction in the scattering region 30B is smaller than scattering of light that propagates in a direction (alignment direction) that intersects with the light incident surface 10A at the angle θ1 and is parallel to the surface of the transparent substrate 31. However, a value of an extraordinary refractive index here is closer to that of an ordinary refractive index in proportion to an amount by which light intersects at the angle θ1, therefore, scattering characteristics due to polarization is weaker.

Light that propagates in the second direction in the scattering region 30B propagates while being influenced by a difference between the extraordinary refractive index of the liquid crystal region 64B and the ordinary refractive index of the polymer region 64A, with the cycle between the cycle of the average streaky organization size in the minor-axis direction of the streaky structure in the polymer region 64A and the cycle of the average streaky organization size in the major-axis direction of the streaky structure in the polymer region 64A.

When the angle θ1 is larger than 45° and smaller than 90°, a cycle in the first direction at the interface of the polymer region 64A and the liquid crystal region 64B is longer than a cycle in the second direction at the interface of the polymer region 64A and the liquid crystal region 64B. Therefore, in this case, scattering of light that propagates in the first direction in the scattering region 30B is smaller than light that propagates in the second direction in the scattering region 30B.

When the angle θ1 is larger than 0° and smaller than 45°, a cycle in the first direction at the interface of the polymer region 64A and the liquid crystal region 64B is shorter than a cycle in the second direction at the interface of the polymer region 64A and the liquid crystal region 64B. Therefore, in this case, scattering of light that propagates in the first direction in the scattering region 30B is larger than scattering of light that propagates in the second direction in the scattering region 30B.

In other words, the optical modulation layer 64 has a configuration in which, scattering with respect to light that propagates in the first direction exhibits anisotropic scattering that is smaller than that of scattering with respect to light that propagates in the second direction, when the angle θ1 is larger than 45° and smaller than 90°. Further, the optical modulation layer 64 has a configuration in which, scattering with respect to light that propagates in the first direction exhibits anisotropic scattering that is larger than that of scattering with respect to light that propagates in the second direction, when the angle θ1 is larger than 0° and smaller than 45°.

Here, magnitude of the first scattering, magnitude of the second scattering, and magnitude of the third scattering are represented by A, B, and C, respectively. Further, when the optical axis AX3 is in the direction of the normal to the transparent substrate 31 and the optical axis AX4 is in a direction that is parallel to the light incident surface 10A and is orthogonal to the optical axis AX3, magnitude of scattering with respect to light that propagates in a direction that is perpendicular to the light incident surface 10A is represented by A1. Further, when the optical axis AX3 is in the direction of the normal to the transparent substrate 31 and the optical axis AX4 is in a direction that is parallel to the light incident surface 10A and is orthogonal to the optical axis AX3, magnitude of scattering with respect to light that propagates in a direction that is parallel to the light incident surface 10A and is parallel to the surface of the transparent substrate 31 is represented by B1. At this time, the light modulation layer 64 has a configuration that satisfies the following expressions when the light modulation layer 64 exhibits scattering characteristics.

A>C>B

A/B<A1/B1

Next, magnitude of anisotropic scattering will be described.

Magnitude of anisotropy of scattering refers to a quotient of three axes of magnitude of scattering with respect to light that propagates in the first direction (X-axis direction), magnitude of scattering with respect to light that propagates in the second direction (Y-axis direction), and magnitude of scattering with respect to light that propagates in the third direction (Z-axis direction). The quotient of the three axes specifically refers to sum of the following three ((A) to (C)). Anisotropy of scattering is large when a difference between the three axes is large and anisotropy of scattering is small when the quotient of the three axes is small. It is assumed that a value of numerator is larger than a value of denominator in the following (A) to (C). Therefore, in an example where the value of the numerator is smaller than the value of the denominator, it is preferable to exchange the values of the numerator and the denominator in the following (A) to (C).

(A) (magnitude of scattering with respect to light that propagates in the first direction)/(magnitude of scattering with respect to light that propagates in the second direction)

(B) (magnitude of scattering with respect to light that propagates in the third direction)/(magnitude of scattering with respect to light that propagates in the second direction)

(C) (magnitude of scattering with respect to light that propagates in the first direction)/(magnitude of scattering with respect to light that propagates in the third direction)

The magnitude of anisotropy of scattering is defined by (a) non-uniformity in existence probability of the interfaces (scattering interfaces) of the polymer region 64A and the liquid crystal regions 64B in the scattering region 30B and (b) birefringence in the scattering region 30B. In magnitude of anisotropy of scattering, the above-described component (a) is dominant. One reason for this is that, when considering existence probability of scattering interfaces, the same media is ideally continued in the second direction, and therefore scattering is not caused in the second direction and is caused only in the first direction and in the third direction. At this time, scattering in the second direction is theoretically zero. Therefore, scattering ratio between the second direction and the first and third directions becomes infinite. On the other hand, when considering birefringence, two polarization components are scattered in the first direction but only one polarization component is scattered in the second direction and in the third direction. At this time, the scattering ratio between the first direction and the second and third directions is merely 2:1. Therefore, the above-described component (a) is dominant in magnitude of anisotropy of scattering. Therefore, description will be given below of a relationship between existence probability of scattering interfaces and magnitude of anisotropy of scattering, and description of a relationship between birefringence and magnitude of anisotropy of scattering will be omitted.

Magnitude of anisotropy of scattering corresponds to a quotient of three axes of a cycle in the first direction in the light modulation layer 64, a cycle in the second direction in the light modulation layer 64, and a cycle in the third direction in the light modulation layer 64. The quotient of the three axes specifically refers to sum of the following three ((D) to (F)). It is assumed that a value of numerator is larger than a value of denominator in the following (D) to (F). Therefore, in an example where the value of the numerator is smaller than the value of the denominator, it is preferable to exchange the values of the numerator and the denominator in the following (D) to (F).

(D) (cycle in the second direction in the light modulation layer 64)/(cycle in the first direction in the light modulation layer 64)

(E) (cycle in the second direction in the light modulation layer 64)/(cycle in the third direction in the light modulation layer 64)

(F) (cycle in the third direction in the light modulation layer 64)/(cycle in the first direction in the light modulation layer 64)

Magnitude of anisotropy of scattering in the scattering region 30B in the light modulation layer 64 is a value corresponding to Ph5/Ph6+Ph5/Pv5+Pv5/Ph6. Here, the cycles may be, for example, in the following relationship.

$Ph5/Ph6 < Ph10/Ph20$ $Ph5/Pv5 < Ph10/Pv10$ $Pv5/Ph6 \approx Pv10/Ph20$

At this time, the light modulation layer 64 is so formed that, when the light modulation layer 64 exhibits scattering characteristics, magnitude (A/B) of anisotropy of scattering of the light modulation layer 64 is smaller than magnitude (A1/B1) of anisotropy of scattering of the light modulation layer 134.

Anisotropy of scattering is different between in the light modulation layer 64 and in the light modulation layer 134. One reason for this is that the optical axis AX3 is in the direction (alignment direction) that intersects with the light incident surface 10A at the angle θ1 in the light modulation layer 64. In the present embodiment, as a method of aligning the optical axis AX3 in the direction (alignment direction) that intersects with the light incident surface 10A at the angle θ1, for example, horizontal alignment films are used, as the alignment films 63 and 65, that are subjected to a rubbing process so that rubbing directions thereof are in a direction that intersects at the angle θ1 with a surface parallel to the light incident surface 10A.

[Manufacturing Method]

It is to be noted that the light modulation layer 64 and the light modulation device 60 may be manufactured by a method similar to that of the light modulation layer 34 and the light modulation device 30 in the above-described first embodiment. In particular, liquid crystals and low-molecular monomers in the mixture 44 are aligned by the alignment function of the alignment films 63 and 65, and then, the low-molecular monomers are polymerized to be polymers by ultraviolet irradiation. Thus, the light modulation device 60 including the light modulation layer 64 that satisfies A>C>B and A/B<A1/B1 is manufactured.

[Effects]

Next, effects of the illumination unit 2 will be described. In the present embodiment, the optical axis AX3 of the polymer region 64A is in a direction that is tilted at the angle θ1 with respect to the light incident surface 10A in whole of the light modulation layer 64. Therefore, when the light modulation layer 64 exhibits scattering characteristics, magnitude (A/B) of anisotropy of scattering in the light modulation layer 64 is smaller than magnitude (A1/B1) of anisotropy of scattering in the light modulation layer 134. As a result, anisotropic scattering with respect to light that propagates in the light modulation layer 64 is moderated more than anisotropic scattering with respect to light that propagates in the light modulation layer 134. Here, bright-dark stripes due to the arrangement of the light source 20 are caused by a large difference between the first scattering and the second scattering. Accordingly, contrast in bright-dark stripes due to the arrangement of the light source 20 is reduced by moderating the above-described anisotropic scattering in whole of the light modulation layer 64. As a result, uniformity in luminance is improved.

[3. Third Embodiment]

Figure 27:
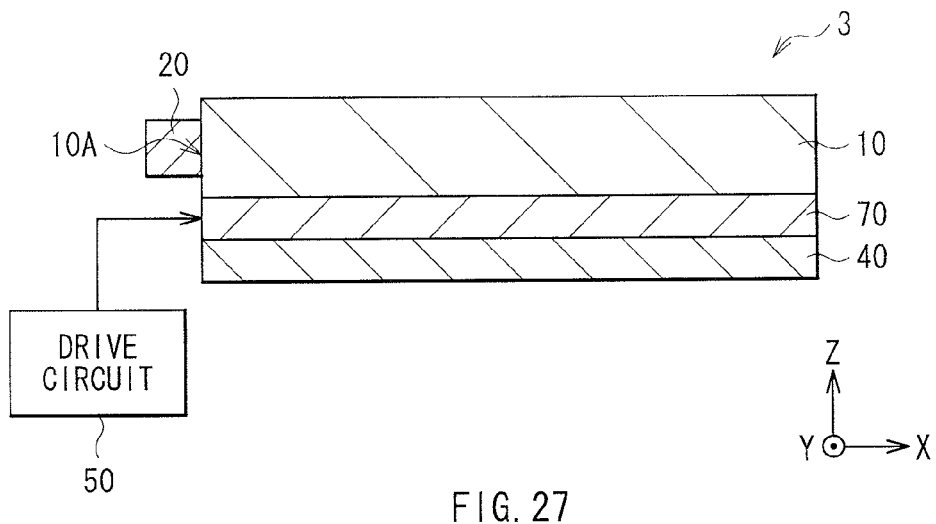
FIG. 27 is a diagram illustrating an example of an outline configuration of an illumination unit according to a third embodiment of the present application.

Next, description will be given of an illumination unit 3 according to a third embodiment of the present application. The illumination unit 3 of the present embodiment is different in configuration from the illumination unit 1 of the above-described first embodiment in that a light modulation device 70 is provided instead of the light modulation device 30 as shown in FIG. 27. Therefore, description of matters common to the configurations of the above-described embodiments will be appropriately omitted and matters different from the configurations of the above-described embodiments will be mainly described.

[Configuration]

Figure 28:
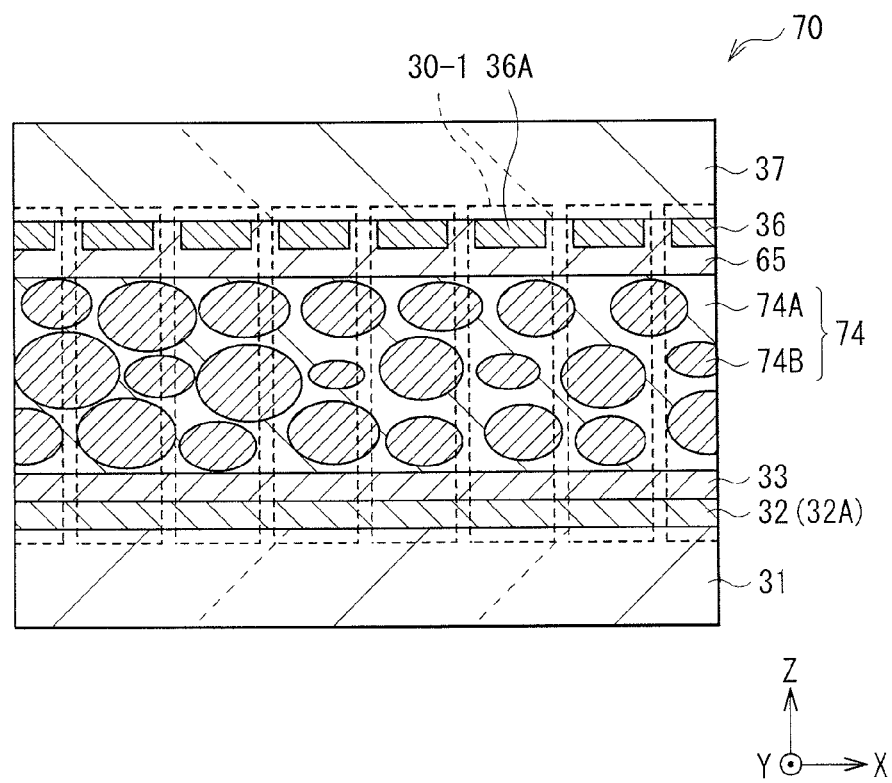
FIG. 28 is a diagram illustrating an example of a cross-sectional configuration in the XZ plane of a light modulation device in FIG. 27.
Figure 29:
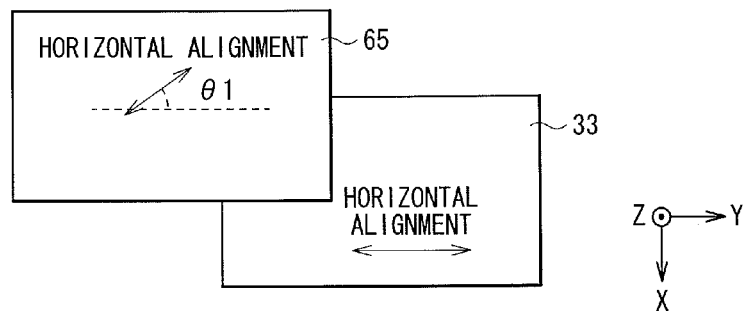
FIG. 29 is a plan view illustrating alignment directions of alignment films in FIG. 28.

FIG. 28 illustrates an example of a cross-sectional configuration of the light modulation device 70. The light modulation device 70 may include, for example, the transparent substrate 31, the lower electrode 32, the alignment film 33, a light modulation layer 74, the alignment film 65, the upper electrode 36, and the transparent substrate 37 arranged in order from the reflective plate 40. In the present embodiment, the light modulation device 70 may include, for example, the alignment film 33 used in the above-described embodiment on the transparent substrate 31 side thereof and the alignment film 65 used in the above-described embodiment on the transparent substrate 37 side thereof, as shown in FIG. 29. The alignment films 33 and 65 are arranged to sandwich the light modulation layer 74. It is to be noted that the angle θ1 may be constant irrespective of a place, or, for example, may vary depending on distance from the light source 20 inside the alignment film 65. For example, the angle θ1 may be smaller as the distance from the light source 20 is increased, in the alignment film 65. The alignment films 33 and 65 are so formed that the light modulation layer 74 satisfies at least one (A/B<A1/B1) of the two expressions (A>C>B and A/B<A1/B1) which will be described later, when the light modulation layer 74 exhibits scattering characteristics.

Part or whole of the light modulation layer 74 exhibits scattering characteristics or transparency with respect to light from the light source 20 depending on magnitude of an electric field. For example, the light modulation layer 74 may exhibit transparency with respect to light from the light source 20 upon no voltage application. Further, for example, the modulation layer 74 may exhibit scattering characteristics with respect to light from the light source 20 upon voltage application. The light modulation layer 74 may be, for example, a composite layer that includes a polymer region 74A and a plurality of liquid crystal regions 74B dispersed in the polymer region 74A, as shown in FIG. 28. The polymer region 74A and the liquid crystal regions 74B have shape anisotropy and also have optical anisotropy. It is to be noted that the liquid crystal region 74B and the polymer region 74A correspond to specific but not limitative examples of the first region and the second region of the present application, respectively.

[Shape Anisotropy]

Figure 30:
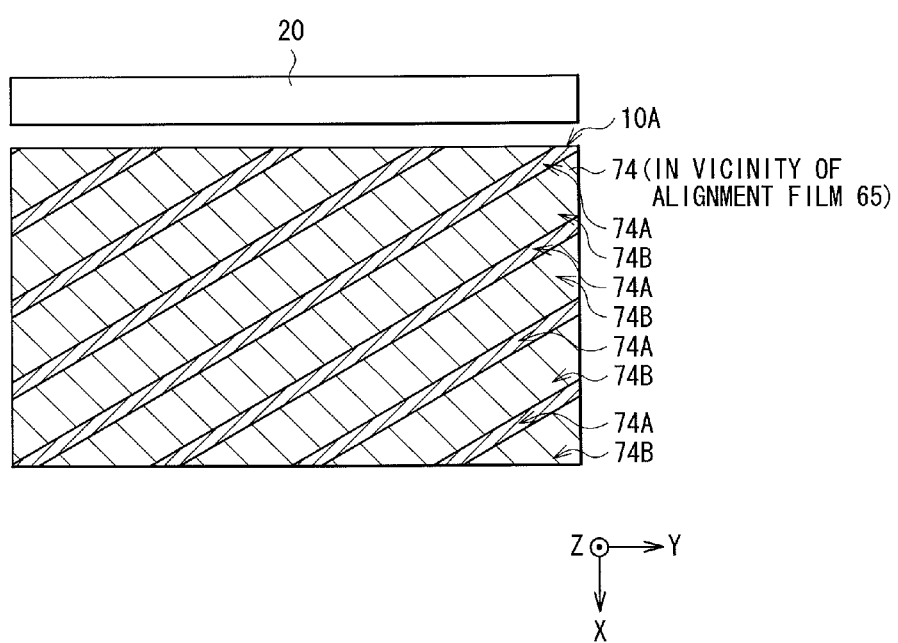
FIG. 30 is a diagram illustrating an example of a cross-sectional configuration in the XY plane of a light modulation layer in FIG. 28.
Figure 31:
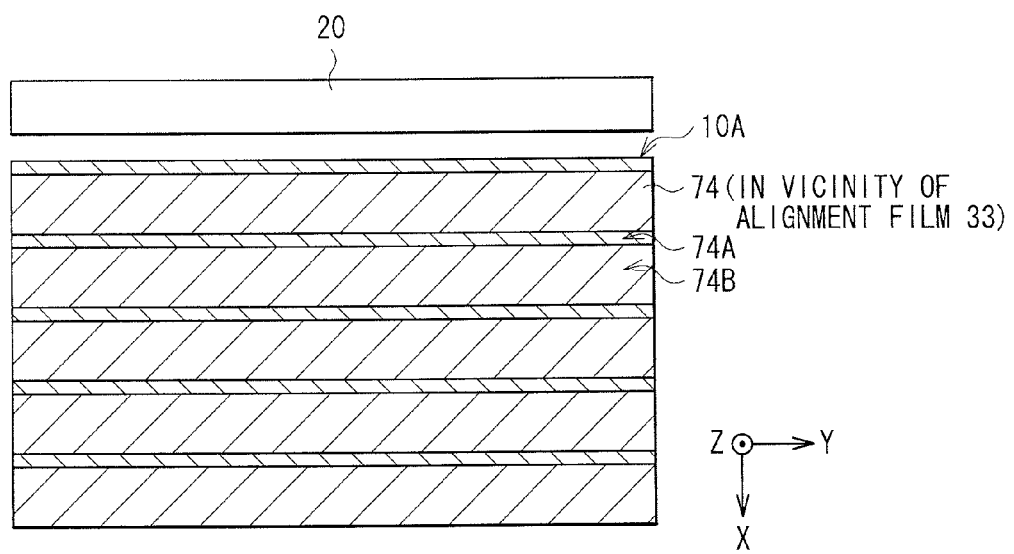
FIG. 31 is a diagram illustrating another example of the cross-sectional configuration in the XY plane of the light modulation layer in FIG. 28.

The polymer region 74A and the liquid crystal region 74B both may extend, for example, in a direction that is parallel or substantially parallel to a direction (alignment direction) that intersects with the light incident surface 10A at the angle $\theta 1$ (not illustrated) in a portion of the light modulation layer 74 closer to the alignment film 65 as schematically shown in FIG. 30. The polymer region 74A and the liquid crystal region 74B both may extend, for example, in a direction that is parallel or substantially parallel to the light incident surface 10A in a portion of the light modulation layer 74 closer to the alignment film 33 as schematically shown in FIG. 31. The polymer region 74A and the liquid crystal region 74B may both extend, for example, continuously or discontinuously from one end to the other end of the light modulation layer 74.

Figure 32B:
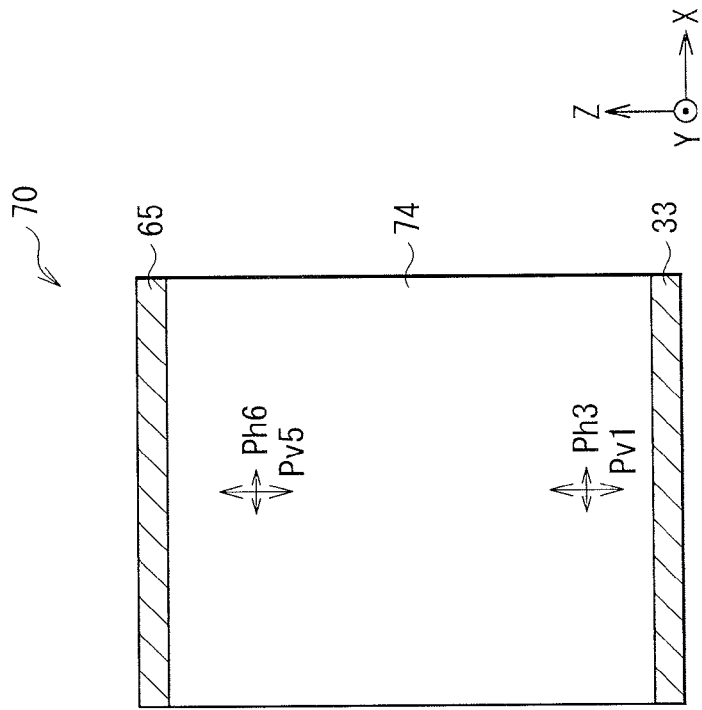
FIGS. 32A and 32B are diagrams illustrating an example of structural cycles in the light modulation layer in FIG. 28.
Figure 32A:
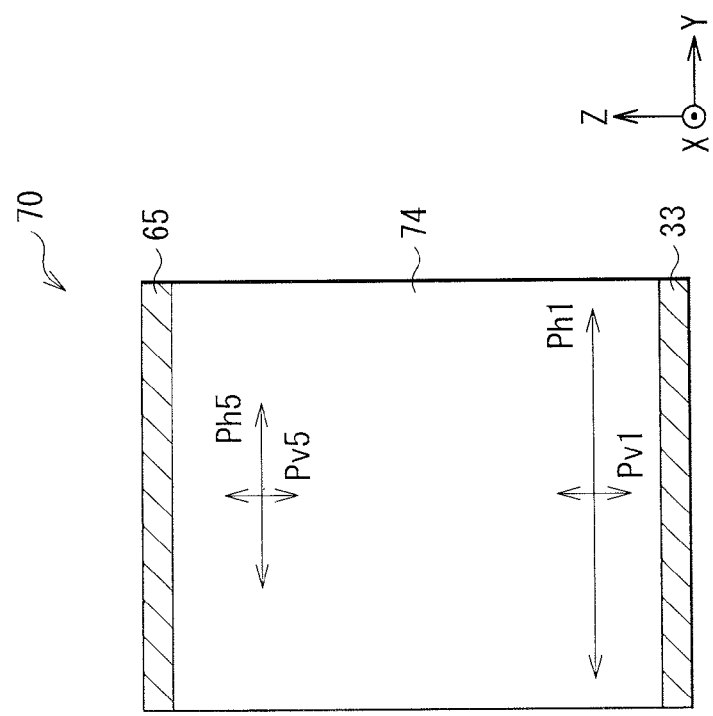

FIGS. 32A and 32B illustrate structural cycles in the X-axis direction, in the Y-axis direction, and in the Z-axis direction in the light modulation layer 74. The light modulation layer 74 may have, for example, a regular structure having the cycle Ph6 in the X-axis direction, the cycle Ph5 in the Y-axis direction, and the cycle Pv5 in the Z-axis direction, in the vicinity of the alignment film 65, as shown in FIGS. 32A and 32B. The light modulation layer 74 may have, for example, a regular structure having the cycle Ph3 in the X-axis direction, the cycle Ph1 in the Y-axis direction, and the cycle Pv1 in the Z-axis direction, in the vicinity of the alignment film 33, as shown in FIGS. 32A and 32B.

The polymer region 74A in the vicinity of the alignment film 33 includes a polymer material obtained by polymerizing the above-described low-molecular monomers in a state of being aligned by the function of the alignment film 33. Therefore, in the vicinity of the alignment film 33 in the light modulation layer 74, the interfaces of the polymer region 74A and the liquid crystal regions 74B are formed densely in a direction that is orthogonal to the alignment direction of the alignment film 33, and are formed sparsely in the alignment direction of the alignment film 33. The direction that is orthogonal to the alignment direction of the alignment film 33 refers to a direction that is orthogonal to the light incident surface 10A, or refers to a direction that is orthogonal to the surface of the transparent substrate 31. The direction that is parallel to the alignment direction of the alignment film 33 refers to a direction that is parallel to the light incident surface 10A and is parallel to the surface of the transparent substrate 31. Therefore, the cycles Ph3 and Pv1 are short and the cycle Ph1 is long.

The polymer region 74A in the vicinity of the alignment film 65 includes a polymer material obtained by polymerizing the above-described low-molecular monomers in a state of being aligned by the function of the alignment film 65. Therefore, in the vicinity of the alignment film 65 in the light modulation layer 74, the interfaces of the polymer region 74A and the liquid crystal regions 74B are formed densely in a direction that is orthogonal to the alignment direction of the alignment film 65, and are formed sparsely in a direction that is parallel to the alignment direction of the alignment film 65. Here, the direction that is orthogonal to the alignment direction of the alignment film 65 refers to a direction that is orthogonal to the direction (alignment direction) intersecting with the light incident surface 10A at the angle $\theta 1$ and is parallel to the surface of the transparent substrate 31, or refers to a direction that is orthogonal to the surface of the transparent substrate 31. The direction that is parallel to the alignment direction of the alignment film 65 refers to a direction that is parallel to the direction (alignment direction) intersecting with the light incident surface 10A at the angle $\theta 1$ and is parallel to the surface of the transparent substrate 31. Therefore, the cycles Ph6 and Pv5 are short and the cycle Ph5 is long. It is to be noted that the cycle Ph5 in the Y-axis direction is shorter than the cycles Ph1 and Ph10 in the above-described embodiments, and the cycle Ph6 in the X-axis direction is longer than the cycles Ph3 and Ph20 in the above-described embodiments, in proportion to an amount by which the polymer region 74A and the liquid crystal regions 74B both extend in an oblique direction with respect to the light incident surface 10A.

Figure 33:
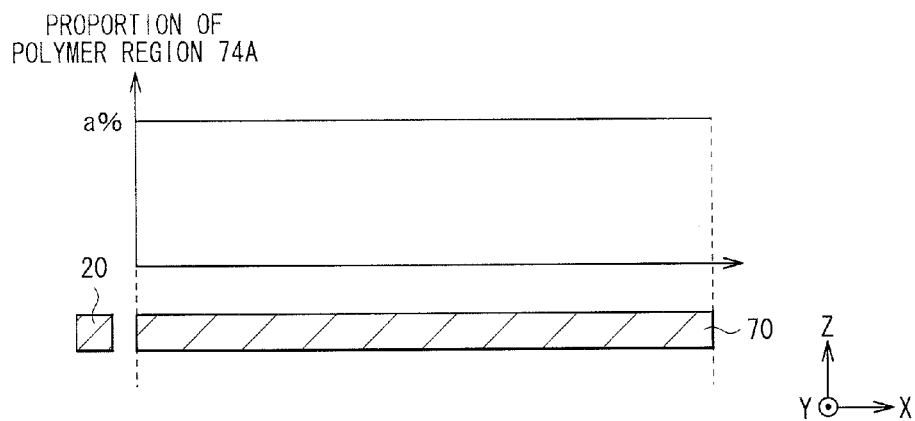
FIG. 33 is a diagram illustrating an example of proportion of a polymer region in the light modulation layer in FIG. 28.

Proportion of the polymer region 74A in the light modulation layer 74 may be, for example, constant or substantially constant irrespective of the distance from the light source 20, as shown in FIG. 33. The proportion may be, for example, from 50 wt % to 98 wt % both inclusive, preferably from 75 wt % to 95 wt % both inclusive, and more preferably from 85 wt % to 92 wt % both inclusive. The proportion may be adjustable, for example, by a factor such as a weight ratio of the low-molecular monomer used as one of raw materials of the light modulation layer 74, and intensity and an integral amount of ultraviolet rays irradiated to the low-molecular monomer.

The polymer region 74A and the liquid crystal region 74B have different response speed with respect to an electric field. The polymer region 74A has relatively-low responsiveness to an electric field, and the liquid crystal region 74B has relatively-high responsiveness to an electric field. The polymer region 74A includes a polymer material. The polymer region 74A may have, for example, a streaky structure or a porous structure that does not respond to an electric field, or may have a rod-like structure that has response speed slower than that of the liquid crystal region 74B. The polymer region 74A is formed of a polymer material obtained by polymerizing low-molecular monomers. In the vicinity of the alignment film 33, the polymer region 74A is formed by polymerizing, with use of heat, light, or both, monomers that have alignment properties and polymerizability and are aligned along the alignment direction of the liquid crystal region 74B or along the alignment direction of the alignment film 33. In the vicinity of the alignment film 65, the polymer region 74A is formed by polymerizing, with use of heat, light, or both, monomers that have alignment properties and polymerizability and are aligned along the alignment direction of the liquid crystal region 74B or along the alignment direction of the alignment film 65. Examples of monomers that have alignment properties and polymerizability are the same materials as those referred to in the above-described embodiments.

The liquid crystal region 74B mainly includes a liquid crystal material and has response speed sufficiently faster than that of the polymer region 74A. The liquid crystal material (liquid crystal molecule) included in the liquid crystal region 74B may be, for example, a rod-like molecule. It is preferable to use a liquid crystal molecule that has positive dielectric constant anisotropy (a so-called positive liquid crystal) as the liquid crystal molecule included in the liquid crystal region 74B.

Upon no voltage application, the direction of the major axis of the liquid crystal molecule varies in a twisting direction from the alignment film 33 side toward the alignment film 65 side in the liquid crystal region 74B. Specifically, in the liquid crystal region 74B located closer to the alignment film 33, the major axis of the liquid crystal molecule is parallel or substantially parallel to the light incident surface 10A and is parallel or substantially parallel to the surface of the transparent substrate 31. On the other hand, in the liquid crystal region 74B located closer to the alignment film 65, the major axis of the liquid crystal molecule is in a direction that is parallel or substantially parallel to the direction (alignment direction) at the angle θ1. Upon voltage application, in the liquid crystal region 74B, the major axis of the liquid crystal is parallel or substantially parallel to the light incident surface 10A and is parallel or substantially parallel to the normal to the transparent substrate 31.

Irrespective of whether a voltage is applied or not, in the polymer region 74A, the direction of the major axis of the polymer varies in the twisting direction from the alignment film 33 side toward the alignment film 65 side. Specifically, in the polymer region 74A located closer to the alignment film 33, the major axis of the polymer is parallel or substantially parallel to the light incident surface 10A and is parallel or substantially parallel to the surface of the transparent substrate 31. On the other hand, in the polymer region 74A located closer to the alignment film 65, the major axis of the polymer is in a direction that is parallel or substantially parallel to the direction (alignment direction) at the angle θ1.

[Optical Anisotropy]

Figure 34:
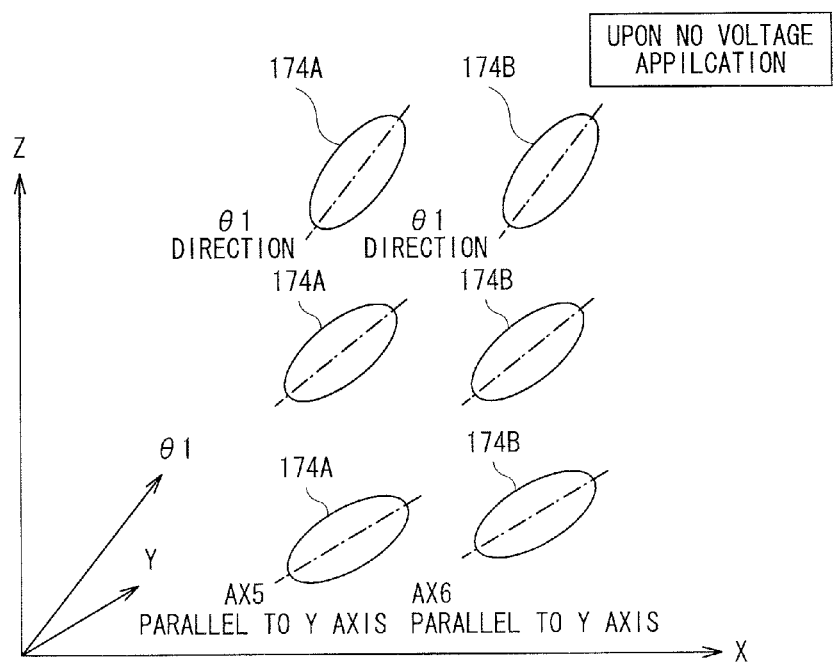
FIG. 34 is a diagram schematically illustrating an example of a function of the light modulation device in FIG. 27.

FIG. 34 schematically illustrates an example of the alignment states in the polymer region 74A and in the liquid crystal region 74B upon no voltage application. Ellipsoids 174A in FIG. 34 each illustrate an example of a refractive index ellipsoid that shows refractive index anisotropy of the polymer region 74A upon no voltage application. Ellipsoids 174B in FIG. 34 each illustrate an example of a refractive index ellipsoid that shows refractive index anisotropy of the liquid crystal region 74B upon no voltage application.

Figure 35:
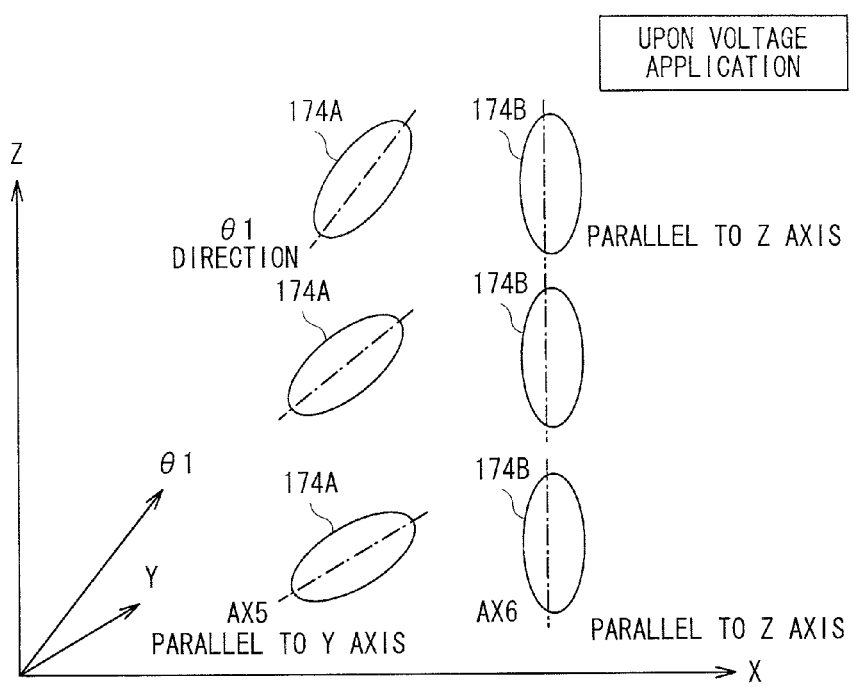
FIG. 35 is a diagram schematically illustrating another example of the function of the light modulation device in FIG. 27.

FIG. 35 schematically illustrates an example of the alignment states in the polymer region 74A and in the liquid crystal region 74B upon voltage application. The ellipsoids 174A in FIG. 35 each illustrate an example of the refractive index ellipsoid that shows refractive index anisotropy of the polymer region 74A upon voltage application. The ellipsoids 174B in FIG. 35 each illustrate an example of the refractive index ellipsoid that shows refractive index anisotropy of the liquid crystal region 74B upon voltage application.

The polymer region 74A and the liquid crystal region 74B may have, for example, configurations in which a direction of an optical axis AX5 (in particular, a major axis of the ellipsoid 174A) of the polymer region 74A coincides with (is parallel to) a direction of an optical axis AX6 (in particular, a major axis of the ellipsoid 174B) of the liquid crystal region 74B upon no voltage application, as shown in FIG. 34. It is to be noted that the optical axes AX5 and AX6 each indicate a line that is parallel to a traveling direction of a light ray that has one refractive index value irrespective of a polarization direction. Also, the directions of the optical axes AX5 and AX6 do not necessarily coincide with each other upon no voltage application, and the direction of the optical axis AX5 may be different in some degree from the direction of the optical axis AX6, for example, due to manufacturing error, etc.

In the liquid crystal region 74B, the direction of the optical axis AX6 varies in the twisting direction from the alignment film 33 side toward the alignment film 65 side upon no voltage application. Specifically, in the region closer to the alignment film 33, the optical axis AX6 is parallel or substantially parallel to the light incident surface 10A and is parallel or substantially parallel to the surface of the transparent substrate 31. When the alignment film 33 has the pre-tilt function, in the region closer to the alignment film 33, the optical axis AX6 is parallel or substantially parallel to the light incident surface 10A and intersects with the surface of the transparent substrate 31 at a predetermined pre-tilt angle upon no voltage application. In other words, upon no voltage application, the optical axis AX6 is parallel or substantially parallel to the linear light source in the region closer to the alignment film 33. Further, in the region closer to the alignment film 65, the optical axis AX6 is parallel or substantially parallel to the direction (alignment direction) at the angle θ1 and is parallel or substantially parallel to the surface of the transparent substrate 31 upon no voltage application. It is to be noted that, when the alignment film 65 has the pre-tilt function, in the region closer to the alignment film 65, the optical axis AX6 is in the direction that is parallel or substantially parallel to the direction (alignment direction) at the angle θ1 and is in the direction that intersects with the surface of the transparent substrate 31 at a predetermined pre-tilt angle. In other words, upon no voltage application, the optical axis AX6 is in the direction that is parallel or substantially parallel to the direction (alignment direction) at the angle θ1 in the region closer to the alignment film 65.

In the polymer region 74A, the direction of the optical axis AX5 varies in the twisting direction from the alignment film 33 side toward the alignment film 65 irrespective of whether a voltage is applied or not. Specifically, in the region closer to the alignment film 33, the optical axis AX5 is parallel or substantially parallel to the light incident surface 10A and is parallel or substantially parallel to the surface of the transparent substrate 31. In other words, upon no voltage application, the optical axis AX5 is parallel or substantially parallel to the optical axis AX6 in the region closer to the alignment film 33. It is to be noted that, when the alignment film 33 has the pre-tilt function, in the region closer to the alignment film 33, the optical axis AX5 is parallel or substantially parallel to the light incident surface 10A and intersects with the surface of the transparent substrate 31 at a predetermined pre-tilt angle. In other words, also in this case, upon no voltage application, the optical axis AX5 is parallel or substantially parallel to the optical axis AX6 in the region closer to the alignment film 33. Also, the optical axis AX5 is in the direction that is parallel or substantially parallel to the direction (alignment direction) at the angle θ1 in the region closer to the alignment film 65. In other words, upon no voltage application, the optical axis AX5 is parallel or substantially parallel to the optical axis AX6 in the region closer to the alignment film

65. It is to be noted that, when the alignment film 65 has the pre-tilt function, in the region closer to the alignment film 65, the optical axis AX5 is parallel or substantially parallel to the direction (alignment direction) at the angle θ1 and intersects with the surface of the transparent substrate 31 at a predetermined pre-tilt angle. In other words, also in this case, upon no voltage application, the optical axis AX5 is parallel or substantially parallel to the optical axis AX6 in the region closer to the alignment film 65.

It is preferable that an ordinary refractive index of the polymer region 74A be the same as that of the liquid crystal region 74B and an extraordinary refractive index of the polymer region 74A be the same as that of the liquid crystal region 74B. In this case, for example, there is almost no refractive index difference in all directions that includes the front direction and the oblique direction and high transparency is obtained upon no voltage application. Therefore, for example, light from the light source 20 passes through the light modulation layer 74 without being scattered in the light modulation layer 74. As a result, for example, light (light from the oblique direction) from the light source 20 propagates in a region (transparent region 30A) that has been transparent in the light modulation device 70 and is totally reflected by an interface of the light modulation device 70 and the air. Therefore, luminance (luminance in black display) in the transparent region 30A is decreased compared to a case where luminance is uniform.

Moreover, the polymer region 74A and the liquid crystal regions 74B may have, for example, a configuration in which the directions of the optical axis AX5 and the optical axis AX6 are different from each other (intersect with each other, or are orthogonal to each other) upon voltage application, as shown in FIG. 35. In particular, the liquid crystal region 74B has a configuration in which the optical axis AX6 is parallel or substantially parallel to the light incident surface 10A and is parallel or substantially parallel to the normal to the surface of the transparent substrate 31 upon voltage application.

Accordingly, in the light modulation layer 74, the refractive index difference becomes large in all directions and high scattering characteristics are obtained upon voltage application. Therefore, light from the light source 20 is scattered in the light modulation layer 74. As a result, light from the light source 20 is scattered in a region (scattering region 30B) that is in a scattering state in the light modulation device 70, and the scattered light directly enters the light guide plate 10, or enters the light guide plate 10 after being reflected by the reflective plate 40, and is emitted from the top face (light emission face) of the light guide plate 10, for example. Therefore, luminance in the scattering region 30B becomes extremely high compared to a case where luminance is uniform, and further, partial luminance in white display (luminance enhancement) is increased in proportion to the decreased amount of luminance in the transparent region 30A.

When the angle θ1 (for example, a rubbing angle) is equal to or larger than 60° and smaller than 90°, contrast of bright-dark stripes due to the arrangement of the light source 20 is largely reduced and non-uniformity in luminance in the vicinity of the light source 20 is almost eliminated. It is to be noted that, when the light modulation layer 74 is caused to easily satisfy A>C>B and A/B<A1/B1 by adding a monofunctional monomer or a polyfunctional monomer as a low-molecular monomer having both polymerizability and liquid crystallinity to the raw material of the light modulation layer 74 or by reducing intensity and an integral amount of ultraviolet rays irradiated to the raw material of the light modulation layer 74, a favorable range of the angle θ1 (for example, a rubbing angle) may be equal to or larger than 30° and smaller than 90°. Further, when the light modulation layer 74 is caused to more easily satisfy A>C>B and A/B<A1/B1 by adding a monofunctional monomer or a polyfunctional monomer as a low-molecular monomer having both polymerizability and liquid crystallinity to the raw material of the light modulation layer 74 or by reducing intensity and an integral amount of ultraviolet rays irradiated to the raw material of the light modulation layer 74, the favorable range of the angle θ1 (for example, a rubbing angle) may be equal to or larger than 10° and smaller than 90°.

It is to be noted that ordinary refractive indices of the polymer region 74A and the liquid crystal region 74B may be different in some degree, for example, due to manufacturing error, and, for example, are preferably 0.1 or smaller, and more preferably 0.05 or smaller. Also, extraordinary refractive indices of the polymer region 74A and the liquid crystal region 74B may be different in some degree, for example, due to manufacturing error, and are, for example, preferably 0.1 or smaller, and more preferably 0.05 or smaller.

Moreover, it is preferable that a refractive index difference (=extraordinary refractive index−ordinary refractive index) of the polymer region 74A, a refractive index difference (=extraordinary refractive index−ordinary refractive index) of the liquid crystal region 74B, etc. be as large as possible. The foregoing refractive index differences are preferably 0.05 or larger, more preferably 0.1 or larger, and further more preferably 0.15 or larger. One reason for this is that, in the case where the refractive index differences of the polymer region 74A and the liquid crystal region 74B are large, scattering performance of the light modulation layer 74 is high, which leads to easy destruction of a light guiding condition, and thereby, light from the light guide plate 10 is easily extracted.

[Anisotropic Scattering]

Next, anisotropic scattering in the present embodiment will be described. In the present embodiment, anisotropic scattering is caused by (a) non-uniformity in existence probability of the interfaces (scattering interfaces) of the polymer region 74A and the liquid crystal regions 74B in the scattering region 30B and (b) birefringence in the scattering region 30B. Therefore, description will be given in detail below of the non-uniformity in the existence probability of the scattering interfaces in the scattering region 30B and of the birefringence in the scattering region 30B.

[Non-uniformity in Existence Probability of Scattering Interface]

In a portion of the scattering region 30B closer to the alignment film 33, the interfaces of the polymer region 74A and the liquid crystal regions 74B are formed densely in a direction that is orthogonal to the alignment direction of the alignment film 33, and are formed sparsely in a direction that is parallel to the alignment direction of the alignment film 33. The direction that is orthogonal to the alignment direction of the alignment film 33 refers to the first direction or to the third direction. The direction that is parallel to the alignment direction of the alignment film 33 refers to the second direction.

In a portion of the scattering region 30B closer to the alignment film 65, the interfaces of the polymer region 74A and the liquid crystal regions 74B are formed densely in a direction that is orthogonal to the alignment direction of the alignment film 65, and are formed sparsely in a direction that is parallel to the alignment direction of the alignment film 65. The direction that is orthogonal to the alignment direction of the alignment film 65 refers to a direction that is orthogonal to the direction (alignment direction) intersecting with the light incident surface 10A at the angle θ1 and is parallel to the surface of the transparent substrate 31, or refers to the third direction. The direction that is parallel to the alignment direction of the alignment film 65 refers to a direction that is parallel to the direction (alignment direction) intersecting with the light incident surface 10A at the angle θ1 and is parallel to the surface of the transparent substrate 31.

Light that propagates in the first direction in the portion of the scattering region 30B closer to the alignment film 33 enters the interface with a cycle of an average streaky organization size in the minor-axis direction of the streaky structure in the polymer region 74A, and therefore, is largely scattered. On the other hand, light that propagates in the second direction in the portion of the scattering region 30B closer to the alignment film 33 enters the interface with a cycle of an average streaky organization size in the major-axis direction of the streaky structure in the polymer region 74A, and therefore, is not scattered much.

Light that propagates in the first direction in the portion of the scattering region 30B closer to the alignment film 65 enters the interface with a cycle between the cycle of the average streaky organization size in the minor-axis direction of the streaky structure in the polymer region 74A and the cycle of the average streaky organization size in the major-axis direction of the streaky structure in the polymer region 74A. Therefore, scattering of this light is smaller than scattering of light that enters the interface with the cycle of the average streaky organization size in the minor-axis direction of the streaky structure in the polymer region 74A in the portion of the scattering region 30B closer to the alignment film 65.

It is to be noted that a magnitude relationship between the scattering of light that propagates in the first direction in the portion of the scattering region 30B closer to the alignment film 65 and the scattering of light that propagates in the second direction in the portion of the scattering region 30B closer to the alignment film 65 depends on a magnitude relationship in cycle at the interface of the polymer region 74A and the liquid crystal region 74B in traveling directions of the light.

[Birefringence]

Light that propagates in the first direction in the portion of the scattering region 30B closer to the alignment film 33 propagates while being influenced by a difference between an extraordinary refractive index of the liquid crystal region 74B and an ordinary refractive index of the polymer region 74A and by a difference between an ordinary refractive index of the liquid crystal region 74B and an extraordinary refractive index of the polymer region 74A, with the cycle of the average streaky organization size in the minor-axis direction of the streaky structure in the polymer region 74A. Therefore, scattering of light that propagates in the first direction in the portion of the scattering region 30B closer to the alignment film 33 is largely scattered.

Light that propagates in the second direction in the portion of the scattering region 30B closer to the alignment film 33 propagates while being influenced only by the difference between the extraordinary refractive index of the liquid crystal region 74B and the ordinary refractive index of the polymer region 74A, with the cycle of the average streaky organization size in the major-axis direction of the streaky structure in the polymer region 74A. As a result, light that propagates in the second direction in the portion of the scattering region 30B closer to the alignment film 33 is not scattered much.

Light that propagates in the first direction in the portion of the scattering region 30B closer to the alignment film 65 propagates while being influenced by the difference between the extraordinary refractive index of the liquid crystal region 74B and the ordinary refractive index of the polymer region 74A and by the difference between the ordinary refractive index of the liquid crystal region 74B and the extraordinary refractive index of the polymer region 74A, with a cycle between the cycle of the average streaky organization size in the minor-axis direction of the streaky structure in the polymer region 74A and the cycle of the average streaky organization size in the major-axis direction of the streaky structure in the polymer region 74A. Therefore, scattering of light that propagates in the first direction in the portion of the scattering region 30B closer to the alignment film 65 is smaller than scattering of light that propagates in a direction that is the direction (alignment direction) intersecting with the light incident surface 10A at the angle θ1 and is parallel to the surface of the transparent substrate 31 in the portion of the scattering region 30B closer to the alignment film 65.

Light that propagates in a direction that is parallel to the light incident surface 10A and is parallel to the surface of the transparent substrate 31 in the portion of the scattering region 30B closer to the alignment film 65 propagates while being influenced by the difference between the extraordinary refractive index of the liquid crystal region 74B and the ordinary refractive index of the polymer region 74A and by the difference between the ordinary refractive index of the liquid crystal region 74B and the extraordinary refractive index of the polymer region 74A, with a cycle between the cycle of the average streaky organization size in the minor-axis direction of the streaky structure in the polymer region 74A and the cycle of the average streaky organization size in the major-axis direction of the streaky structure in the polymer region 74A. Therefore, scattering of light that propagates in the direction that is parallel to the light incident surface 10A and is parallel to the surface of the transparent substrate 31 in the portion of the scattering region 30B closer to the alignment film 65 is smaller than scattering of light that propagates in the direction that is the direction (alignment direction) intersecting with the light incident surface 10A at the angle θ1 and is parallel to the surface of the transparent substrate 31 in the portion of the scattering region 30B closer to the alignment film 65.

Here, when the angle θ1 is larger than 45° and smaller than 90°, a cycle of the interfaces of the polymer region 74A and the liquid crystal regions 74B in a direction that is orthogonal to the light incident surface 10A and is parallel to the surface of the transparent substrate 31 is longer than a cycle of the interfaces of the polymer region 74A and the liquid crystal regions 74B in a direction that is parallel to the light incident surface 10A and is parallel to the surface of the transparent substrate 31. Therefore, in this case, scattering of light that propagates in the scattering region 30B in the direction that is orthogonal to the light incident surface 10A and is parallel to the surface of the transparent substrate 31 is smaller than scattering of light that propagates in the scattering region 30B in the direction that is parallel to the light incident surface 10A and is parallel to the surface of the transparent substrate 31.

When the angle θ1 is larger than 0° and smaller than 45°, a cycle of the interfaces of the polymer region 74A and the liquid crystal regions 74B in the direction that is orthogonal to the light incident surface 10A and is parallel to the surface of the transparent substrate 31 is shorter than a cycle of the interfaces of the polymer region 74A and the liquid crystal regions 74B in the direction that is parallel to the light incident surface 10A and is parallel to the surface of the transparent substrate 31. Therefore, in this case, scattering of light that propagates in the scattering region 30B in the direction that is orthogonal to the light incident surface 10A and is parallel to the surface of the transparent substrate 31 is larger than light that propagates in the scattering region 30B in the direction that is parallel to the light incident surface 10A and is parallel to the surface of the transparent substrate 31.

In other words, the optical modulation layer 74 has a configuration in which, scattering with respect to light that propagates in the direction that is orthogonal to the light incident surface 10A and is parallel to the surface of the transparent substrate 31 exhibits anisotropic scattering that is smaller than that of scattering with respect to light that propagates in the direction that is parallel to the light incident surface 10A and is parallel to the surface of the transparent substrate 31, when the angle θ1 is larger than 45° and smaller than 90°. Further, the optical modulation layer 74 has a configuration in which, scattering with respect to light that propagates in the direction that is orthogonal to the light incident surface 10A and is parallel to the surface of the transparent substrate 31 exhibits anisotropic scattering that is larger than that of scattering with respect to light that propagates in the direction that is parallel to the light incident surface 10A and is parallel to the surface of the transparent substrate 31, when the angle θ1 is larger than 0° and smaller than 45°.

Next, magnitude of anisotropic scattering will be described.

Magnitude of anisotropy of scattering refers to a quotient of three axes of magnitude of scattering with respect to light that propagates in the first direction (X-axis direction), magnitude of scattering with respect to light that propagates in the second direction (Y-axis direction), and magnitude of scattering with respect to light that propagates in the third direction (Z-axis direction). Here, the quotient of the three axes specifically refers to sum of the following three ((A) to (C)). Anisotropy of scattering is large when the quotient of the three axes is large and anisotropy of scattering is small when the quotient of the three axes is small. It is assumed that a value of numerator is larger than a value of denominator in the following (A) to (C). Therefore, in an example where the value of the numerator is smaller than the value of the denominator, it is preferable to exchange the values of the numerator and the denominator in the following (A) to (C).

(A) (magnitude of scattering with respect to light that propagates in the first direction)/(magnitude of scattering with respect to light that propagates in the second direction)

(B) (magnitude of scattering with respect to light that propagates in the third direction)/(magnitude of scattering with respect to light that propagates in the second direction)

(C) (magnitude of scattering with respect to light that propagates in the first direction)/(magnitude of scattering with respect to light that propagates in the third direction)

Magnitude of anisotropy of scattering is defined by (a) non-uniformity in existence probability of the interfaces (scattering interfaces) of the polymer region 74A and the liquid crystal regions 74B in the scattering region 30B and (b) birefringence in the scattering region 30B. In magnitude of anisotropy of scattering, the above-described component (a) is dominant. One reason for this is that, when considering existence probability of scattering interfaces, the same media is ideally continued in the second direction, and therefore scattering is not caused in the second direction and is caused only in the first direction and in the third direction. At this time, scattering in the second direction is theoretically zero. Therefore, scattering ratio between the second direction and the first and third directions becomes infinite. On the other hand, when considering birefringence, two polarization components are scattered in the first direction but only one polarization component is scattered in the second direction and in the third direction. At this time, the scattering ratio between the first direction and the second and third directions is merely 2:1. Therefore, the above-described component (a) is dominant in magnitude of anisotropy of scattering. Therefore, description will be given below of a relationship between existence probability of scattering interfaces and magnitude of anisotropy of scattering, and description of a relationship between birefringence and magnitude of anisotropy of scattering will be omitted.

Magnitude of anisotropy of scattering corresponds to a quotient of three axes of a cycle in the first direction in the light modulation layer 74, a cycle in the second direction in the light modulation layer 74, and a cycle in the third direction in the light modulation layer 74. Here, the quotient of the three axes specifically refers to sum of the following three ((D) to (F)). It is assumed that a value of numerator is larger than a value of denominator in the following (D) to (F). Therefore, in an example where the value of the numerator is smaller than the value of the denominator, it is preferable to exchange the values of the numerator and the denominator in the following (D) to (F).

(D) (cycle in the second direction in the light modulation layer 74)/(cycle in the first direction in the light modulation layer 74)

(E) (cycle in the second direction in the light modulation layer 74)/(cycle in the third direction in the light modulation layer 74)

(F) (cycle in the third direction in the light modulation layer 74)/(cycle in the first direction in the light modulation layer 74)

Magnitude of anisotropy of scattering in the scattering region 30B in the vicinity of the alignment film 33 is a value corresponding to Ph1/Ph3+Ph1/Pv1+Pv1/Ph3. On the other hand, magnitude of anisotropy of scattering in the scattering region 30B in the vicinity of the alignment film 65 is a value corresponding to Ph5/Ph6+Ph5/Pv5+Pv5/Ph6. Here, the cycles may be, for example, in the following relationship.

$$Ph5/Ph6 < Ph1/Ph3 = Ph10/Ph20$$

$$Ph5/Pv5 < Ph1/Pv1 = Ph10/Pv10$$

$$Pv5/Ph6 \approx Pv1/Ph3 = Pv10/Ph20$$

At this time, the light modulation layer 74 is so formed that, when the light modulation layer 74 exhibits scattering characteristics, magnitude (A/B) of anisotropy of scattering of the light modulation layer 74 is smaller than magnitude (A1/B1) of anisotropy of scattering of the light modulation layer 134.

Anisotropy of scattering is different between in the light modulation layer 74 and in the light modulation layer 134. One reason for this is that the direction of the optical axis AX5 varies in the thickness direction of the light modulation layer 74 in the light modulation layer 74. Specifically, the reason is that anisotropy of scattering of the portion of the light modulation layer 74 closer to the alignment film 65 is smaller than anisotropy of scattering of the portion of the light modulation layer 74 closer to the alignment film 33. In the present embodiment, as a method of varying the direction of the optical axis AX5 in the thickness direction of the light modulation layer 74, the pair of alignment films 33 and 65 that have different alignment directions are used. Specifically, a horizontal alignment film that has an alignment direction of 0° is used as the alignment film 33 on the transparent substrate 31 side, and a horizontal alignment film that has an alignment direction at θ1 (0°<θ1≤90°) is used as the alignment film 65 on the transparent substrate 37 side.

[Manufacturing Method]

It is to be noted that the light modulation layer 74 and the light modulation device 70 are manufactured by a method similar to that of the light modulation layer 34 and the light modulation device 30 in the above-described first embodiment. In particular, liquid crystals and low-molecular monomers in the mixture 44 are aligned by the alignment function of the alignment films 33 and 65, and then, the low-molecular monomers are polymerized to be polymers by ultraviolet irradiation. Thus, the light modulation device 70 including the light modulation layer 74 that satisfies A>C>B and A/B<A1/B1 is manufactured.

[Effects]

Next, effects of the illumination unit 3 will be described. In the present embodiment, the direction of the optical axis AX5 varies in the twisting direction from the alignment film 33 side toward the alignment film 65 side. Therefore, when the light modulation layer 74 exhibits scattering characteristics, magnitude (AB) of anisotropy of scattering in the light modulation layer 74 is smaller than magnitude (A1/B1) of anisotropy of scattering in the light modulation layer 134. As a result, anisotropic scattering with respect to light that propagates in the light modulation layer 74 is moderated more than anisotropic scattering with respect to light that propagates in the light modulation layer 134. Here, bright-dark stripes due to the arrangement of the light source 20 are caused by a large difference between the first scattering and the second scattering. Accordingly, contrast in bright-dark stripes due to the arrangement of the light source 20 is reduced by moderating the above-described anisotropic scattering in whole of the light modulation layer 74. As a result, uniformity in luminance is improved.

[4. Modifications]

[Modification 1]

Figure 36:
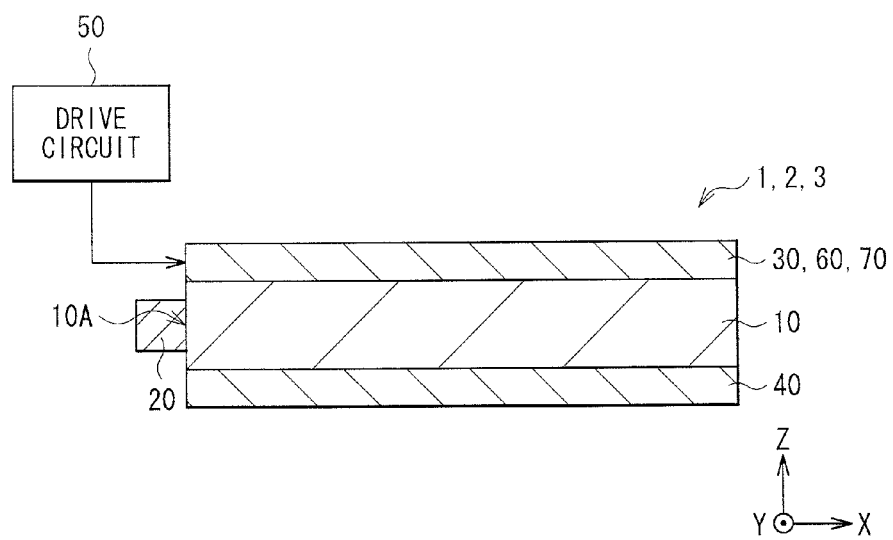
FIG. 36 is a diagram illustrating a first modification of the outline configurations of the illumination units in FIGS. 1, 19, and 27.
Figure 37:
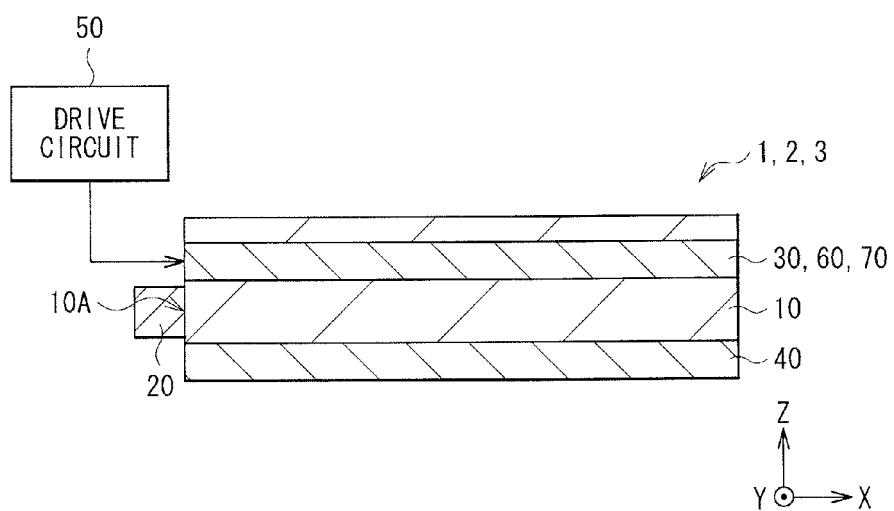
FIG. 37 is a diagram illustrating a second modification of the outline configurations of the illumination units in FIGS. 1, 19, and 27.

In the above-described embodiments, the light modulation devices 30, 60, and 70 are each joined closely to the back (bottom face) of the light guide plate 10 without an air layer in between. However, for example, as shown in FIG. 36, the light modulation devices 30, 60, and 70 each may be joined closely to the top face of the light guide plate 10 without an air layer in between. Alternatively, the light modulation devices 30, 60, and 70 each may be provided inside the light guide plate 10, for example, as shown in FIG. 37. It is to be noted that, also in this case, it is necessary for the light modulation devices 30, 60, and 70 to be each joined to the light guide plate 10 without an air layer in between.

[Modification 2]

Figure 38:
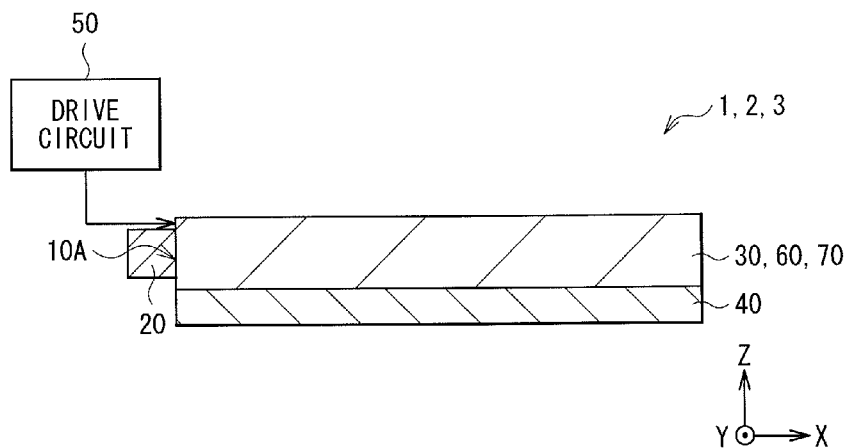
FIG. 38 is a diagram illustrating a third modification of the outline configurations of the illumination units in FIGS. 1, 19, and 27.

In each of the above-described embodiments and the modifications thereof, the light guide plate 10 is provided. However, the light guide plate 10 may be omitted, for example, as shown in FIG. 38. It is to be noted that, in this case, the transparent substrate 31 or the transparent substrate 37 serves as the light guide plate 10. Therefore, the light source 20 is arranged on the side face of the transparent substrate 31 or of the transparent substrate 37.

[Modification 3]

Figure 39:
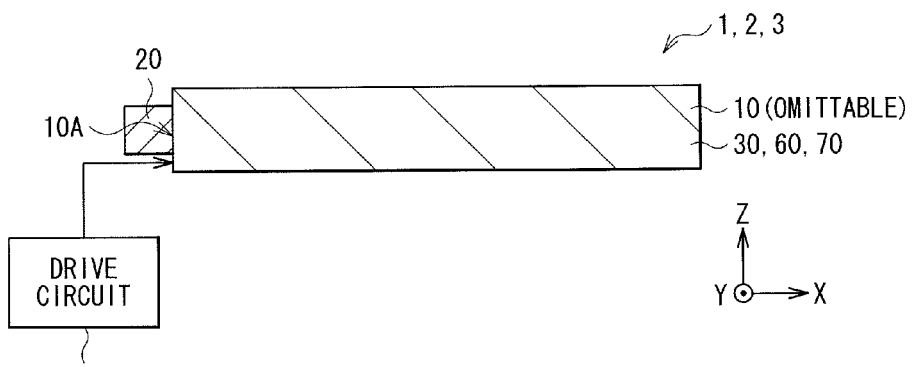
FIG. 39 is a diagram illustrating a fourth modification of the outline configurations of the illumination units in FIGS. 1, 19, and 27.

In each of the above-described embodiments and the modifications thereof, the reflective plate 40 is provided. However, the reflective plate 40 may be omitted, for example, as shown in FIG. 39. In this case, the lower electrode 32 is preferably formed not of a transparent material, but, for example, of metal. When the lower electrode 32 is formed of metal, the lower electrode 32 also serves to reflect light entering from the back of the light guide plate 10 to the light modulation device 30, as the reflective plate 40 does. It is to be noted that, the light guide plate 10 may be omitted in the present modification as in the above-described Modification 2.

[Modification 4]

Figure 40:
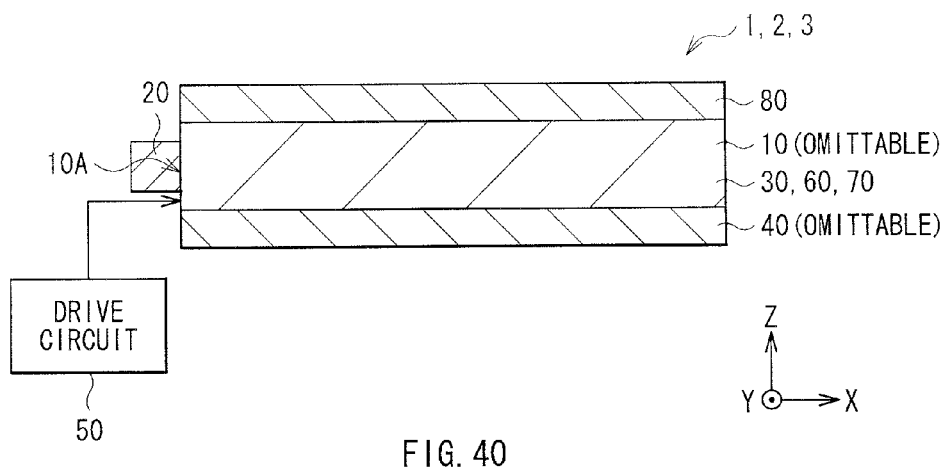
FIG. 40 is a diagram illustrating a fifth modification of the outline configurations of the illumination units in FIGS. 1, 19, and 27.

In each of the above-described embodiments and the modifications thereof, any optical sheet is not provided on the light emission surface. However, for example, as shown in FIG. 40, an optical sheet 80 (such as a diffusion plate, a diffusion sheet, a lens film, and a polarization separation sheet) may be provided thereon. In this case, part of light emitted from the light guide plate 10 in an oblique direction rises up in the front direction. Therefore, a modulation ratio is effectively improved. It is to be noted that, in the present modification, the light guide plate 10 may be omitted as in the above-described Modification 2. Alternatively, in the present modification, the reflective plate 40 may be omitted as in the above-described Modification 3. Alternatively, the light guide plate 10 and the reflective plate 40 may both be omitted in the present modification.

[Modification 5]

Figure 41:
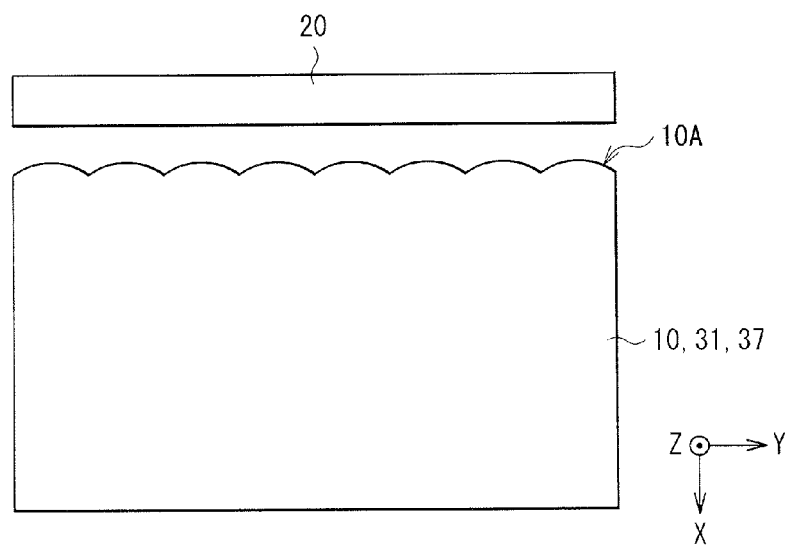
FIG. 41 is a diagram illustrating a first modification of a light guide plate or a transparent substrate in the illumination units in FIGS. 1, 19, and 27.

In each of the above-described embodiments and the modifications thereof, for example, as shown in FIG. 41, the end face (light incident surface 10A) of the light guide plate 10, of the transparent substrate 31, or of the transparent substrate 37 may have a three-dimensional shape that enlarges a divergence angle of light from the light source 20. For example, the light incident surface 10A may have a cylindrical shape, a prism shape, or a convex shape, corresponding to the arrangement of the light source 20. Due to the fact that the light incident surface 10A has the above-described shape, a divergence angle of light that enters the light modulation device 30, 60, or 70 is enlarged. Accordingly, magnitude of anisotropy of scattering in the light modulation layers 34, 64, and 74 becomes smaller in proportion to the enlarged amount of the divergence angle. Therefore, the function of anisotropic scattering with respect to light that propagates inside the light modulation layer 34, 64, or 74 is moderated. As a result, uniformity in luminance is improved.

[Modification 6]

Figure 42:
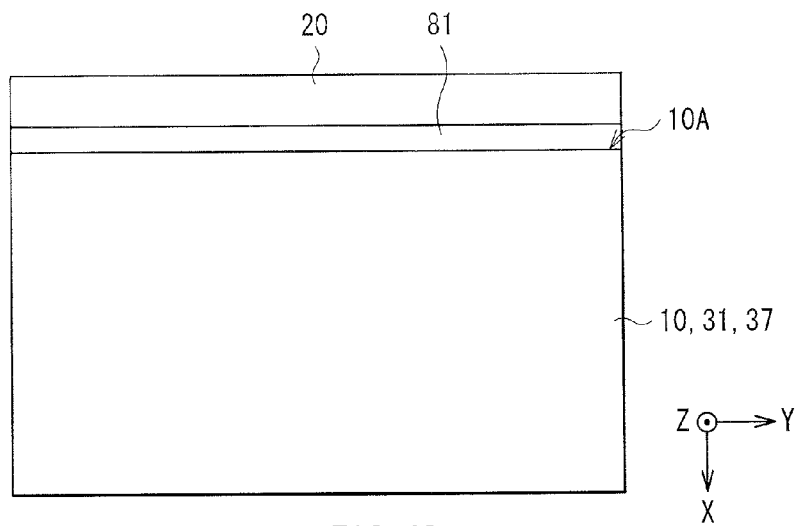
FIG. 42 is a diagram illustrating a second modification of the light guide plate or the transparent substrate in the illumination units in FIGS. 1, 19, and 27.

In each of the above-described embodiments and the modifications thereof, for example, as shown in FIG. 42, matching oil 81 (oil for refractive index matching) may be provided that fills a gap between the light incident surface 10A and the light source 20. By providing the matching oil 81 in the gap between the light incident surface 10A and the light source 20 as described above, the divergence angle of light that enters the light modulation device 30, 60, or 70 is enlarged. Accordingly, magnitude of anisotropy of scattering in the light modulation layers 34, 64, and 74 becomes smaller in proportion to the enlarged amount of the divergence angle. Therefore, the function of anisotropic scattering with respect to light that propagates inside the light modulation layer 34, 64, or 74 is moderated. As a result, uniformity in luminance is improved.

[Modification 7]

Figure 43:
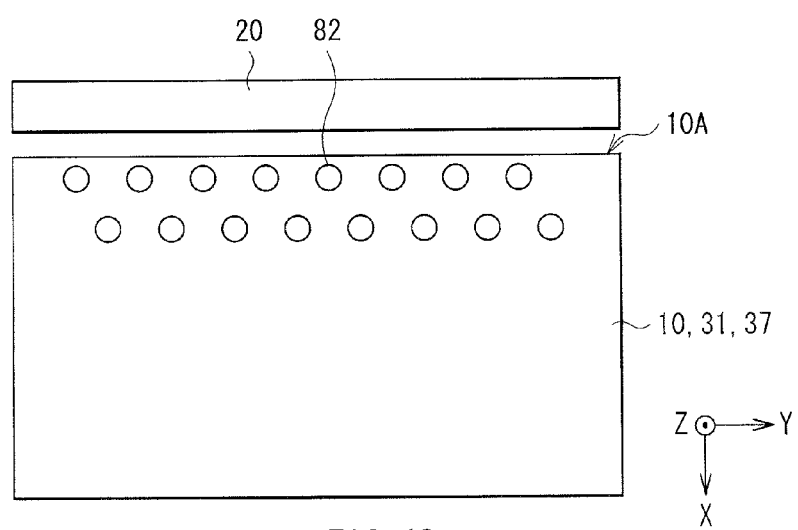
FIG. 43 is a diagram illustrating a third modification of the light guide plate or the transparent substrate in the illumination units in FIGS. 1, 19, and 27.

In each of the above-described embodiments and the modifications thereof, for example, as shown in FIG. 43, a spacer 82 that is formed of a material having a refractive index that is different from that of the light guide plate 10, the transparent substrate 31, or the transparent substrate 37 may be provided at least in a portion of the light guide plate 10, the transparent substrate 31, or the transparent substrate 37 in the vicinity of the light source 20. By providing the spacer 82 at least in the portion of the light guide plate 10, the transparent substrate 31, or the transparent substrate 37 in the vicinity of the light source 20 as described above, light that propagates at least in the portion of the light guide plate 10, the transparent substrate 31, or the transparent substrate 37 in the vicinity of the light source 20 may be, for example, refracted or scattered. Therefore, magnitude of anisotropy of scattering in the light modulation layers 34, 64, and 74 becomes smaller in proportion to the amount of refraction and scattering by the spacer 82. Therefore, the function of anisotropic scattering with respect to light that propagates inside the light modulation layer 34, 64, or 74 is moderated. As a result, uniformity in luminance is improved.

[Modification 8]

In each of the above-described embodiments and the modifications thereof, the light modulation layers 34, 64, and 74 may each be formed by polymerizing a material that includes a bifunctional monomer (low-molecular monomer having both polimerizability and liquid crystallinity) as a main raw material and further includes a monofunctional monomer or a polyfunctional monomer (low-molecular monomer having both polimerizability and liquid crystallinity) as an additive. Alternatively, in each of the above-described embodiments and the modifications thereof, the light modulation layers 34, 64, and 74 may be formed by polymerizaing a material that includes a monofunctional monomer or a polyfunctional monomer (low-molecular monomer having both polimerizability and liquid crystallinity) as a main raw material.

The bifunctional monomer contributes to improvement in crosslink density and is a material that is favorable for forming a streaky structure. On the other hand, the polyfunctional monomer contributes to improvement in crosslink density further more than the bifunctional monomer. The polyfunctional monomer is a material favorable for forming a three-dimensional structure that is more complicated than the streaky structure, and is an additive favorable for breaking the streaky structure. Further, the monofunctional monomer contributes to decreasing crosslink density and is an additive that is favorable for breaking the streaky structure. Accordingly, by using a material such as those described above as the raw material of the light modulation layers 34, 64, and 74, magnitude of anisotropy of scattering in the light modulation layers 34, 64, and 74 becomes smaller compared to those include the bifunctional monomer as the main raw material. Therefore, the function of anisotropic scattering with respect to light that propagates inside the light modulation layer 34, 64, or 74 is further moderated. As a result, uniformity in luminance is improved.

[Modification 9]

In each of the above-described embodiments and the modifications thereof, the light modulation layers 34, 64, and 74 each may be formed by mixing a liquid crystal material and a low-molecular monomer having both polimerizability and liquid crystallinity so that the weight ratio thereof is in a range from 95:5 to 50:50 both inclusive and by irradiating ultraviolet ray to the mixture to cure the above-described low-molecular monomer. Thus, magnitude of anisotropy of scattering in the light modulation layers 34, 64, and 74 becomes smaller than those that are formed so that the weight ratio of the liquid crystal material is the existing weight ratio (for example, 98%). Therefore, the function of anisotropic scattering with respect to light that propagates inside the light modulation layer 34, 64, or 74 is moderated. As a result, uniformity in luminance is further improved.

[5. Fourth Embodiment]

Figure 44:
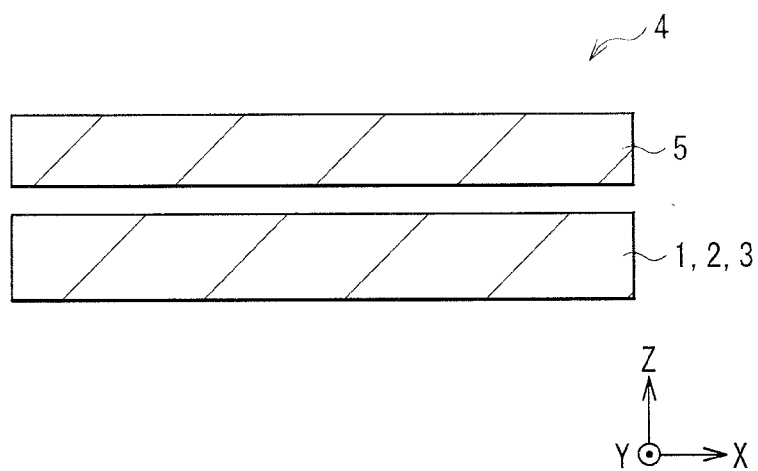
FIG. 44 is a diagram illustrating an example of a display according to a fourth embodiment of the present application.

Next, description will be given of a display 4 according to a fourth embodiment of the present application. The display 4 of the present embodiment may include, as shown in FIG. 44, a display panel 5 that displays an image by modulating light, the illumination unit 1, 2, or 3 that illuminates the display panel 5 from the back thereof, and a drive circuit (not illustrated) that drives the display panel 5 and the illumination unit 1, 2, or 3.

The display panel 5 includes a plurality of pixels arranged in a matrix. The plurality of pixels are driven based on an image signal, and thereby, the display panel 5 displays an image. The display panel 5 may be, for example, a transmissive display panel in which each pixel is driven based on an image signal, and has a structure in which a liquid crystal layer is sandwiched by a pair of transparent substrates. Specifically, the display panel 5 may include a polarizer, a transparent substrate, pixel electrodes, an alignment film, a liquid crystal layer, an alignment film, a common electrode, a color filter, a transparent substrate, and a polarizer in order from the illumination unit 1, 2, or 3.

The transparent substrate is formed of a substrate that is transparent with respect to visible light, for example, a plate glass. It is to be noted that an active drive circuit that includes a TFT (Thin Film Transistor) electrically connected to the pixel electrodes, wirings, etc. is formed on the transparent substrate on the backlight 211 side, which is not illustrated. The pixel electrodes and the common electrode may be formed, for example, of indium tin oxide (ITO). The pixel electrodes are two-dimensionally arranged on the transparent substrate and each function as an electrode for each pixel. On the other hand, the common electrode is an electrode formed on the entire surface on the color filter, and functions as a common electrode that faces the respective pixel electrodes. The alignment film may be formed, for example, of a polymer material such as polyimide, and may perform an alignment process on liquid crystals.

The liquid crystal layer may be formed, for example, of liquid crystals of a VA (Vertical Alignment) mode, of a TN (Twisted Nematic) mode, or of an STN (Super Twisted Nematic) mode and has a function that varies a direction of a polarization axis of light emitted from the illumination unit 1, 2, or 3 for each pixel in response to a voltage applied from the unillustrated drive circuit. It is to be noted that, by varying the arrangement of the liquid crystals in multiple levels, a direction of a transmission axis for each pixel is adjusted in multiple levels. The color filter includes color filters that may separate light that has passed through the liquid crystal layer into three primary colors of red (R), green (G), and blue (B), or into four colors of R, G, B, and white (W), for example, that are arranged in accordance with the arrangement of the pixel electrodes.

The polarizer is a kind of an optical shutter and only transmits light (polarized light) in a certain oscillation direction. It is to be noted that the polarizer may be an absorptive polarizing device that absorbs light (polarized light) in an oscillation direction other than the transmission axis. However, it is preferable that the polarizer be a reflective polarizing device that reflects light toward the illumination unit 1, 2, or 3 in terms of improvement in luminance. The two polarizers are arranged so that the polarization axes thereof are different by 90° from each other. Light emitted from the illumination unit 1, 2, or 3 thereby passes through via the liquid crystal layer or is shielded by the liquid crystal layer.

The optical axes AX1, AX3, and AX5 may be parallel to the transmission axis of the polarizer on the illumination unit 1, 2, or 3 side. In particular, when the illumination unit 1 that emits light from the backlight that has more amount of polarization component is used, efficiency of utilizing the light of the backlight in the display panel 5 is improved.

It is possible to achieve at least the following configurations from the above-described example embodiments and the modifications of the disclosure.

(1) An illumination unit including:
- a first transparent substrate and a second transparent substrate that are arranged to be separated from each other and to face each other;
- a light source applying light to an end face of the first transparent substrate; and
- a light modulation layer provided in a gap between the first transparent substrate and the second transparent substrate and exhibiting scattering characteristics or transparency with respect to the light from the light source depending on magnitude of an electric field, the light modulation layer including a first region that has optical anisotropy and relatively-high responsiveness to the electric field and a second region that has optical anisotropy and relatively-low responsiveness to the electric field, and the light modulation layer satisfying a following expression when the light modulation layer exhibits the scattering characteristics, $$A/B < A1/B1$$

where A is magnitude of first scattering with respect to the light propagating in a first direction that is perpendicular to the end face,
- B is magnitude of second scattering with respect to the light propagating in a second direction that is parallel to the end face and is parallel to a surface of the first transparent substrate,
- A1 is magnitude of scattering with respect to the light propagating in a direction perpendicular to the end face when an optical axis of the first region is in a direction of a normal to the first transparent substrate, and an optical axis of the second region is in a direction that is parallel to the end face and is orthogonal to the optical axis of the first region, and
- B1 is magnitude of scattering with respect to the light propagating in a direction that is parallel to the end face and is parallel to the surface of the first transparent substrate when the optical axis of the first region is in the direction of the normal to the first transparent substrate and the optical axis of the second region is in a direction that is parallel to the end face and is orthogonal to the optical axis of the first region.

(2) The illumination unit according to (1), further including a first alignment film and a second alignment film that sandwich the light modulation layer, the first alignment film and the second alignment film both allowing the light modulation layer to satisfy the expression A/B<A1/B1.

(3) The illumination unit according to (1), further including a first alignment film and a second alignment film that sandwich the light modulation layer, the first alignment film being a horizontal alignment film, and the second alignment film being a vertical alignment film.

(4) The illumination unit according to (1), further including a first alignment film and a second alignment film that sandwich the light modulation layer, the first alignment film and the second alignment film both being horizontal alignment films, and the first alignment film and the second alignment film each having an alignment direction in a direction that intersects with the end face.

(5) The illumination unit according to (4), wherein the alignment direction of each of the first alignment film and the second alignment film is in a direction that is at an angle equal to or larger than 60 degrees and smaller than 90 degrees with respect to the end face.

(6) The illumination unit according to (1), further including a first alignment film and a second alignment film that sandwich the light modulation layer, the first alignment film and the second alignment film both being horizontal alignment films, and the first alignment film having an alignment direction that is same as an alignment direction of the second alignment film.

(7) The illumination unit according to (6), wherein the alignment direction of each of the first alignment film and the second alignment film is in a direction that is at an angle equal to or larger than 60 degrees and smaller than 90 degrees with respect to the end face.

(8) The illumination unit according to (1), further including a first alignment film and a second alignment film that sandwich the light modulation layer, the first alignment film and the second alignment film both being horizontal alignment films, the first alignment film having an alignment direction in a direction that is parallel to the end face, and the second alignment film having an alignment direction in a direction that intersects with the end face.

(9) The illumination unit according to (8), wherein the alignment direction of the second alignment film is in a direction that is at an angle equal to or larger than 60 degrees and smaller than 90 degrees with respect to the end face.

(10) The illumination unit according to any one of (1) to (9), wherein
- the first region includes a liquid crystal material,
- the second region includes a polymer material, and
- proportion of the first region in the light modulation layer is uniform in whole of the light modulation layer.

(11) The illumination unit according to any one of (1) to (10), wherein
- the first region includes a liquid crystal material, and
- the second region is formed by polymerizing a material that includes a bifunctional monomer as a main raw material and a monofunctional or polyfunctional monomer as an additive.

(12) The illumination unit according to any one of (1) to (11), wherein the first region and the second region are each formed by mixing a liquid crystal material and a monomer that has both polymerizability and crystallinity in such a manner as to allow a weight ratio thereof to be in a range from 95:5 to 50:50 both inclusive and irradiating an ultraviolet ray to the mixture to cure the monomer.

(13) The illumination unit according to any one of (1) to (12), wherein the end face has a three-dimensional shape enlarging a divergence angle of the light from the light source.

(14) The illumination unit according to any one of (1) to (12), further including refractive-index matching oil filling a gap between the end face and the light source.

(15) The illumination unit according to any one of (1) to (12), further including a plurality of spacers provided at least in a region, in the light modulation layer, closer to the end face, the plurality of spacers each having a refractive index that is different from a refractive index of the light modulation layer.

(16) A display provided with a display panel displaying an image by modulating light and an illumination unit illuminating the display panel from back thereof, the illumination unit including:
  a first transparent substrate and a second transparent substrate arranged to be separated from each other and to face each other;
  a light source applying light to an end face of the first transparent substrate; and
  a light modulation layer provided in a gap between the first transparent substrate and the second transparent substrate and exhibiting scattering characteristics or transparency with respect to the light from the light source depending on magnitude of an electric field, the light modulation layer including a first region that has optical anisotropy and relatively-high responsiveness to the electric field and a second region that has optical anisotropy and relatively-low responsiveness to the electric field, and the light modulation layer satisfying a following expression when the light modulation layer exhibits the scattering characteristics, $$A/B < A1/B1$$

where A is magnitude of first scattering with respect to the light propagating in a first direction that is perpendicular to the end face,
  B is magnitude of second scattering with respect to the light propagating in a second direction that is parallel to the end face and is parallel to a surface of the first transparent substrate,
  A1 is magnitude of scattering with respect to the light propagating in a direction perpendicular to the end face when an optical axis of the first region is in a direction of a normal to the first transparent substrate, and an optical axis of the second region is in a direction that is parallel to the end face and is orthogonal to the optical axis of the first region, and
  B1 is magnitude of scattering with respect to the light propagating in a direction that is parallel to the end face and is parallel to the surface of the first transparent substrate when the optical axis of the first region is in the direction of the normal to the first transparent substrate and the optical axis of the second region is in a direction that is parallel to the end face and is orthogonal to the optical axis of the first region.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination unit comprising:
  a first transparent substrate and a second transparent substrate that are arranged to be separated from each other and to face each other;
  a light source applying light to an end face of the first transparent substrate; and
  a light modulation layer provided in a gap between the first transparent substrate and the second transparent substrate and exhibiting scattering characteristics or transparency with respect to the light from the light source depending on magnitude of an electric field, an optical axis of the light modulation layer varies in a thickness direction, the light modulation layer including a first region including a liquid crystal material and that has optical anisotropy and relatively-high responsiveness to the electric field and a second region including a polymer material and that has optical anisotropy and relatively-low responsiveness to the electric field, and the light modulation layer satisfying a following expression when the light modulation layer exhibits the scattering characteristics, $$A/B < A1/B1$$

where A is magnitude of first scattering with respect to the light propagating in an X-axis direction that is perpendicular to the end face, upon no voltage application to the light modulation layer,
  B is magnitude of second scattering with respect to the light propagating in a Y a-axis direction that is parallel to the end face and is parallel to a surface of the first transparent substrate, upon no voltage application to the light modulation layer, a Z-axis direction being perpendicular to the X-axis and Y-axis,
  A1 is magnitude of scattering with respect to the light propagating in the X-axis direction when an optical axis of the first region is in the Z-axis direction, and an optical of the second region is in the Y-axis direction, and
  B1 is a magnitude of scattering with respect to the light propagating in the Y-axis direction when the optical axis of the first region is in the Z-axis direction and the optical axis of the second region is in the Y-axis direction.

2. The illumination unit according to claim 1, further comprising a first alignment film and a second alignment film that sandwich the light modulation layer, the first alignment film and the second alignment film both allowing the light modulation layer to satisfy the expression A/B<A1/B1.

3. The illumination unit according to claim 1, further comprising a first alignment film and a second alignment film that sandwich the light modulation layer, the first alignment film being a horizontal alignment film, and the second alignment film being a vertical alignment film.

4. The illumination unit according to claim 1, further comprising a first alignment film and a second alignment film that sandwich the light modulation layer, the first alignment film and the second alignment film both being horizontal alignment films, the first alignment film having an alignment direction in a direction that is parallel to the end face, and the second alignment film having an alignment direction in a direction that intersects with the end face.

5. The illumination unit according to claim 4, wherein the alignment direction of the second alignment film is in a direction that is at an angle equal to or larger than 60 degrees and smaller than 90 degrees with respect to the end face.

6. The illumination unit according to claim 1, wherein
  a proportion of the first region in the light modulation layer is uniform in whole of the light modulation layer.

7. The illumination unit according to claim 1, wherein
  the first region includes a liquid crystal material, and
  the second region is formed by polymerizing a material that includes a bifunctional monomer as a main raw material and a monofunctional or polyfunctional monomer as an additive.

8. The illumination unit according to claim 1, wherein the first region and the second region are each formed by mixing a liquid crystal material and a monomer that has both polymerizability and crystallinity in such a manner as to allow a weight ratio thereof to be in a range from 95:5 to 50:50 both inclusive and irradiating an ultraviolet ray to the mixture to cure the monomer.

9. The illumination unit according to claim 1, wherein the end face has a three-dimensional shape enlarging a divergence angle of the light from the light source.

10. The illumination unit according to claim 1, further comprising refractive-index matching oil filling a gap between the end face and the light source.

11. The illumination unit according to claim 1, further comprising a plurality of spacers provided at least in a region, in the light modulation layer, closer to the end face, the plurality of spacers each having a refractive index that is different from a refractive index of the light modulation layer.

12. A display provided with a display panel displaying an image by modulating light and an illumination unit illuminating the display panel from back thereof, the illumination unit comprising:
a first transparent substrate and a second transparent substrate arranged to be separated from each other and to face each other;
a light source applying light to an end face of the first transparent substrate; and
a light modulation layer provided in a gap between the first transparent substrate and the second transparent substrate and exhibiting scattering characteristics or transparency with respect to the light from the light source depending on a magnitude of an electric field, an optical axis of the light modulation layer varies in a thickness direction, the light modulation layer including a first region including a liquid crystal material and that has optical anisotropy and relatively-high responsiveness to the electric field, and a second region including a polymer material and that has optical anisotropy and relatively-low responsiveness to the electric field, and the light modulation layer satisfying a following expression when the light modulation layer exhibits the scattering characteristics, $A/B<A1/B1$ where A is a magnitude of first scattering with respect to the light propagating in an X-axis direction that is perpendicular to the end face upon no voltage application to the light modulation layer,
B is a magnitude of second scattering with respect to the light propagating in a Y-axis direction that is parallel to the end face and parallel to a surface of the first transparent substrate upon no voltage application to the light modulation layer, a Z-axis direction being perpendicular to the X-axis and Y-axis,
A1 is a magnitude of scattering with respect to the light propagating in the X-axis direction when an optical axis of the first region is in the Z-axis direction, and an optical axis of the second region is in the Y-axis direction, and
B1 is a magnitude of scattering with respect to the light propagating in the Y-axis direction when the optical axis of the first region is in the Z-axis direction and the optical axis of the second region is in the Y-axis direction.

13. An illumination unit comprising:
a first transparent substrate and a second transparent substrate that are arranged to be separated from each other and to face each other;
a light source applying light to an end face of the first transparent substrate;
a light modulation layer provided in a gap between the first transparent substrate and the second transparent substrate and exhibiting scattering characteristics or transparency with respect to the light from the light source depending on a magnitude of an electric field, the light modulation layer including a first region including a liquid crystal material and that has optical anisotropy and relatively-high responsiveness to the electric field, and a second region including a polymer material and that has optical anisotropy and relatively-low responsiveness to the electric field, and the light modulation layer satisfying a following expression when the light modulation layer exhibits the scattering characteristics, $A/B<A1/B1$ where A is a magnitude of first scattering with respect to the light propagating in an X-axis direction that is perpendicular to the end face,
B is a magnitude of second scattering with respect to the light propagating in a Y-axis direction that is parallel to the end face and parallel to a surface of the first transparent substrate, a Z-axis direction being perpendicular to the X-axis and Y-axis,
A1 is a magnitude of scattering with respect to the light propagating in the X-axis direction when an optical axis of the first region is in the Z-axis direction, and an optical axis of the second region is in the Y-axis direction, and
B1 is a magnitude of scattering with respect to the light propagating in the Y-axis direction when the optical axis of the first region is in the Z-axis direction and the optical axis of the second region is in the Y-axis direction; and
a first alignment film and a second alignment film that sandwich the light modulation layer, the first alignment film being a horizontal alignment film, and the second alignment film being a vertical alignment film.

* * * * *